United States Patent
Payton et al.

(10) Patent No.: US 12,460,012 B2
(45) Date of Patent: Nov. 4, 2025

(54) DOSAGE AND ADMINISTRATION OF ANTI-C5 ANTIBODIES FOR TREATMENT OF ATYPICAL HEMOLYTIC UREMIC SYNDROME (aHUS) IN PEDIATRIC PATIENTS

(71) Applicant: ALEXION PHARMACEUTICALS, INC., Boston, MA (US)

(72) Inventors: Lori Payton, Madison, CT (US); Andrew Denker, Ardmore, PA (US); Eugene Scott Swenson, Madison, CT (US); Rajendra Pradhan, New Haven, CT (US); Stephan Ortiz, Guilford, CT (US); Marc Vallee, Lexington, MA (US); Christian Mix, Wellesley, MA (US); Xiang Gao, Guilford, CT (US)

(73) Assignee: Alexion Pharmaceuticals, Inc., Boston, MA (US)

( * ) Notice: Subject to any disclaimer, the term of this patent is extended or adjusted under 35 U.S.C. 154(b) by 155 days.

(21) Appl. No.: 17/057,898

(22) PCT Filed: May 29, 2019

(86) PCT No.: PCT/US2019/034297
§ 371 (c)(1),
(2) Date: Nov. 23, 2020

(87) PCT Pub. No.: WO2019/236345
PCT Pub. Date: Dec. 12, 2019

(65) Prior Publication Data
US 2021/0332147 A1    Oct. 28, 2021

Related U.S. Application Data

(60) Provisional application No. 62/790,577, filed on Jan. 10, 2019, provisional application No. 62/680,121, filed on Jun. 4, 2018.

(51) Int. Cl.
*A61P 7/00* (2006.01)
*C07K 16/28* (2006.01)
*A61K 39/00* (2006.01)

(52) U.S. Cl.
CPC .......... *C07K 16/2896* (2013.01); *A61P 7/00* (2018.01); *A61K 2039/505* (2013.01); *A61K 2039/545* (2013.01); *C07K 2317/34* (2013.01); *C07K 2317/52* (2013.01); *C07K 2317/76* (2013.01); *C07K 2317/94* (2013.01)

(58) Field of Classification Search
CPC .......... C07K 16/2896; C07K 2317/34; C07K 2317/52; C07K 2317/76; C07K 2317/94; C07K 16/28; A61P 7/00; A61K 2039/505; A61K 2039/545; A61K 2039/54
See application file for complete search history.

(56) References Cited

U.S. PATENT DOCUMENTS

| | | |
|---|---|---|
| 3,710,795 A | 1/1973 | Higuchi et al. |
| 4,485,045 A | 11/1984 | Regen |
| 4,544,545 A | 10/1985 | Ryan et al. |
| 4,816,567 A | 3/1989 | Cabilly et al. |
| 4,863,457 A | 9/1989 | Lee |
| 4,868,116 A | 9/1989 | Morgan et al. |
| 4,980,286 A | 12/1990 | Morgan et al. |
| 5,013,556 A | 5/1991 | Woodle et al. |
| 5,308,341 A | 5/1994 | Chanoch |
| 5,443,505 A | 8/1995 | Wong et al. |
| 5,447,145 A | 9/1995 | Cappello et al. |
| 5,501,856 A | 3/1996 | Ohtori et al. |
| 5,624,821 A | 4/1997 | Winter et al. |
| 5,648,260 A | 7/1997 | Winter et al. |
| 5,773,019 A | 6/1998 | Ashton et al. |
| 5,997,848 A | 12/1999 | Patton et al. |
| 6,001,329 A | 12/1999 | Buchsbaum et al. |
| 6,001,386 A | 12/1999 | Ashton et al. |
| 6,005,079 A | 12/1999 | Casterman et al. |
| 6,019,968 A | 2/2000 | Platz et al. |
| 6,095,141 A | 8/2000 | Armer et al. |
| 6,146,361 A | 11/2000 | DiBiasi et al. |
| 6,170,717 B1 | 1/2001 | Di Giovanni et al. |
| 6,192,891 B1 | 2/2001 | Gravel et al. |
| 6,194,551 B1 | 2/2001 | Dusogie et al. |
| 6,200,296 B1 | 3/2001 | Dibiasi et al. |

(Continued)

FOREIGN PATENT DOCUMENTS

| | | |
|---|---|---|
| AU | 2018201961 A1 | 4/2018 |
| EP | 430539 A2 | 6/1991 |

(Continued)

OTHER PUBLICATIONS

History of Change for Study: NCT02949128: Single Arm Study of ALXN1210 in Complement Inhibitor Treatment-Naïve Adult and Adolescent Patients with Atypical Hemolytic Syndrome (aHUS); Study NCT02949128, Submitted Date: Oct. 27, 2016 (v1) (Year: 2016).*
Ito et al., Clin Exp Nephrol 20: 265-272 (2016); DOI10.1007/s10157-1142y). (Year: 2016).*
Greenbaum et al. "Eculizumab is a safe and effective treatment in pediatric patients with atypical hemolytic uremic syndrome" Kidney International 2016, 89, 701-711 (Year: 2016).*
Greenbaum et al. Kidney International 89, 701-711, 2016. (Year: 2016).*
Volokhina et al. Clin Pharmacol Ther. Oct. 2017;102(4):671-678. PMID: 28295239 (Year: 2017).*
Xu et al., Cell Immunol 200: 16-26 (2000).

(Continued)

*Primary Examiner* — Misook Yu
*Assistant Examiner* — James Lyle McLellan
(74) *Attorney, Agent, or Firm* — Nelson Mullins Riley & Scarborough LLP; Jane E. Remillard, Esq.; Jill Gorny Sloper, Esq.

(57) ABSTRACT

Provided are methods for clinical treatment of Atypical Hemolytic Uremic Syndrome (aHUS) using an anti-C5 antibody, or antigen binding fragment thereof, in pediatric patients.

15 Claims, 15 Drawing Sheets
Specification includes a Sequence Listing.

(56) References Cited

U.S. PATENT DOCUMENTS

| | | |
|---|---|---|
| 6,277,099 B1 | 8/2001 | Strowe et al. |
| 6,277,375 B1 | 8/2001 | Ward |
| 6,300,064 B1 | 10/2001 | Knappik et al. |
| 6,302,855 B1 | 10/2001 | Lav et al. |
| 6,355,245 B1 | 3/2002 | Evans et al. |
| 6,737,056 B1 | 5/2004 | Presta |
| 6,933,368 B2 | 8/2005 | Co et al. |
| 7,112,341 B1 | 9/2006 | Nagarajan et al. |
| 7,371,826 B2 | 5/2008 | Presta |
| 7,390,786 B2 | 6/2008 | Warne et al. |
| 7,556,615 B2 | 7/2009 | Pettis et al. |
| 7,670,600 B2 | 3/2010 | Dall'Acqua et al. |
| 7,704,497 B2 | 4/2010 | Dall'Acqua et al. |
| 8,088,376 B2 | 1/2012 | Chamberlain et al. |
| 8,323,962 B2 | 12/2012 | Dall'Acqua et al. |
| 8,367,805 B2 | 2/2013 | Chamberlain et al. |
| 8,802,820 B2 | 8/2014 | Chamberlain et al. |
| 9,079,949 B1 | 7/2015 | Andrien, Jr. et al. |
| 9,107,861 B1 | 8/2015 | Andrien, Jr. et al. |
| 9,206,251 B2 | 12/2015 | Andrien, Jr. et al. |
| 9,371,377 B2 | 6/2016 | Andrien, Jr. et al. |
| 9,447,176 B2 | 9/2016 | Rother et al. |
| 9,663,574 B2 | 5/2017 | Andrien, Jr. et al. |
| 9,771,418 B2 | 9/2017 | Rother et al. |
| 9,803,007 B1 | 10/2017 | Andrien, Jr. et al. |
| 10,227,400 B2 | 3/2019 | Andrien, Jr. et al. |
| 10,584,164 B2 | 3/2020 | Andrien, Jr. et al. |
| 11,365,241 B2 | 6/2022 | Ortiz et al. |
| 11,434,280 B2 | 9/2022 | Andrien, Jr. et al. |
| 12,012,448 B2 | 6/2024 | Ortiz et al. |
| 12,128,101 B2 | 10/2024 | Payton et al. |
| 2002/0026176 A1 | 2/2002 | Varner et al. |
| 2005/0271660 A1 | 12/2005 | Wang |
| 2006/0141456 A1 | 6/2006 | Edwards et al. |
| 2007/0172483 A1 | 7/2007 | Schwaeble et al. |
| 2007/0235029 A1 | 10/2007 | Zhu et al. |
| 2008/0202513 A1 | 8/2008 | Birchall et al. |
| 2008/0241223 A1 | 10/2008 | Nivaggioli et al. |
| 2009/0110679 A1 | 4/2009 | Li et al. |
| 2010/0098730 A1 | 4/2010 | Lowman et al. |
| 2011/0111406 A1 | 5/2011 | Igawa et al. |
| 2012/0225056 A1 | 9/2012 | Rother et al. |
| 2012/0230982 A1 | 9/2012 | Zhou et al. |
| 2015/0299305 A1 | 10/2015 | Andrien, Jr. et al. |
| 2016/0108115 A1 | 4/2016 | Andrien, Jr. et al. |
| 2016/0251433 A1 | 9/2016 | Andrien, Jr. et al. |
| 2016/0355579 A1 | 12/2016 | Rother et al. |
| 2016/0355580 A1 | 12/2016 | Rother et al. |
| 2017/0298123 A1 | 10/2017 | Andrien, Jr. et al. |
| 2017/0355757 A1 | 12/2017 | Hu et al. |
| 2017/0369562 A1 | 12/2017 | Rother et al. |
| 2018/0009885 A1 | 1/2018 | Andrien, Jr. et al. |
| 2018/0311299 A1 | 11/2018 | Griffin et al. |
| 2018/0311345 A1 | 11/2018 | Pober et al. |
| 2019/0023775 A1* | 1/2019 | Bachman ............... C07K 16/40 |
| 2019/0263897 A1 | 8/2019 | Andrien, Jr. et al. |
| 2019/0276524 A1 | 9/2019 | Griffin et al. |
| 2019/0367599 A1 | 12/2019 | Shinomiya et al. |
| 2020/0140531 A1 | 5/2020 | Rother et al. |
| 2020/0157200 A1 | 5/2020 | Andrien, Jr. et al. |
| 2020/0254092 A1* | 8/2020 | Payton ............... A61K 39/3955 |
| 2021/0000927 A1 | 1/2021 | Ricardo et al. |
| 2021/0187054 A1 | 6/2021 | Griffin et al. |
| 2021/0214425 A1 | 7/2021 | Payton et al. |
| 2022/0235121 A1 | 7/2022 | Payton et al. |
| 2023/0002482 A1* | 1/2023 | Philominathan ....... C07K 16/18 |
| 2024/0141024 A1 | 5/2024 | Andrien, Jr. et al. |
| 2025/0127892 A1 | 4/2025 | Payton et al. |
| 2025/0144208 A1 | 5/2025 | Payton et al. |
| 2025/0145698 A1 | 5/2025 | Andrien, Jr. et al. |

FOREIGN PATENT DOCUMENTS

| | | | |
|---|---|---|---|
| EP | 488401 A1 | 6/1992 | |
| EP | 2006381 A1 | 12/2008 | |
| EP | 2275443 A1 | 1/2011 | |
| EP | 3095795 A1 | 11/2016 | |
| WO | 8902468 A1 | 3/1989 | |
| WO | 8905345 A1 | 6/1989 | |
| WO | 8907136 A2 | 8/1989 | |
| WO | 9207573 A1 | 5/1992 | |
| WO | 94/02559 A1 | 2/1994 | |
| WO | 94/04678 A1 | 3/1994 | |
| WO | 94/28027 A1 | 12/1994 | |
| WO | 9734631 A1 | 9/1997 | |
| WO | 98/23289 A1 | 6/1998 | |
| WO | 98/47531 A2 | 10/1998 | |
| WO | 0061178 A1 | 10/2000 | |
| WO | 0069887 A2 | 11/2000 | |
| WO | 0178693 A2 | 10/2001 | |
| WO | 2003/074679 A2 | 12/2003 | |
| WO | 03105757 A2 | 12/2003 | |
| WO | 2004024156 A1 | 3/2004 | |
| WO | 2004026380 A2 | 4/2004 | |
| WO | 2004029207 A2 | 4/2004 | |
| WO | 2004060407 A1 | 7/2004 | |
| WO | 2004073551 A2 | 9/2004 | |
| WO | 2005011735 A1 | 2/2005 | |
| WO | 2005040217 A2 | 5/2005 | |
| WO | 2005/077981 A2 | 8/2005 | |
| WO | 2005092925 A2 | 10/2005 | |
| WO | 06/031994 A1 | 3/2006 | |
| WO | 2006/053301 A2 | 5/2006 | |
| WO | 2006094234 A1 | 9/2006 | |
| WO | 2006/105338 A2 | 10/2006 | |
| WO | 2006/122257 A2 | 11/2006 | |
| WO | 2007041635 A2 | 4/2007 | |
| WO | 2007/103134 A2 | 9/2007 | |
| WO | 2007106585 A1 | 9/2007 | |
| WO | 2007114319 A1 | 10/2007 | |
| WO | 08/043822 A2 | 4/2008 | |
| WO | 2008048545 A2 | 4/2008 | |
| WO | 2008092117 A2 | 7/2008 | |
| WO | 2009/041643 A1 | 4/2009 | |
| WO | 2009058492 A2 | 5/2009 | |
| WO | 2009086320 A1 | 7/2009 | |
| WO | 2009125825 A1 | 10/2009 | |
| WO | 2010/151526 A1 | 12/2010 | |
| WO | 2011111007 A2 | 9/2011 | |
| WO | 2011122011 A1 | 10/2011 | |
| WO | 2011/137362 A1 | 11/2011 | |
| WO | 2012/073992 A1 | 6/2012 | |
| WO | 2012133782 A1 | 10/2012 | |
| WO | 2013046704 A2 | 4/2013 | |
| WO | 2013047748 A1 | 4/2013 | |
| WO | WO-2015021166 A2 * | 2/2015 | ............ G01N 33/88 |
| WO | 2015/134894 A1 | 9/2015 | |
| WO | 2016/098356 A1 | 6/2016 | |
| WO | 2016/160756 A2 | 10/2016 | |
| WO | 2016/209956 A1 | 12/2016 | |
| WO | 2017/044811 A1 | 3/2017 | |
| WO | WO-2017123636 A1 * | 7/2017 | ............... A61P 7/00 |
| WO | 2017/218515 A1 | 12/2017 | |
| WO | 2019/084438 A1 | 5/2019 | |
| WO | 2019/231983 A1 | 12/2019 | |
| WO | 2019/236345 A1 | 12/2019 | |
| WO | 2020/092549 A1 | 5/2020 | |
| WO | 2020/154626 A1 | 7/2020 | |

OTHER PUBLICATIONS

Yuksel, S. et al., "First-Line, Early and Long-Term Eculizumab Therapy in Atypical Hemolytic Uremic Syndrome: A Case Series in Pediatric Patients," Pediatr Drugs, vol. 18:413-420 (2016) DOI 10.1007/s40272-016-0194-0.

Zalevsky et al., Nat Biotech 28: 157-159 (2010).

Zuber, J. et al., "new insights into postrenal transplant hemolytic uremic syndrome," Nat. Rev. Nephrol., vol. 7: 23-35 (2011).

Lee, et al., Bioconjug Chem 10(6): 973-81 (1999).

Lee, J-W et al., "Results from a Phase 3, Multicenter, Noninferiority Study of Ravulizumab (ALXN1210) Versus Eculizumab In Adult Patients with Paroxysmal Nocturnal Hemoglobi-nuria (PNH) Naïve

(56) References Cited

OTHER PUBLICATIONS

To Complement Inhibitors," (2018), XP055550310, Retrieved from the Internet: URL:https://learningcenter.ehaweb.org/eha/2018/stockholm/218885/jong.wook.lee.results.from.a.phase.3.multicenter.noninferiority.study.of.html?f=media=1 [retrieved on Jan. 31, 2019].
Lee, J-W et al., "Ravulizumab (ALXN1210) vs eculizumab in adult patients with PNH naive to complement inhibitors: the 301 study," Blood, (2018) ISSN: 0006-4971, DOI: 10.1182/blood-2018-09-876136.
Lee, J-W. et al., "2428 Immediate, Complete, and Sustained Inhibition of C5 with ALXN1210 Reduces Complement-Mediated Hemolysis in Patients with Paroxysmal Noctur-nal Hemoglobinuria (PNH): Interim Analysis of a Dose-Escalation Study," Internet Ci-Tation, Dec. 4, 2016 (Dec. 4, 2016), XP002768543, Retrieved from the Internet: URL:https://ash.confex.com/ash/2016/webprogram/Paper90053.html [retrieved on Mar. 23, 2017] the whole document.
Legendre, CM, et al., "Terminal Complement Inhibitor Eculizumab in Atypical Hemolytic-Uremic Syndrome," N Engl J Med., vol. 368:2169-2181 (2013).
Levy and Ladda, Nat New Biol 229(2): 51-52 (1971).
Licht, C., et al., "The global aHUS registry: methodology and initial patient characteristics," BMC Nephrology, vol. 16 (207) 8 pages (2015) DOI 10.1186/s12882-015-0195-1.
Lodmell et al., Vaccine 18:1059-1066 (2000).
Loirat, , C. et al., "Plasmatherapy in Atypical Hemolytic Uremic Syndrome," Seminars in Thrombosis and Hemostasis, vol. 36(6): 673-681 (2010).
Loirat, C. et al., "An international consensus approach to the management of atypical hemolytic uremic syndrome in children," Pediatr Nephrol., vol. 31:15-39 (2016).
Loirat, C. et al., "Atypical hemolytic uremic syndrome," Orphanet Journal of Rare Diseases, vol. 6:60: 30 pages (2011).
Lusky and Botchan, Nature 293: 79 (1981).
Malina, M. et al., "Peripheral Gangrene in Children With Atypical Hemolytic Uremic Syndrome," Pediatrics, vol. 131: e331-e335 (2013).
McLaughlin et al., J Virol 62: 1963-1973 (1989).
Medicus et al., J Exp Med 144: 1076-1093 (1976).
Mihu et al., J Gastrointestin Liver Dis 16(4): 419-424 (2007).
Moongkarndi et al, Immunobiol 165: 323 (1983).
Moongkarndi et al., Immunobiol 162: 397 (1982).
Morell et al., J Clin Invest 49(4): 673-680 (1970).
Mueller et al., Mol Immunol 34(6): 441-452 (1997).
Muller-Eberhard, Ann Rev Biochem 57: 321-347 (1988).
Mullett et al., Methods 22: 77-91 (2000).
Mulligan and Berg Proc Natl Acad Sci USA 78: 2072 (1981).
Mullinax et al., BioTechniques 12(6): 864-869 (1992).
Muyldermans et al., Trends Biochem Sci 26: 230-235 (2001).
Newkirk et al., Clin Exp Immunol 106(2): 259-264 (1996).
Noris, M. et al., "STEC-HUS, atypical HUS and TTP are all diseases of complement activation," Nat. Rev. Nephrol., vol. 8: 622-633 (2012).
Nuttall et al., Curr Pharm Biotech 1: 253-263 (2000).
Park et al., Anesth Analg 99(1): 42-48 (1999).
Pavisic et al., Int J Pharm 387(1-2)L 110-119 (2010).
Petkova et al., Int Immunol 18(12): 1759-69 (2006).
Poljak, Structure 2(12): 1121-1123 (1994).
Pollock et al., J Immunol Methods 231(1-2): 147-157 (1999).
Qiao et al., Proc Natl Acad Sci USA 105(27): 9337-9342 (2008).
Rabinovici et al., J Immunol 149 1744-1750 (1992).
Raju, BioProcess International 1(4): 44-53 (2003).
Ranta and Uritti, Adv Drug Delivery Rev 58(11): 1164-1181 (2006).
Rawal and Pangburn, J Immunol 166(4): 2635-2642 (2001).
Reiss, U. et al., "Efficacy and safety of eculizumab in children and adolescents with paroxysmal nocturnal hemoglobinuria," Pediatric Blood and Cancer, vol. 61(9):1544-1550 (2014).
Rich et al., Curr Opin Biotechnol 11: 54-61 (2000).
Riechmann et al., J Immunol Meth 231: 25-38 (1999).
Riechmann et al., Nature 332: 323-327 (1988).
Rinder et al., J Clin Invest 96: 1564-1572 (1995).
Roberts et al., Advanced Drug Delivery Reviews 54: 459-476 (2002).
Roeth, A. et al., "Optimization of Dose Regimen for ALXN1210, a Novel Complement C5 Inhibitor, in Patients with Paroxysmal Nocturnal Hemoglobinuria (PNH): Results of 2 Phase 1/2 Studies," Blood, vol. 130:3482 (2017).
Rogers et al., J Nucl Med 38: 1221-1229 (1997).
Rondeau, E. et al., "The long-acting C5 inhibitor, Ravulizumab, is effective and safe in adult patients with atypical hemolytic uremic syndrome naive to complement inhibitor treatment," Kidney International, Mar. 6, 2020, pp. 1-10.
Rondon and Marasco, Annual Review of Microbiology 51: 257-284 (1997).
Roopenian et al., Methods Mol Biol 602: 93-104 (2010).
Roopenian, DC, et al., "FcRn: the neonatal Fc receptor comes of age," Nature Reviews Immunology, vol. 7(9): 115-725 (2007).
Gawa et al., "Antibody recycling by engineered pH-dependent antigen binding improves the duration of antigen neutralization," Nat. Biotechnol. 28(11):1203-1207 (2010).
International Search Report and Written Opinion, PCT/US2021/040802, dated Oct. 18, 2021, 9 pages.
Rosenfeld et al., Cell 68: 143-155 (1992).
Roth, A. et al., "Ravulizumab (ALXN1210) in patients with paroxysmal nocturnal hemoglobinuria: results of phase Ib/2 studies", Blood Adv., vol. 2 (17): 2176-2185 (2018).
Rother, R. et al., "Discovery and development of the complement inhibitor eculizumab for the treatment of paroxysmal nocturnal hemoglobinuria," Nature Biotechnology, 25 (11): 1256-1264 (1488 Supp) (2007).
Rother et al., Nature Biotechnology 25 (11): 1256-1263 (2007).
Saland, J. et al., "Liver-kidney transplantation to cure atypical HUS: still an option post-eculizumab?," Pediatr Nephrol., DOI 10.1007/s00467-013-2722-2, 4 pages (2013).
Salvadori, M. et al., "Update on hemolytic uremic syndrome: Diagnostic and therapeutic recommendations," World J Nephrol., vol. 2(3): 56-76 (2013).
Samulski et al., J Virol 63: 3822-3828 (1989).
Sarkar, C.,A., et al., "Rational cytokine design for increased lifetime and enhanced potency using pH-activated histidine switching," Nature Biotechnology, vol. 20(9):908-913 (2002).
Sarver et al., Proc Natl Acad Sci USA 79: 7147 (1982).
Sawai et al., Am J Repr Immunol 34: 26-34 (1995).
Schmid et al., Shock, vol. 8(2): 119-124 (1997).
Schoonbroodt et al., Nucleic Acids Res 33(9): e81 (2005).
Schreiber et al., Proc Natl Acad Sci USA 75: 3948-3952 (1978).
Scully, M. et al., "Systemic Involvement at Entry into the Global Atypical Hemolytic Uremic Syndrome (aHUS) Registry," Blood, vol. 128:3729 6 pages (2016).
Second Written Opinion, PCT/US2015/019225, dated Feb. 5, 2016, 10 pages.
Sharma, V.K. et al., "The formulation and delivery of monoclonal antibodies", Therapeutic Monoclonal Antibodies, Chapter 30: 675-711 (2009).
Sheerin, N.S. et al., "A national specialized service in England for atypical haemolytic uraemic syndrome—the first year's experience," QJM: An International Journal of Medicine, 27-33: 7 pages (2016).
Sheridan, D. et al., "Design and preclinical characterization of ALXN1210: A next generation anti-C5 monoclonal antibody with improved pharmacokinetics and duration of action," Immunobiology, vol. 221(Issue 10): 1158 (2016).
Sheridan, D. et al., "Design and preclinical characterization of ALXN1210: A novel anti-C5 antibody with extended duration of action," PLoS One 13(4): e0195909, 15 pages (2018).
Wurzner et al., Complement Inflamm 8: 328-340 (1991).
Shields et al., J Biol Chem 276(9): 6591-6604 (2001).
Shields et al., J Biol Chem 277(30): 26733-26740 (2002).
Shire, S. et al., "High-concentration antibody formulations," Formulation and Process De-velopment Strategies for Manufacturing Biopharmaceuticals, Chapter 15: 349-381 (2010).
Shopes, Immunol 148: 2918-2922 (1992).
Shu et al., Proc Natl Aced Sci USA 90: 7995-7999 (1993).
Sissons et al., Proc Natl Acad Sci USA 77: 559-562 (1980).

(56) References Cited

OTHER PUBLICATIONS

Skerra et al., Science 240: 1038-1040 (1988).
Southern and Berg, Mol Appl Genet 1:327 (1982).
Staelens et al., Mol Immunol 43: 1243-1257 (2006).
Tabrizi, Ma et al., "Elimination mechanisms of therapeutic monoclonal antibodies ," Drug Discovery Today, vol. 11 (1-2):81-88 (2006).
Thomas et al., Mol Immunol 33(17118): 1389-1401 (1996).
Todorovska et al., J Immunol Methods 248(1): 47-66 (2001).
Tofukuji et al., J Thorac Cardiovasc Surg 166(6): 1060-1068 (1998).
Tsai, H. et al., "A Mechanistic Approach to the Diagnosis and Management of Atypical Hemolytic Uremic Syndrome," Transfusion Medicine Reviews, vol. 28:187-197 (2014).
Van Beusechem et al., Proc Natl Acad Sci USA 89: 7640-7644 (1992).
Van Gurp et al., Am J Transplantation 8(8): 1711-1718 (2008).
Van Kuik-Romeijn et al., Transgenic Res 9(2): 155-159 (2000).
Verhoeyen et al., Science 239: 1534-1536 (1988).
Wang et al., Proc Natl Acad Sci USA 93: 8563-8568 (1996).
Wang et al.,Proc Natl Acad Sci USA 92: 8955-8959 (1995).
Wang, W. et al., "Antibody Structure, Instability, and Formulation," Journal of Pharmaceu-tical Sciences, American Chemical Society and American Pharmaceutical Association, vol. 96(1):1-26 (2007).
Ward and Zvaifler, J Clin Invest 50(3): 606-16 (1971).
Waters, A. et al., "aHUS caused by complement dysregulation: new therapies on the horizon," Pediatr Nephrol., vol. 26:41-57 (2011).
Weisman et al., Science 249: 146-151 (1990).
Wetsel et al., J Biol Chem 265: 2435-2440 (1990).
Wigler et al., Cell 16: 77 (1979).
Wilson et al., Proc Natl Acad Sci USA 85: 3104-3018 (1988).
Wong, E. et al., "Anticomplement C5 therapy with eculizumab for the treatment of parox-ysmal nocturnal hemoglobinuria and atypical hemolytic uremic syndrome," Translational Research, vol. 165 (2): 306-320 (2017) XP055358380, NL ISSN: 1931-5244, DOI:10.1016/j.trsl.2014.10.010 the whole document.
Wright et al., EMBO J 10(10): 2717-2723 (1991).
NCT02946463 ALXN1210 Versus Eculizumab in Complement Inhibitor Treatment-Native Adult Patients With Paroxysmal Nocturnal Hemoglobinuria (PNH), ClinicalTrials.gov, [online], Jul. 28, 2017, [retrieved on Jul. 21, 2022], 7 pages.
Tanaka, K. et al., "The long-acting C5 inhibitor, ravulizumab, is efficacious and safe in pediatric patients with atypical hemolytic uremic syndrome previously treated with eculizumab," Pediatric Nephrology, vol. 36(4):889-898 (2021).
Ambati and Adamis, Prog Retin Eye Res 21(2): 145-151 (2002).
Amsterdam et al., Am J Physiol 268: H448-H457 (1995).
Anonymous: "Alexion Receives FDA Approval for ULTOMIRIS (ravulizumab-cwvz) for Atypical Hemolytic Uremic Syndrome (aHUS)," Oct. 18, 2019.
Anonymous: "Assessment report Soliris /Eculizumab," pp. 1-28, Mar. 21, 2013, Retrieved from the Internet: URL: https://www.ema.europa.eu/en/documents/variation-report/soliris-h-c-791-ii-0050-epar-assessment-report-variation_en.pdf [retrieved on Aug. 7, 2019].
Anonymous: "Ravulizumab for atypical haemolytic uraemic syndrome in adults and children—first line," Aug. 1, 2018, pp. 1-10.
Anonymous: "Single Arm Study of ALXN1210 in Complement Inhibitor Treatment-Naive Adult and Adolescent Patients With Atypical Hemolytic Uremic Syndrome (aHUS)," pp. 1-6 (2016) XP055619305, Retrieved from the Internet:URL: https://clinicaltrials.gov/ct2/show/NCTO2949128?term=alxn1210&rank=8 [retrieved on Sep. 6, 2019].
Anonymous: "Study of Ravulizumab in Children and Adolescents With Atypical Hemolytic Uremic Syndrome (aHUS)", Apr. 27, 2017 (Apr. 27, 2017), pp. 1-6, XP055619309, Retrieved from the Internet: URL:https://clinicaltrials.gov/ct2/show/NCTO3131219?term=alxn1210&rank=5 [retrieved on Sep. 6, 2019].
Appel et al., J Am Soc Nephrol 16: 1392-1403 (2005).
Armentano et al., Proc Natl Acad Sci USA 87: 6141-6145 (1990).
Baldridge et al., Methods 19: 103-107 (1999).
Barocas and Balachandran, Expert Opin Drug Delivery 5(1): 1-10 (10) (2008).
Baudino et al.l, J Immunol 181: 6664-6669 (2008).
Berge et al., J Phar4m Sci 66: 1-19 (1977).
Berkner et al., BioTechniques 6: 616 (1988).
Better et al., Science 240: 1041-1043 (1988).
Bieg et al., Autoimmunity 31(1): 15-24 (1999).
Bless et al., Am J Physiol 276(1): L57-L63 (1999).
Brodsky, R. et al., "Complement in hemolytic anemia," Blood, vol. 126(22):2459-2465 (2015).
Burmeister et al., Nature 372: 379-383 (1994).
Burton et al., Adv Immun 51:1-52 (1992).
Campistol, J., et al., "An update for atypical haemolytic uraemic syndrome: diagnosis and treatment. A consensus document," Nefrologia, vol. 33(1):27-45 (2013).
Canfield et al., J Exp Med 173: 1483-1491 (1991).
Caron et al., J Exp Med 176: 1191-1195 (1992).
Chaparro-Riggers, Biol Chem 287: 11090-11097 (2012).
Chothia et al., Nature 342: 877-883 (1989).
Chowdhury et al., Science 254: 1802-1805 (1991).
Christmann, M., et al., "Eculizumab as First-Line Therapy for Atypical Hemolytic Uremic Syndrome," Pediatrics, vol. 133, e1759: 7 pages (2014).
Co et al., Mol Immunol 30: 1361 (1993).
Cooper et al., J Exp Med 132: 775-793 (1970).
Crocker et al., J Clin Pathol 27(2): 122-124 (1974).
Dai et al., Proc Natl Acad Sci USA 89: 10892-10895 (1992).
Dall'Acqua et al., J Biol Chem 281: 23514-23524 (2006).
Dall'Acqua et al., J Immunol 117: 1129-1138 (2006).
Danos and Mulligan, Proc Natl Acad Sci USA 85; 6460-6464 (1988).
Datta-Mannan et al., J Biol Chem 282(3): 1709-1717 (2007).
Daugherty, A., et al., "Formulation and delivery issues for monoclonal antibody thera-peutics," Current Trends in Monoclonal Antibody Development and Manufacture, Chapter 8:103-129 (2010).
Deans et al., Proc Natl Acad Sci USA 81: 1292 (1984).
Dong et al., Reviews in Mol Biotech 82: 303-323 (2002).
Duncan and Winter Nature 322: 738-40 (1988).
Eglitis et al., Science 230: 1395-1398 (1985).
Eppstein et al., Proc Natl Acad Sci USA 82: 3688 (1985).
European Search Report, EP Application No. 161776562, dated Aug. 8, 2016, 6 pages.
Evans, et al., Mol Immunol 32(16): 1183-95 (1995).
Fakhouri, F. et al., "Terminal Complement Inhibitor Eculizumab in Adult Patients With Atypical Hemolytic Uremic Syndrome: A Single-Arm, Open-Label Trial," Am J Kidney Dis., vol. 68(1):84-93 (2016).
Fearon et al., J Exp Med 142: 856-863 (1975).
Ferry et al., Proc Natl Acad Sci USA 88: 8377-8381 (1991).
Fivash et al., Curr Opin Biotechnol 9: 97-101 (1998).
Flotte et al., Am J Respir Cell Mol Biol 7: 349-356 (1992).
Ghetie et al., Nat Biotech 15: 637-640 (1997).
Gulsen and Chauhan, Invest Opthalmol Vis Sci 45: 2342-2347 (2004).
Curran, K., et al. "Paroxysmal nocturnal hemoglobinuria in pediatric patients," Pediatric Blood & Cancer, vol. 59(3): 525-529 (2012).
Al-Ani, F. et al. "Eculizumab in the management of paroxysmal nocturnal hemoglobinuria: patient selection and special considerations," Therapeutics and Clinical Risk Management, vol. 12: 1161-1170 (2016).
History of Changes for Study: NCT03131219 Study of ALXN1210 in Children and Adolescents With Atypical Hemolytic Uremic Syndrome (aHUS), Nov. 16, 2022, 4 pages.
History of Changes for Study: NCT02949128 Single Arm Study of ALXN1210 in Complement Inhibitor Treatment—Naïve Adult and Adolescent Patients With Atypical Hemolytic Uremic Syndrome (aHUS), Nov. 17, 2022, 6 pages.
Gupta et al., Vaccine 13(14): 1263-1276 (1995).
Hanauske et al., Clin Cancer Res 13(2, part 1): 523-531 (2007).
Heinen, S. et al., "Monitoring and modeling treatment of atypical hemolytic uremic syndrome," Molecular Immunology, vol. 54: 84-88 (2013).

(56) References Cited

OTHER PUBLICATIONS

Hetherington et al., Antimicrobial Agents and Chemotherapy 50(10): 3499-3500 (2006).
Hezareh et al., J Virol 75: 12161-12168 (2001).
Hillmen et al., N. Engl J Med 350(6): 552-559 (2004).
Hillmen, P. et al., "Long-term safety and efficacy of sustained eculizumab treatment in patients with paroxysmal nocturnal haemoglobinuria," British Journal of Haematology doi: 10.1111/bjh.12347, 12 pages (2013).
Hinton et al., J Biol Chem 279: 6213-6216 (2004).
Hinton et al., J Immunol 176: 346-356 (2006).
Hirt-Minkowski, P. et al., "Atypical Hemolytic Uremic Syndrome: Update on the Complement System and What Is New," Nephron Clin Pract., 114:c219-c235 (2010).
Holers and Thurman, Molecular Immunology 41: 147-152 (2004).
Holers et al., Immunological Reviews 223: 300-316 (2008).
Homeister et al., J Immunol 150: 1055-1064 (1993).
Hou et al., Cytokine 10: 319-30 (1998).
Houdebine, Curr Opin Biotechnol 13(6): 625-629 (2002).
Huber et al., Proc Natl Acad Sci USA 88: 8039-8043 (1991).
Hudson and Kortt, J Immunol Methods 231: 177-189 (1999).
Huston et al., Methods in Enzymology 203: 46-88 (1991).
Hwang et al., Proc Natl Acad Sci USA 77: 4030 (1980).
Hwu et al., J Immunol 150: 4104-4115 (1993).
Igawa et al., "Antibody recycling by engineered pH-dependent antigen binding improves the duration of antigen neutralization," Nat. Biotechnol. 28(11):1203-1207 (2010).
International Preliminary Report on Patentability, PCT/US2018/044071, dated Jan. 28, 2020, 8 pages.
International Preliminary Report on Patentability, PCT/US2018/057760, dated Apr. 28, 2020, 9 pages.
International Preliminary Report on Patentability, PCT/US2019/034293, dated Dec. 1, 2020, 9 pages.
International Preliminary Report on Patentability, PCT/US2019/034297, dated Dec. 8, 2020, 10 pages.
International Search Report and Written Opinion for Application No. PCT/US2015/019225, dated May 18, 2015.
International Search Report and Written Opinion, PCT/US2018/044071, dated Oct. 2, 2018, 12 pages.
International Search Report and Written Opinion, PCT/US2018/057760, dated Mar. 21, 2019, 13 pages.
International Search Report and Written Opinion, PCT/US2019/034293, dated Aug. 21, 2019, 14 pages.
International Search Report and Written Opinion, PCT/US2019/034297, dated Sep. 25, 2019, 13 pages.
International Search Report and Written Opinion, PCT/US2020/014998, dated Jun. 22, 2020, 13 pages.
Isaacs et al., J Immunol 161: 3862-3869 (1998).
Isenman et al., J Immunol 124: 326-331 (1980).
Ishii-Watabe, A. et al., "Molecular Design of Therapeutic Antibodies," Pharmaceutics 74 (1): 4-11: 17 pages (2014).
Israel et al., Immunology 89(4): 573-578 (1996).
Ito, W. et al., "The His-probe method: effects of histidine residues introduced into the complementarity-determining regions of antibodies on antigen-antibody interactions at different pH values," FEBS Letter, vol. 309(1): 85-88(1992).
Johne et al., J Immunol Meth 160: 191-198 (1993).
Johnson et al., J Med Chem 42: 4640-4649 (1999).
Jones et al., Nature 321: 522-525 (1986).
Jonsson et al., Ann Biol Clin 51: 19-26 (1993).
Jonsson et al., Biotechniques 11: 620-627 (1991).
Junghans, R. et al., "The protection receptor for IgG catabolismis the beta2-microglobulin-containing neonatal Intestinal transport receptor," PNAS, USA, vol. 93(11):5512-5516 (1996).
Jungi and Pepys, Immunology 43(2): 271-279 (1981).
Kaszubska et al., Protein Expression and Purification 18: 213-220 (2000).
Kay et al., Human Gene Therapy 3: 641-647 (1992).
Kim et al., Ophthalmic Res 39: 244-254 (2007).
Kinstler et al., Advanced Drug Deliveries Reviews 54: 477-485.
Klein et al., Proc. Natl Acad Sci USA 78: 524-528 (1981).
Kroshus et al., Transplantation 60: 1194-1202 (1995).
Lee, CV., et al., "High-affinity human antibodies from phage-displayed synthetic Fab libraries with a single framework scaffold," J. Molecular Biology, vol. 340 (5): 1073-1093 (2004).
U.S. Appl. No. 18/219,138, filed Jul. 7, 2023, Bruce A. Andrien.
NCT03056040 "ALXN1210 versus eculizumab in adult participants with paraoxysmal nocturnal hemolglobinuria (PNH) currently treated with eculizumab" Alexion Pharmaceuticals, Inc., first posted Feb. 16, 2017 (2017).
Volokluna, E. et al., "Eculizumab Dosing Regimen in Atypical HUS: Possibilities for Individualized Treatment," Clinical Pharmacology & Therapeutics, vol. 102 (4): 671-678 (2017).
Volokhina, E. et al., "Sensitive, reliable and easy-performed laboratory monitoring of eculizumab therapy in atypical hemolytic uremic syndrome," Clin Immunol., vol. 160(2):237-243 (2015).

\* cited by examiner

SEQUENCE LISTING

<160> NUMBER OF SEQ ID NOS: 46

<210> SEQ ID NO 1
<211> LENGTH: 10
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 1

Gly Tyr Ile Phe Ser Asn Tyr Trp Ile Gln
1               5                   10

<210> SEQ ID NO 2
<211> LENGTH: 17
<212> TYPE: PRT
<213> ORGANISM: Artificial Sequence
<220> FEATURE:
<221> NAME/KEY: source

```
<223> OTHER INFORMATION: /note="Description of Artificial Sequence:
      Synthetic peptide"

<400> SEQUENCE: 2

Glu Ile Leu Pro Gly Ser Gly Ser Thr Glu Tyr Thr Glu Asn Phe Lys
1               5                   10                  15

Asp

<210> SEQ ID NO 3
<211> LENGTH: 13
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 3

Tyr Phe Phe Gly Ser Ser Pro Asn Trp Tyr Phe Asp Val
1               5                   10

<210> SEQ ID NO 4
<211> LENGTH: 11
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 4

Gly Ala Ser Glu Asn Ile Tyr Gly Ala Leu Asn
1               5                   10

<210> SEQ ID NO 5
<211> LENGTH: 7
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 5

Gly Ala Thr Asn Leu Ala Asp
1               5

<210> SEQ ID NO 6
<211> LENGTH: 9
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 6

Gln Asn Val Leu Asn Thr Pro Leu Thr
1               5

<210> SEQ ID NO 7
<211> LENGTH: 122
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"
```

<400> SEQUENCE: 7

Gln Val Gln Leu Val Gln Ser Gly Ala Glu Val Lys Lys Pro Gly Ala
1               5                   10                  15

Ser Val Lys Val Ser Cys Lys Ala Ser Gly Tyr Ile Phe Ser Asn Tyr
            20                  25                  30

Trp Ile Gln Trp Val Arg Gln Ala Pro Gly Gln Gly Leu Glu Trp Met
        35                  40                  45

Gly Glu Ile Leu Pro Gly Ser Gly Ser Thr Glu Tyr Thr Glu Asn Phe
    50                  55                  60

Lys Asp Arg Val Thr Met Thr Arg Asp Thr Ser Thr Ser Thr Val Tyr
65                  70                  75                  80

Met Glu Leu Ser Ser Leu Arg Ser Glu Asp Thr Ala Val Tyr Tyr Cys
                85                  90                  95

Ala Arg Tyr Phe Phe Gly Ser Ser Pro Asn Trp Tyr Phe Asp Val Trp
            100                 105                 110

Gly Gln Gly Thr Leu Val Thr Val Ser Ser
        115                 120

<210> SEQ ID NO 8
<211> LENGTH: 107
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 8

Asp Ile Gln Met Thr Gln Ser Pro Ser Ser Leu Ser Ala Ser Val Gly
1               5                   10                  15

Asp Arg Val Thr Ile Thr Cys Gly Ala Ser Glu Asn Ile Tyr Gly Ala
            20                  25                  30

Leu Asn Trp Tyr Gln Gln Lys Pro Gly Lys Ala Pro Lys Leu Leu Ile
        35                  40                  45

Tyr Gly Ala Thr Asn Leu Ala Asp Gly Val Pro Ser Arg Phe Ser Gly
    50                  55                  60

Ser Gly Ser Gly Thr Asp Phe Thr Leu Thr Ile Ser Ser Leu Gln Pro
65                  70                  75                  80

Glu Asp Phe Ala Thr Tyr Tyr Cys Gln Asn Val Leu Asn Thr Pro Leu
                85                  90                  95

Thr Phe Gly Gln Gly Thr Lys Val Glu Ile Lys
            100                 105

<210> SEQ ID NO 9
<211> LENGTH: 326
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 9

Ala Ser Thr Lys Gly Pro Ser Val Phe Pro Leu Ala Pro Cys Ser Arg
1               5                   10                  15

Ser Thr Ser Glu Ser Thr Ala Ala Leu Gly Cys Leu Val Lys Asp Tyr
            20                  25                  30

```
Phe Pro Glu Pro Val Thr Val Ser Trp Asn Ser Gly Ala Leu Thr Ser
            35                  40                  45

Gly Val His Thr Phe Pro Ala Val Leu Gln Ser Ser Gly Leu Tyr Ser
    50                  55                  60

Leu Ser Ser Val Val Thr Val Pro Ser Ser Asn Phe Gly Thr Gln Thr
65                  70                  75                  80

Tyr Thr Cys Asn Val Asp His Lys Pro Ser Asn Thr Lys Val Asp Lys
                85                  90                  95

Thr Val Glu Arg Lys Cys Cys Val Glu Cys Pro Pro Cys Pro Ala Pro
            100                 105                 110

Pro Val Ala Gly Pro Ser Val Phe Leu Phe Pro Pro Lys Pro Lys Asp
            115                 120                 125

Thr Leu Met Ile Ser Arg Thr Pro Glu Val Thr Cys Val Val Val Asp
            130                 135                 140

Val Ser Gln Glu Asp Pro Glu Val Gln Phe Asn Trp Tyr Val Asp Gly
145                 150                 155                 160

Val Glu Val His Asn Ala Lys Thr Lys Pro Arg Glu Glu Gln Phe Asn
                165                 170                 175

Ser Thr Tyr Arg Val Val Ser Val Leu Thr Val Leu His Gln Asp Trp
            180                 185                 190

Leu Asn Gly Lys Glu Tyr Lys Cys Lys Val Ser Asn Lys Gly Leu Pro
            195                 200                 205

Ser Ser Ile Glu Lys Thr Ile Ser Lys Ala Lys Gly Gln Pro Arg Glu
            210                 215                 220

Pro Gln Val Tyr Thr Leu Pro Pro Ser Gln Glu Met Thr Lys Asn
225                 230                 235                 240

Gln Val Ser Leu Thr Cys Leu Val Lys Gly Phe Tyr Pro Ser Asp Ile
                245                 250                 255

Ala Val Glu Trp Glu Ser Asn Gly Gln Pro Glu Asn Asn Tyr Lys Thr
            260                 265                 270

Thr Pro Pro Val Leu Asp Ser Asp Gly Ser Phe Phe Leu Tyr Ser Arg
            275                 280                 285

Leu Thr Val Asp Lys Ser Arg Trp Gln Glu Gly Asn Val Phe Ser Cys
            290                 295                 300

Ser Val Met His Glu Ala Leu His Asn His Tyr Thr Gln Lys Ser Leu
305                 310                 315                 320

Ser Leu Ser Leu Gly Lys
                325

<210> SEQ ID NO 10
<211> LENGTH: 447
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 10

Gln Val Gln Leu Val Gln Ser Gly Ala Glu Val Lys Lys Pro Gly Ala
1               5                   10                  15

Ser Val Lys Val Ser Cys Lys Ala Ser Gly Tyr Ile Phe Ser Asn Tyr
                20                  25                  30

Trp Ile Gln Trp Val Arg Gln Ala Pro Gly Gln Gly Leu Glu Trp Met
            35                  40                  45
```

Gly Glu Ile Leu Pro Gly Ser Gly Ser Thr Glu Tyr Thr Glu Asn Phe
50                      55                      60

Lys Asp Arg Val Thr Met Thr Arg Asp Thr Ser Thr Ser Thr Val Tyr
65                  70                  75                  80

Met Glu Leu Ser Ser Leu Arg Ser Glu Asp Thr Ala Val Tyr Tyr Cys
                85                  90                  95

Ala Arg Tyr Phe Phe Gly Ser Ser Pro Asn Trp Tyr Phe Asp Val Trp
            100                 105                 110

Gly Gln Gly Thr Leu Val Thr Val Ser Ser Ala Ser Thr Lys Gly Pro
        115                 120                 125

Ser Val Phe Pro Leu Ala Pro Cys Ser Arg Ser Thr Ser Glu Ser Thr
130                 135                 140

Ala Ala Leu Gly Cys Leu Val Lys Asp Tyr Phe Pro Glu Pro Val Thr
145                 150                 155                 160

Val Ser Trp Asn Ser Gly Ala Leu Thr Ser Gly Val His Thr Phe Pro
                165                 170                 175

Ala Val Leu Gln Ser Ser Gly Leu Tyr Ser Leu Ser Ser Val Val Thr
            180                 185                 190

Val Pro Ser Ser Asn Phe Gly Thr Gln Thr Tyr Thr Cys Asn Val Asp
        195                 200                 205

His Lys Pro Ser Asn Thr Lys Val Asp Lys Thr Val Glu Arg Lys Cys
210                 215                 220

Cys Val Glu Cys Pro Pro Cys Pro Ala Pro Pro Val Ala Gly Pro Ser
225                 230                 235                 240

Val Phe Leu Phe Pro Pro Lys Pro Lys Asp Thr Leu Met Ile Ser Arg
                245                 250                 255

Thr Pro Glu Val Thr Cys Val Val Val Asp Val Ser Gln Glu Asp Pro
            260                 265                 270

Glu Val Gln Phe Asn Trp Tyr Val Asp Gly Val Glu Val His Asn Ala
        275                 280                 285

Lys Thr Lys Pro Arg Glu Glu Gln Phe Asn Ser Thr Tyr Arg Val Val
290                 295                 300

Ser Val Leu Thr Val Leu His Gln Asp Trp Leu Asn Gly Lys Glu Tyr
305                 310                 315                 320

Lys Cys Lys Val Ser Asn Lys Gly Leu Pro Ser Ser Ile Glu Lys Thr
                325                 330                 335

Ile Ser Lys Ala Lys Gly Gln Pro Arg Glu Pro Gln Val Tyr Thr Leu
            340                 345                 350

Pro Pro Ser Gln Glu Glu Met Thr Asn Gln Val Ser Leu Thr Cys Leu
        355                 360                 365

Val Lys Gly Phe Tyr Pro Ser Asp Ile Ala Val Glu Trp Glu Ser Asn
370                 375                 380

Gly Gln Pro Glu Asn Asn Tyr Lys Thr Thr Pro Pro Val Leu Asp Ser
385                 390                 395                 400

Asp Gly Ser Phe Phe Leu Tyr Ser Arg Leu Thr Val Asp Lys Ser Arg
                405                 410                 415

Trp Gln Glu Gly Asn Val Phe Ser Cys Ser Val Met His Glu Ala Leu
            420                 425                 430

His Asn His Tyr Thr Gln Lys Ser Leu Ser Leu Ser Leu Gly Lys
        435                 440                 445

<210> SEQ ID NO 11
<211> LENGTH: 214
<212> TYPE: PRT

```
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 11

Asp Ile Gln Met Thr Gln Ser Pro Ser Ser Leu Ser Ala Ser Val Gly
1               5                   10                  15

Asp Arg Val Thr Ile Thr Cys Gly Ala Ser Glu Asn Ile Tyr Gly Ala
            20                  25                  30

Leu Asn Trp Tyr Gln Gln Lys Pro Gly Lys Ala Pro Lys Leu Leu Ile
        35                  40                  45

Tyr Gly Ala Thr Asn Leu Ala Asp Gly Val Pro Ser Arg Phe Ser Gly
    50                  55                  60

Ser Gly Ser Gly Thr Asp Phe Thr Leu Thr Ile Ser Ser Leu Gln Pro
65                  70                  75                  80

Glu Asp Phe Ala Thr Tyr Tyr Cys Gln Asn Val Leu Asn Thr Pro Leu
                85                  90                  95

Thr Phe Gly Gln Gly Thr Lys Val Glu Ile Lys Arg Thr Val Ala Ala
            100                 105                 110

Pro Ser Val Phe Ile Phe Pro Pro Ser Asp Glu Gln Leu Lys Ser Gly
        115                 120                 125

Thr Ala Ser Val Val Cys Leu Leu Asn Asn Phe Tyr Pro Arg Glu Ala
    130                 135                 140

Lys Val Gln Trp Lys Val Asp Asn Ala Leu Gln Ser Gly Asn Ser Gln
145                 150                 155                 160

Glu Ser Val Thr Glu Gln Asp Ser Lys Asp Ser Thr Tyr Ser Leu Ser
                165                 170                 175

Ser Thr Leu Thr Leu Ser Lys Ala Asp Tyr Glu Lys His Lys Val Tyr
            180                 185                 190

Ala Cys Glu Val Thr His Gln Gly Leu Ser Ser Pro Val Thr Lys Ser
        195                 200                 205

Phe Asn Arg Gly Glu Cys
    210

<210> SEQ ID NO 12
<211> LENGTH: 122
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 12

Gln Val Gln Leu Val Gln Ser Gly Ala Glu Val Lys Lys Pro Gly Ala
1               5                   10                  15

Ser Val Lys Val Ser Cys Lys Ala Ser Gly His Ile Phe Ser Asn Tyr
            20                  25                  30

Trp Ile Gln Trp Val Arg Gln Ala Pro Gly Gln Gly Leu Glu Trp Met
        35                  40                  45

Gly Glu Ile Leu Pro Gly Ser Gly His Thr Glu Tyr Thr Glu Asn Phe
    50                  55                  60

Lys Asp Arg Val Thr Met Thr Arg Asp Thr Ser Thr Ser Thr Val Tyr
65                  70                  75                  80

Met Glu Leu Ser Ser Leu Arg Ser Glu Asp Thr Ala Val Tyr Tyr Cys
                85                  90                  95
```

```
Ala Arg Tyr Phe Phe Gly Ser Ser Pro Asn Trp Tyr Phe Asp Val Trp
                100                 105                 110

Gly Gln Gly Thr Leu Val Thr Val Ser Ser
            115                 120

<210> SEQ ID NO 13
<211> LENGTH: 326
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 13

Ala Ser Thr Lys Gly Pro Ser Val Phe Pro Leu Ala Pro Cys Ser Arg
1               5                   10                  15

Ser Thr Ser Glu Ser Thr Ala Ala Leu Gly Cys Leu Val Lys Asp Tyr
                20                  25                  30

Phe Pro Glu Pro Val Thr Val Ser Trp Asn Ser Gly Ala Leu Thr Ser
            35                  40                  45

Gly Val His Thr Phe Pro Ala Val Leu Gln Ser Ser Gly Leu Tyr Ser
50                  55                  60

Leu Ser Ser Val Val Thr Val Pro Ser Ser Asn Phe Gly Thr Gln Thr
65                  70                  75                  80

Tyr Thr Cys Asn Val Asp His Lys Pro Ser Asn Thr Lys Val Asp Lys
                85                  90                  95

Thr Val Glu Arg Lys Cys Cys Val Glu Cys Pro Pro Cys Pro Ala Pro
            100                 105                 110

Pro Val Ala Gly Pro Ser Val Phe Leu Phe Pro Pro Lys Pro Lys Asp
        115                 120                 125

Thr Leu Met Ile Ser Arg Thr Pro Glu Val Thr Cys Val Val Val Asp
130                 135                 140

Val Ser Gln Glu Asp Pro Glu Val Gln Phe Asn Trp Tyr Val Asp Gly
145                 150                 155                 160

Val Glu Val His Asn Ala Lys Thr Lys Pro Arg Glu Glu Gln Phe Asn
                165                 170                 175

Ser Thr Tyr Arg Val Val Ser Val Leu Thr Val Leu His Gln Asp Trp
            180                 185                 190

Leu Asn Gly Lys Glu Tyr Lys Cys Lys Val Ser Asn Lys Gly Leu Pro
        195                 200                 205

Ser Ser Ile Glu Lys Thr Ile Ser Lys Ala Lys Gly Gln Pro Arg Glu
210                 215                 220

Pro Gln Val Tyr Thr Leu Pro Pro Ser Gln Glu Glu Met Thr Lys Asn
225                 230                 235                 240

Gln Val Ser Leu Thr Cys Leu Val Lys Gly Phe Tyr Pro Ser Asp Ile
                245                 250                 255

Ala Val Glu Trp Glu Ser Asn Gly Gln Pro Glu Asn Asn Tyr Lys Thr
            260                 265                 270

Thr Pro Pro Val Leu Asp Ser Asp Gly Ser Phe Phe Leu Tyr Ser Arg
        275                 280                 285

Leu Thr Val Asp Lys Ser Arg Trp Gln Glu Gly Asn Val Phe Ser Cys
290                 295                 300

Ser Val Leu His Glu Ala Leu His Ser His Tyr Thr Gln Lys Ser Leu
305                 310                 315                 320
```

```
Ser Leu Ser Leu Gly Lys
            325

<210> SEQ ID NO 14
<211> LENGTH: 448
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 14

Gln Val Gln Leu Val Gln Ser Gly Ala Glu Val Lys Lys Pro Gly Ala
1               5                   10                  15

Ser Val Lys Val Ser Cys Lys Ala Ser Gly His Ile Phe Ser Asn Tyr
            20                  25                  30

Trp Ile Gln Trp Val Arg Gln Ala Pro Gly Gln Gly Leu Glu Trp Met
        35                  40                  45

Gly Glu Ile Leu Pro Gly Ser Gly His Thr Glu Tyr Thr Glu Asn Phe
    50                  55                  60

Lys Asp Arg Val Thr Met Thr Arg Asp Thr Ser Thr Ser Thr Val Tyr
65                  70                  75                  80

Met Glu Leu Ser Ser Leu Arg Ser Glu Asp Thr Ala Val Tyr Tyr Cys
                85                  90                  95

Ala Arg Tyr Phe Phe Gly Ser Ser Pro Asn Trp Tyr Phe Asp Val Trp
            100                 105                 110

Gly Gln Gly Thr Leu Val Thr Val Ser Ser Ala Ser Thr Lys Gly Pro
        115                 120                 125

Ser Val Phe Pro Leu Ala Pro Cys Ser Arg Ser Thr Ser Glu Ser Thr
    130                 135                 140

Ala Ala Leu Gly Cys Leu Val Lys Asp Tyr Phe Pro Glu Pro Val Thr
145                 150                 155                 160

Val Ser Trp Asn Ser Gly Ala Leu Thr Ser Gly Val His Thr Phe Pro
                165                 170                 175

Ala Val Leu Gln Ser Ser Gly Leu Tyr Ser Leu Ser Ser Val Val Thr
            180                 185                 190

Val Pro Ser Ser Asn Phe Gly Thr Gln Thr Tyr Thr Cys Asn Val Asp
        195                 200                 205

His Lys Pro Ser Asn Thr Lys Val Asp Lys Thr Val Glu Arg Lys Cys
    210                 215                 220

Cys Val Glu Cys Pro Pro Cys Pro Ala Pro Pro Val Ala Gly Pro Ser
225                 230                 235                 240

Val Phe Leu Phe Pro Pro Lys Pro Lys Asp Thr Leu Met Ile Ser Arg
                245                 250                 255

Thr Pro Glu Val Thr Cys Val Val Val Asp Val Ser Gln Glu Asp Pro
            260                 265                 270

Glu Val Gln Phe Asn Trp Tyr Val Asp Gly Val Glu Val His Asn Ala
        275                 280                 285

Lys Thr Lys Pro Arg Glu Glu Gln Phe Asn Ser Thr Tyr Arg Val Val
    290                 295                 300

Ser Val Leu Thr Val Leu His Gln Asp Trp Leu Asn Gly Lys Glu Tyr
305                 310                 315                 320

Lys Cys Lys Val Ser Asn Lys Gly Leu Pro Ser Ser Ile Glu Lys Thr
                325                 330                 335
```

```
Ile Ser Lys Ala Lys Gly Gln Pro Arg Glu Pro Gln Val Tyr Thr Leu
                340                 345                 350

Pro Pro Ser Gln Glu Glu Met Thr Lys Asn Gln Val Ser Leu Thr Cys
            355                 360                 365

Leu Val Lys Gly Phe Tyr Pro Ser Asp Ile Ala Val Glu Trp Glu Ser
        370                 375                 380

Asn Gly Gln Pro Glu Asn Asn Tyr Lys Thr Thr Pro Pro Val Leu Asp
385                 390                 395                 400

Ser Asp Gly Ser Phe Phe Leu Tyr Ser Arg Leu Thr Val Asp Lys Ser
                405                 410                 415

Arg Trp Gln Glu Gly Asn Val Phe Ser Cys Ser Val Leu His Glu Ala
            420                 425                 430

Leu His Ser His Tyr Thr Gln Lys Ser Leu Ser Leu Ser Leu Gly Lys
        435                 440                 445

<210> SEQ ID NO 15
<211> LENGTH: 326
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 15

Ala Ser Thr Lys Gly Pro Ser Val Phe Pro Leu Ala Pro Cys Ser Arg
1               5                   10                  15

Ser Thr Ser Glu Ser Thr Ala Ala Leu Gly Cys Leu Val Lys Asp Tyr
            20                  25                  30

Phe Pro Glu Pro Val Thr Val Ser Trp Asn Ser Gly Ala Leu Thr Ser
        35                  40                  45

Gly Val His Thr Phe Pro Ala Val Leu Gln Ser Ser Gly Leu Tyr Ser
    50                  55                  60

Leu Ser Ser Val Val Thr Val Thr Ser Ser Asn Phe Gly Thr Gln Thr
65                  70                  75                  80

Tyr Thr Cys Asn Val Asp His Lys Pro Ser Asn Thr Lys Val Asp Lys
                85                  90                  95

Thr Val Glu Arg Lys Cys Cys Val Glu Cys Pro Pro Cys Pro Ala Pro
            100                 105                 110

Pro Val Ala Gly Pro Ser Val Phe Leu Phe Pro Pro Lys Pro Lys Asp
        115                 120                 125

Thr Leu Tyr Ile Thr Arg Glu Pro Glu Val Thr Cys Val Val Val Asp
    130                 135                 140

Val Ser His Glu Asp Pro Glu Val Gln Phe Asn Trp Tyr Val Asp Gly
145                 150                 155                 160

Met Glu Val His Asn Ala Lys Thr Lys Pro Arg Glu Glu Gln Phe Asn
                165                 170                 175

Ser Thr Phe Arg Val Val Ser Val Leu Thr Val Val His Gln Asp Trp
            180                 185                 190

Leu Asn Gly Lys Glu Tyr Lys Cys Lys Val Ser Asn Lys Gly Leu Pro
        195                 200                 205

Ala Pro Ile Glu Lys Thr Ile Ser Lys Thr Lys Gly Gln Pro Arg Glu
    210                 215                 220

Pro Gln Val Tyr Thr Leu Pro Pro Ser Arg Glu Glu Met Thr Lys Asn
225                 230                 235                 240
```

```
Gln Val Ser Leu Thr Cys Leu Val Lys Gly Phe Tyr Pro Ser Asp Ile
                245                 250                 255

Ala Val Glu Trp Glu Ser Asn Gly Gln Pro Glu Asn Asn Tyr Lys Thr
            260                 265                 270

Thr Pro Pro Met Leu Asp Ser Asp Gly Ser Phe Phe Leu Tyr Ser Lys
        275                 280                 285

Leu Thr Val Asp Lys Ser Arg Trp Gln Gln Gly Asn Val Phe Ser Cys
290                 295                 300

Ser Val Met His Glu Ala Leu His Asn His Tyr Thr Gln Lys Ser Leu
305                 310                 315                 320

Ser Leu Ser Pro Gly Lys
                325

<210> SEQ ID NO 16
<211> LENGTH: 448
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 16

Gln Val Gln Leu Val Gln Ser Gly Ala Glu Val Lys Lys Pro Gly Ala
1               5                   10                  15

Ser Val Lys Val Ser Cys Lys Ala Ser Gly Tyr Ile Phe Ser Asn Tyr
            20                  25                  30

Trp Ile Gln Trp Val Arg Gln Ala Pro Gly Gln Gly Leu Glu Trp Met
        35                  40                  45

Gly Glu Ile Leu Pro Gly Ser Gly Ser Thr Glu Tyr Thr Glu Asn Phe
    50                  55                  60

Lys Asp Arg Val Thr Met Thr Arg Asp Thr Ser Thr Ser Thr Val Tyr
65                  70                  75                  80

Met Glu Leu Ser Ser Leu Arg Ser Glu Asp Thr Ala Val Tyr Tyr Cys
                85                  90                  95

Ala Arg Tyr Phe Phe Gly Ser Ser Pro Asn Trp Tyr Phe Asp Val Trp
            100                 105                 110

Gly Gln Gly Thr Leu Val Thr Val Ser Ser Ala Ser Thr Lys Gly Pro
        115                 120                 125

Ser Val Phe Pro Leu Ala Pro Cys Ser Arg Ser Thr Ser Glu Ser Thr
    130                 135                 140

Ala Ala Leu Gly Cys Leu Val Lys Asp Tyr Phe Pro Glu Pro Val Thr
145                 150                 155                 160

Val Ser Trp Asn Ser Gly Ala Leu Thr Ser Gly Val His Thr Phe Pro
                165                 170                 175

Ala Val Leu Gln Ser Ser Gly Leu Tyr Ser Leu Ser Ser Val Val Thr
            180                 185                 190

Val Thr Ser Ser Asn Phe Gly Thr Gln Thr Tyr Thr Cys Asn Val Asp
        195                 200                 205

His Lys Pro Ser Asn Thr Lys Val Asp Lys Thr Val Glu Arg Lys Cys
    210                 215                 220

Cys Val Glu Cys Pro Pro Cys Pro Ala Pro Val Ala Gly Pro Ser
225                 230                 235                 240

Val Phe Leu Phe Pro Pro Lys Pro Lys Asp Thr Leu Tyr Ile Thr Arg
                245                 250                 255
```

```
Glu Pro Glu Val Thr Cys Val Val Asp Val Ser His Glu Asp Pro
            260                 265                 270

Glu Val Gln Phe Asn Trp Tyr Val Asp Gly Met Glu Val His Asn Ala
            275                 280                 285

Lys Thr Lys Pro Arg Glu Glu Gln Phe Asn Ser Thr Phe Arg Val Val
            290                 295                 300

Ser Val Leu Thr Val Val His Gln Asp Trp Leu Asn Gly Lys Glu Tyr
305                 310                 315                 320

Lys Cys Lys Val Ser Asn Lys Gly Leu Pro Ala Pro Ile Glu Lys Thr
                325                 330                 335

Ile Ser Lys Thr Lys Gly Gln Pro Arg Glu Pro Gln Val Tyr Thr Leu
            340                 345                 350

Pro Pro Ser Arg Glu Glu Met Thr Lys Asn Gln Val Ser Leu Thr Cys
            355                 360                 365

Leu Val Lys Gly Phe Tyr Pro Ser Asp Ile Ala Val Glu Trp Glu Ser
370                 375                 380

Asn Gly Gln Pro Glu Asn Asn Tyr Lys Thr Thr Pro Pro Met Leu Asp
385                 390                 395                 400

Ser Asp Gly Ser Phe Phe Leu Tyr Ser Lys Leu Thr Val Asp Lys Ser
                405                 410                 415

Arg Trp Gln Gln Gly Asn Val Phe Ser Cys Ser Val Met His Glu Ala
            420                 425                 430

Leu His Asn His Tyr Thr Gln Lys Ser Leu Ser Leu Ser Pro Gly Lys
            435                 440                 445

<210> SEQ ID NO 17
<211> LENGTH: 11
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 17

Gly Ala Ser Glu Asn Ile Tyr His Ala Leu Asn
1               5                   10

<210> SEQ ID NO 18
<211> LENGTH: 17
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 18

Glu Ile Leu Pro Gly Ser Gly His Thr Glu Tyr Thr Glu Asn Phe Lys
1               5                   10                  15

Asp

<210> SEQ ID NO 19
<211> LENGTH: 10
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"
```

<400> SEQUENCE: 19

Gly His Ile Phe Ser Asn Tyr Trp Ile Gln
1               5                   10

<210> SEQ ID NO 20
<211> LENGTH: 448
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 20

Gln Val Gln Leu Val Gln Ser Gly Ala Glu Val Lys Lys Pro Gly Ala
1               5                   10                  15

Ser Val Lys Val Ser Cys Lys Ala Ser Gly His Ile Phe Ser Asn Tyr
                20                  25                  30

Trp Ile Gln Trp Val Arg Gln Ala Pro Gly Gln Gly Leu Glu Trp Met
            35                  40                  45

Gly Glu Ile Leu Pro Gly Ser Gly His Thr Glu Tyr Thr Glu Asn Phe
        50                  55                  60

Lys Asp Arg Val Thr Met Thr Arg Asp Thr Ser Thr Ser Thr Val Tyr
65                  70                  75                  80

Met Glu Leu Ser Ser Leu Arg Ser Glu Asp Thr Ala Val Tyr Tyr Cys
                85                  90                  95

Ala Arg Tyr Phe Phe Gly Ser Ser Pro Asn Trp Tyr Phe Asp Val Trp
                100                 105                 110

Gly Gln Gly Thr Leu Val Thr Val Ser Ser Ala Ser Thr Lys Gly Pro
            115                 120                 125

Ser Val Phe Pro Leu Ala Pro Cys Ser Arg Ser Thr Ser Glu Ser Thr
        130                 135                 140

Ala Ala Leu Gly Cys Leu Val Lys Asp Tyr Phe Pro Glu Pro Val Thr
145                 150                 155                 160

Val Ser Trp Asn Ser Gly Ala Leu Thr Ser Gly Val His Thr Phe Pro
                165                 170                 175

Ala Val Leu Gln Ser Ser Gly Leu Tyr Ser Leu Ser Ser Val Val Thr
            180                 185                 190

Val Pro Ser Ser Asn Phe Gly Thr Gln Thr Tyr Thr Cys Asn Val Asp
        195                 200                 205

His Lys Pro Ser Asn Thr Lys Val Asp Lys Thr Val Glu Arg Lys Cys
    210                 215                 220

Cys Val Glu Cys Pro Pro Cys Pro Ala Pro Pro Val Ala Gly Pro Ser
225                 230                 235                 240

Val Phe Leu Phe Pro Pro Lys Pro Lys Asp Thr Leu Met Ile Ser Arg
                245                 250                 255

Thr Pro Glu Val Thr Cys Val Val Val Asp Val Ser Gln Glu Asp Pro
            260                 265                 270

Glu Val Gln Phe Asn Trp Tyr Val Asp Gly Val Glu Val His Asn Ala
        275                 280                 285

Lys Thr Lys Pro Arg Glu Glu Gln Phe Asn Ser Thr Tyr Arg Val Val
    290                 295                 300

Ser Val Leu Thr Val Leu His Gln Asp Trp Leu Asn Gly Lys Glu Tyr
305                 310                 315                 320

Lys Cys Lys Val Ser Asn Lys Gly Leu Pro Ser Ser Ile Glu Lys Thr
                325                 330                 335

-continued

```
Ile Ser Lys Ala Lys Gly Gln Pro Arg Glu Pro Gln Val Tyr Thr Leu
            340                 345                 350

Pro Pro Ser Gln Glu Glu Met Thr Lys Asn Gln Val Ser Leu Thr Cys
        355                 360                 365

Leu Val Lys Gly Phe Tyr Pro Ser Asp Ile Ala Val Glu Trp Glu Ser
370                 375                 380

Asn Gly Gln Pro Glu Asn Asn Tyr Lys Thr Thr Pro Pro Val Leu Asp
385                 390                 395                 400

Ser Asp Gly Ser Phe Phe Leu Tyr Ser Arg Leu Thr Val Asp Lys Ser
                405                 410                 415

Arg Trp Gln Glu Gly Asn Val Phe Ser Cys Ser Val Met His Glu Ala
            420                 425                 430

Leu His Asn His Tyr Thr Gln Lys Ser Leu Ser Leu Ser Leu Gly Lys
            435                 440                 445

<210> SEQ ID NO 21
<211> LENGTH: 5
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 21

Ser Tyr Ala Ile Ser
1               5

<210> SEQ ID NO 22
<211> LENGTH: 17
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 22

Gly Ile Gly Pro Phe Phe Gly Thr Ala Asn Tyr Ala Gln Lys Phe Gln
1               5                   10                  15

Gly

<210> SEQ ID NO 23
<211> LENGTH: 7
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 23

Asp Thr Pro Tyr Phe Asp Tyr
1               5

<210> SEQ ID NO 24
<211> LENGTH: 11
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"
```

```
<400> SEQUENCE: 24

Ser Gly Asp Ser Ile Pro Asn Tyr Tyr Val Tyr
1               5                   10

<210> SEQ ID NO 25
<211> LENGTH: 7
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 25

Asp Asp Ser Asn Arg Pro Ser
1               5

<210> SEQ ID NO 26
<211> LENGTH: 11
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 26

Gln Ser Phe Asp Ser Ser Leu Asn Ala Glu Val
1               5                   10

<210> SEQ ID NO 27
<211> LENGTH: 116
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 27

Gln Val Gln Leu Val Gln Ser Gly Ala Glu Val Lys Lys Pro Gly Ser
1               5                   10                  15

Ser Val Lys Val Ser Cys Lys Ala Ser Gly Gly Thr Phe Ser Ser Tyr
            20                  25                  30

Ala Ile Ser Val Trp Arg Gln Ala Pro Gly Gln Gly Leu Glu Trp Met
        35                  40                  45

Gly Gly Ile Gly Pro Phe Phe Gly Thr Ala Asn Tyr Ala Gln Lys Phe
    50                  55                  60

Gln Gly Arg Val Thr Ile Thr Ala Asp Glu Ser Thr Ser Thr Ala Tyr
65                  70                  75                  80

Met Glu Leu Ser Ser Leu Arg Ser Glu Asp Thr Ala Val Tyr Tyr Cys
                85                  90                  95

Ala Arg Asp Thr Pro Tyr Phe Asp Tyr Trp Gly Gln Gly Thr Leu Val
            100                 105                 110

Thr Val Ser Ser
        115

<210> SEQ ID NO 28
<211> LENGTH: 108
<212> TYPE: PRT
<213> ORGANISM: Artificial Sequence
<220> FEATURE:
<221> NAME/KEY: source
```

<223> OTHER INFORMATION: /note="Description of Artificial Sequence:
      Synthetic polypeptide"

<400> SEQUENCE: 28

Asp Ile Glu Leu Thr Gln Pro Pro Ser Val Ser Val Ala Pro Gly Gln
1               5                   10                  15

Thr Ala Arg Ile Ser Cys Ser Gly Asp Ser Ile Pro Asn Tyr Tyr Val
            20                  25                  30

Tyr Trp Tyr Gln Gln Lys Pro Gly Gln Ala Pro Val Leu Val Ile Tyr
        35                  40                  45

Asp Asp Ser Asn Arg Pro Ser Gly Ile Pro Glu Arg Phe Ser Gly Ser
    50                  55                  60

Asn Ser Gly Asn Thr Ala Thr Leu Thr Ile Ser Gly Thr Gln Ala Glu
65                  70                  75                  80

Asp Glu Ala Asp Tyr Tyr Cys Gln Ser Phe Asp Ser Ser Leu Asn Ala
                85                  90                  95

Glu Val Phe Gly Gly Gly Thr Lys Leu Thr Val Leu
            100                 105

<210> SEQ ID NO 29
<211> LENGTH: 4
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 29

Asn Tyr Ile Ser
1

<210> SEQ ID NO 30
<211> LENGTH: 17
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 30

Ile Ile Asp Pro Asp Asp Ser Tyr Thr Glu Tyr Ser Pro Ser Phe Gln
1               5                   10                  15

Gly

<210> SEQ ID NO 31
<211> LENGTH: 8
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 31

Tyr Glu Tyr Gly Gly Phe Asp Ile
1               5

<210> SEQ ID NO 32
<211> LENGTH: 11
<212> TYPE: PRT
<213> ORGANISM: Artificial Sequence
<220> FEATURE:

```
<221> NAME/KEY: source
<223> OTHER INFORMATION: /note="Description of Artificial Sequence:
      Synthetic peptide"

<400> SEQUENCE: 32

Ser Gly Asp Asn Ile Gly Asn Ser Tyr Val His
1               5                   10

<210> SEQ ID NO 33
<211> LENGTH: 7
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 33

Lys Asp Asn Asp Arg Pro Ser
1               5

<210> SEQ ID NO 34
<211> LENGTH: 9
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 34

Gly Thr Tyr Asp Ile Glu Ser Tyr Val
1               5

<210> SEQ ID NO 35
<211> LENGTH: 116
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 35

Glu Val Gln Leu Val Gln Ser Gly Ala Glu Val Lys Lys Pro Gly Glu
1               5                   10                  15

Ser Leu Lys Ile Ser Cys Lys Gly Ser Gly Tyr Ser Phe Thr Asn Tyr
            20                  25                  30

Ile Ser Trp Val Arg Gln Met Pro Gly Lys Gly Leu Glu Trp Met Gly
        35                  40                  45

Ile Ile Asp Pro Asp Asp Ser Tyr Thr Glu Tyr Ser Pro Ser Phe Gln
    50                  55                  60

Gly Gln Val Thr Ile Ser Ala Asp Lys Ser Ile Ser Thr Ala Tyr Leu
65                  70                  75                  80

Gln Trp Ser Ser Leu Lys Ala Ser Asp Thr Ala Met Tyr Tyr Cys Ala
                85                  90                  95

Arg Tyr Glu Tyr Gly Gly Phe Asp Ile Trp Gly Gln Gly Thr Leu Val
            100                 105                 110

Thr Val Ser Ser
        115

<210> SEQ ID NO 36
<211> LENGTH: 106
<212> TYPE: PRT
```

<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 36

Ser Tyr Glu Leu Thr Gln Pro Pro Ser Val Ser Ala Pro Gly Gln
1               5                   10                  15

Thr Ala Arg Ile Ser Cys Ser Gly Asp Asn Ile Gly Asn Ser Tyr Val
                20                  25                  30

His Trp Tyr Gln Gln Lys Pro Gly Gln Ala Pro Val Leu Val Ile Tyr
            35                  40                  45

Lys Asp Asn Asp Arg Pro Ser Gly Ile Pro Glu Arg Phe Ser Gly Ser
        50                  55                  60

Asn Ser Gly Asn Thr Ala Thr Leu Thr Ile Ser Gly Thr Gln Ala Glu
65                  70                  75                  80

Asp Glu Ala Asp Tyr Tyr Cys Gly Thr Tyr Asp Ile Glu Ser Tyr Val
                85                  90                  95

Phe Gly Gly Gly Thr Lys Leu Thr Val Leu
            100                 105

<210> SEQ ID NO 37
<211> LENGTH: 6
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 37

Ser Ser Tyr Tyr Val Ala
1               5

<210> SEQ ID NO 38
<211> LENGTH: 17
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 38

Ala Ile Tyr Thr Gly Ser Gly Ala Thr Tyr Lys Ala Ser Trp Ala Lys
1               5                   10                  15

Gly

<210> SEQ ID NO 39
<211> LENGTH: 13
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 39

Asp Gly Gly Tyr Asp Tyr Pro Thr His Ala Met His Tyr
1               5                   10

<210> SEQ ID NO 40
<211> LENGTH: 11

```
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 40

Gln Ala Ser Gln Asn Ile Gly Ser Ser Leu Ala
1               5                   10

<210> SEQ ID NO 41
<211> LENGTH: 7
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 41

Gly Ala Ser Lys Thr His Ser
1               5

<210> SEQ ID NO 42
<211> LENGTH: 12
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 42

Gln Ser Thr Lys Val Gly Ser Ser Tyr Gly Asn His
1               5                   10

<210> SEQ ID NO 43
<211> LENGTH: 123
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 43

Gln Val Gln Leu Val Glu Ser Gly Gly Gly Leu Val Gln Pro Gly Gly
1               5                   10                  15

Ser Leu Arg Leu Ser Cys Ala Ala Ser Gly Phe Thr Ser His Ser Ser
            20                  25                  30

Tyr Tyr Val Ala Trp Val Arg Gln Ala Pro Gly Lys Gly Leu Glu Trp
        35                  40                  45

Val Gly Ala Ile Tyr Thr Gly Ser Gly Ala Thr Tyr Lys Ala Ser Trp
    50                  55                  60

Ala Lys Gly Arg Phe Thr Ile Ser Lys Asp Thr Ser Lys Asn Gln Val
65                  70                  75                  80

Val Leu Thr Met Thr Asn Met Asp Pro Val Asp Thr Ala Thr Tyr Tyr
                85                  90                  95

Cys Ala Ser Asp Gly Gly Tyr Asp Tyr Pro Thr His Ala Met His Tyr
            100                 105                 110

Trp Gly Gln Gly Thr Leu Val Thr Val Ser Ser
        115                 120
```

```
<210> SEQ ID NO 44
<211> LENGTH: 110
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 44

Asp Val Val Met Thr Gln Ser Pro Ser Ser Leu Ser Ala Ser Val Gly
1               5                   10                  15

Asp Arg Val Thr Ile Thr Cys Gln Ala Ser Gln Asn Ile Gly Ser Ser
                20                  25                  30

Leu Ala Trp Tyr Gln Gln Lys Pro Gly Gln Ala Pro Arg Leu Leu Ile
            35                  40                  45

Tyr Gly Ala Ser Lys Thr His Ser Gly Val Pro Ser Arg Phe Ser Gly
50                  55                  60

Ser Gly Ser Gly Thr Asp Phe Thr Leu Thr Ile Ser Ser Leu Gln Pro
65                  70                  75                  80

Glu Asp Val Ala Thr Tyr Tyr Cys Gln Ser Thr Lys Val Gly Ser Ser
                85                  90                  95

Tyr Gly Asn His Phe Gly Gly Gly Thr Lys Val Glu Ile Lys
            100                 105                 110

<210> SEQ ID NO 45
<211> LENGTH: 451
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 45

Gln Val Gln Leu Val Glu Ser Gly Gly Gly Leu Val Gln Pro Gly Arg
1               5                   10                  15

Ser Leu Arg Leu Ser Cys Ala Ala Ser Gly Phe Thr Val His Ser Ser
                20                  25                  30

Tyr Tyr Met Ala Trp Val Arg Gln Ala Pro Gly Lys Gly Leu Glu Trp
            35                  40                  45

Val Gly Ala Ile Phe Thr Gly Ser Gly Ala Glu Tyr Lys Ala Glu Trp
50                  55                  60

Ala Lys Gly Arg Val Thr Ile Ser Lys Asp Thr Ser Lys Asn Gln Val
65                  70                  75                  80

Val Leu Thr Met Thr Asn Met Asp Pro Val Asp Thr Ala Thr Tyr Tyr
                85                  90                  95

Cys Ala Ser Asp Ala Gly Tyr Asp Tyr Pro Thr His Ala Met His Tyr
            100                 105                 110

Trp Gly Gln Gly Thr Leu Val Thr Val Ser Ser Ala Ser Thr Lys Gly
            115                 120                 125

Pro Ser Val Phe Pro Leu Ala Pro Ser Ser Lys Ser Thr Ser Gly Gly
            130                 135                 140

Thr Ala Ala Leu Gly Cys Leu Val Lys Asp Tyr Phe Pro Glu Pro Val
145                 150                 155                 160

Thr Val Ser Trp Asn Ser Gly Ala Leu Thr Ser Gly Val His Thr Phe
                165                 170                 175

Pro Ala Val Leu Gln Ser Ser Gly Leu Tyr Ser Leu Ser Ser Val Val
            180                 185                 190
```

Thr Val Pro Ser Ser Leu Gly Thr Gln Thr Tyr Ile Cys Asn Val
            195                 200                 205

Asn His Lys Pro Ser Asn Thr Lys Val Asp Lys Val Glu Pro Lys
210                 215                 220

Ser Cys Asp Lys Thr His Thr Cys Pro Pro Cys Pro Ala Pro Glu Leu
225                 230                 235                 240

Arg Arg Gly Pro Lys Val Phe Leu Phe Pro Pro Lys Pro Lys Asp Thr
            245                 250                 255

Leu Met Ile Ser Arg Thr Pro Glu Val Thr Cys Val Val Val Asp Val
            260                 265                 270

Ser His Glu Asp Pro Glu Val Lys Phe Asn Trp Tyr Val Asp Gly Val
            275                 280                 285

Glu Val His Asn Ala Lys Thr Lys Pro Arg Glu Glu Gln Tyr Asn Ser
290                 295                 300

Thr Tyr Arg Val Val Ser Val Leu Thr Val Leu His Gln Asp Trp Leu
305                 310                 315                 320

Asn Gly Lys Glu Tyr Lys Cys Lys Val Ser Asn Lys Gly Leu Pro Ser
            325                 330                 335

Ser Ile Glu Lys Thr Ile Ser Lys Ala Lys Gly Gln Pro Arg Glu Pro
            340                 345                 350

Gln Val Tyr Thr Leu Pro Pro Ser Arg Glu Glu Met Thr Lys Asn Gln
            355                 360                 365

Val Ser Leu Thr Cys Leu Val Lys Gly Phe Tyr Pro Ser Asp Ile Ala
370                 375                 380

Val Glu Trp Glu Ser Asn Gly Gln Pro Glu Asn Asn Tyr Lys Thr Thr
385                 390                 395                 400

Pro Pro Val Leu Asp Ser Asp Gly Ser Phe Phe Leu Tyr Ser Lys Leu
            405                 410                 415

Thr Val Asp Lys Ser Arg Trp Gln Gln Gly Asn Val Phe Ser Cys Ser
            420                 425                 430

Val Leu His Glu Ala Leu His Ala His Tyr Thr Arg Lys Glu Leu Ser
            435                 440                 445

Leu Ser Pro
    450

```
<210> SEQ ID NO 46
<211> LENGTH: 217
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 46
```

Asp Ile Gln Met Thr Gln Ser Pro Ser Ser Leu Ser Ala Ser Val Gly
1               5                   10                  15

Asp Arg Val Thr Ile Thr Cys Arg Ala Ser Gln Gly Ile Ser Ser Ser
            20                  25                  30

Leu Ala Trp Tyr Gln Gln Lys Pro Gly Lys Ala Pro Lys Leu Leu Ile
        35                  40                  45

Tyr Gly Ala Ser Glu Thr Glu Ser Gly Val Pro Ser Arg Phe Ser Gly
    50                  55                  60

Ser Gly Ser Gly Thr Asp Phe Thr Leu Thr Ile Ser Ser Leu Gln Pro
65                  70                  75                  80

-continued

```
Glu Asp Phe Ala Thr Tyr Tyr Cys Gln Asn Thr Lys Val Gly Ser Ser
                85                  90                  95

Tyr Gly Asn Thr Phe Gly Gly Thr Lys Val Glu Ile Lys Arg Thr
            100                 105                 110

Val Ala Ala Pro Ser Val Phe Ile Phe Pro Pro Ser Asp Glu Gln Leu
            115                 120                 125

Lys Ser Gly Thr Ala Ser Val Val Cys Leu Leu Asn Asn Phe Tyr Pro
        130                 135                 140

Arg Glu Ala Lys Val Gln Trp Lys Val Asp Asn Ala Leu Gln Ser Gly
145                 150                 155                 160

Asn Ser Gln Glu Ser Val Thr Glu Gln Asp Ser Lys Asp Ser Thr Tyr
                165                 170                 175

Ser Leu Ser Ser Thr Leu Thr Leu Ser Lys Ala Asp Tyr Glu Lys His
            180                 185                 190

Lys Val Tyr Ala Cys Glu Val Thr His Gln Gly Leu Ser Ser Pro Val
        195                 200                 205

Thr Lys Ser Phe Asn Arg Gly Glu Cys
    210                 215
```

DOSAGE AND ADMINISTRATION OF ANTI-C5 ANTIBODIES FOR TREATMENT OF ATYPICAL HEMOLYTIC UREMIC SYNDROME (aHUS) IN PEDIATRIC PATIENTS

CROSS-REFERENCE TO RELATED APPLICATIONS

This application is a 35 U.S.C. 371 national stage filing of International Application No. PCT/US2019/034297, filed on May 29, 2019, which claims priority to, and the benefit of, U.S. Provisional Application No. 62/680,121, filed Jun. 4, 2018, and U.S. Provisional Application No. 62/790,577, filed Jan. 10, 2019. The entire contents of the aforementioned applications are incorporated herein by reference.

SEQUENCE LISTING

The instant application contains a Sequence Listing that has been submitted electronically in ASCII format and is hereby incorporated by reference in its entirety. Said ASCII copy, created on Nov. 23, 2020, is named AXJ-237US_Sequence_Listing.txt and is 50, 702 bytes in size.

BACKGROUND

The complement system acts in conjunction with other immunological systems of the body to defend against intrusion of cellular and viral pathogens. There are at over 30 complement proteins, which are found as a complex collection of plasma proteins and membrane cofactors. The plasma proteins make up about 10% of the globulins in vertebrate serum. Complement components achieve their immune defensive functions by interacting in a series of intricate but precise enzymatic cleavage and membrane binding events. The resulting complement cascade leads to the production of products with opsonic, immunoregulatory and lytic functions.

While a properly functioning complement system provides a robust defense against infecting microbes, inappropriate regulation or activation of the complement pathways has been implicated in the pathogenesis of a variety of disorders, including atypical hemolytic uremic syndrome (aHUS). aHUS is an ultra-rare disorder driven by chronic uncontrolled complement activation. The resulting inflammation and cellular damage lead to the devastating clinical manifestations of these diseases.

Hemolytic uremic syndrome (HUS) is characterized by thrombocytopenia, microangiopathic hemolytic anemia and acute renal failure. HUS is classified as one of two types: diarrheal-associated (D− HUS; also referred to as shiga toxin producing E. coli (STEC)-HUS or typical HUS) and non-diarrheal or atypical HUS (aHUS). D+ HUS is the most common form, accounting for greater than 90% of cases and is caused by a preceding illness with a shiga-like toxin-producing bacterium, e.g., E. coli O157:H7.

Patients with aHUS, particularly children and adolescents, are at risk of substantial morbidity and mortality. Accordingly, it is an object of the compositions and methods described herein to provide improved treatments for human pediatric patients with aHUS.

SUMMARY

Provided herein are compositions and methods for treating atypical hemolytic uremic syndrome (aHUS) in a pediatric patient (e.g., a patient <18 years of age), comprising administering to the patient an anti-C5 antibody or antigen binding fragment thereof, wherein the anti-C5 antibody or antigen binding fragment thereof is administered (or is for administration) according to a particular clinical dosage regimen (e.g., at a particular dose amount and according to a specific dosing schedule). In one embodiment, the pediatric patient has not previously been treated with a complement inhibitor (e.g., the patient is a complement inhibitor treatment-naïve patient).

An exemplary anti-C5 antibody is ravulizumab (also known as ALXN1210 and antibody BNJ441) comprising the heavy and light chains having the sequences shown in SEQ ID NOs: 14 and 11, respectively, or antigen binding fragments and variants thereof. In other embodiments, the antibody comprises the heavy and light chain complementarity determining regions (CDRs) or variable regions (VRs) of ravulizumab. The terms ravulizumab, BNJ441, and ALXN1210 may be used interchangeably throughout this document, but all refer to the same antibody. In one embodiment, the antibody comprises the CDR1, CDR2 and CDR3 domains of the heavy chain variable (VH) region of ravulizumab having the sequence shown in SEQ ID NO:12, and the CDR1, CDR2 and CDR3 domains of the light chain variable (VL) region of ravulizumab having the sequence shown in SEQ ID NO:8. In another embodiment, the antibody comprises CDR1, CDR2 and CDR3 heavy chain sequences as set forth in SEQ ID NOs: 19, 18 and 3, respectively, and CDR1, CDR2 and CDR3 light chain sequences as set forth in SEQ ID NOs: 4, 5 and 6, respectively.

In another embodiment, the antibody comprises VH and VL regions having the amino acid sequences set forth in SEQ ID NO: 12 and SEQ ID NO:8, respectively.

In another embodiment, the antibody comprises a heavy chain constant region as set forth in SEQ ID NO:13.

In another embodiment, the antibody comprises a variant human Fc constant region that binds to human neonatal Fc receptor (FcRn), wherein the variant human Fc CH3 constant region comprises Met429Leu and Asn435Ser substitutions at residues corresponding to methionine428 and asparagine434, each according to the EU numbering convention.

In another embodiment, the antibody comprises CDR1, CDR2 and CDR3 heavy chain sequences as set forth in SEQ ID NOs: 19, 18 and 3, respectively, and CDR1, CDR2 and CDR3 light chain sequences as set forth in SEQ ID NOs: 4, 5 and 6, respectively and a variant human Fc constant region that binds to human neonatal Fc receptor (FcRn), wherein the variant human Fc CH3 constant region comprises Met429Leu and Asn435Ser substitutions at residues corresponding to methionine 428 and asparagine 434, each according to the EU numbering convention.

In another embodiment, the anti-C5 antibody comprises the heavy and light chain CDRs or variable regions of the BNJ421 antibody (described in PCT/US2015/019225 and U.S. Pat. No. 9,079,949). In another embodiment, the anti-C5 antibody comprises the heavy and light chain CDRs or variable regions of the 7086 antibody (see U.S. Pat. Nos. 8,241,628 and 8,883,158). In another embodiment, the anti-C5 antibody comprises the heavy and light chain CDRs or variable regions of the 8110 antibody (see U.S. Pat. Nos. 8,241,628 and 8,883,158). In another embodiment, the anti-C5 antibody comprises the heavy and light chain CDRs or variable regions of the 305LO5 antibody (see US2016/0176954A1). In another embodiment, the anti-C5 antibody comprises the heavy and light chain CDRs or variable regions of the SKY59 antibody (Fukuzawa, T., et al., *Sci. Rep.*, 7:1080, 2017).

In another embodiment, the antibody competes for binding with, and/or binds to the same epitope on C5 as any of the antibodies described herein. In another embodiment, the antibody has at least about 90% variable region amino acid sequence identity with any of the antibodies described herein (e.g., at least about 90%, 95% or 99% variable region identity with SEQ ID NO: 12 and SEQ ID NO:8). In another embodiment, the antibody binds to human C5 at pH 7.4 and 25 C with an affinity dissociation constant ($K_D$) that is ≤1 nM (e.g., from 0.1 nM to 1 nM). In another embodiment, the antibody binds to human C5 at pH 6.0 and 25 C with a $K_D$≥10 nM. In yet another embodiment, the [($K_D$ of the antibody or antigen-binding fragment thereof for human C5 at pH 6.0 and at 25 C)/($K_D$ of the antibody or antigen-binding fragment thereof for human C5 at pH 7.4 and at 25 C)] of the antibody is greater than 25.

In another embodiment, the patient has previously been treated with a different anti-C5 antibody or antigen binding fragment thereof (e.g., eculizumab) prior to treatment.

The pediatric patients treated according to the methods described herein are ≤18 years of age. In one embodiment, the pediatric patient is ≤12 years of age. In another embodiment, the pediatric patient is ≤6 years of age. In another embodiment, the pediatric patient is ≤2 years of age. In another embodiment, the pediatric patient is less than 1, 2, 3, 4, 5, 6, 7, 8, 9, 10, 11, 12, 13, 14, 15, 16, 17 or 18 years of age.

In one embodiment, the dose of the anti-C5 antibody or antigen binding fragment thereof, is based on the weight of the pediatric patient. In one embodiment, for example, about 300 mg, about 600 mg, about 900 mg, about 1200 mg, about 2100 mg, about 2700 mg, about 3000 mg, about 3300 mg and/or about 3600 mg of the anti-C5 antibody or antigen binding fragment thereof is administered to a pediatric patient based on the patient's weight. In one embodiment, 300 mg of the anti-C5 antibody or antigen binding fragment thereof is administered to a patient weighing ≥5 to <10 kg. In one embodiment, 600 mg of the anti-C5 antibody or antigen binding fragment thereof is administered to a patient weighing ≥5 to <10 kg. In another embodiment, 600 mg of the anti-C5 antibody or antigen binding fragment thereof is administered to a patient weighing ≥10 to <20 kg. In another embodiment, 900 mg or 2100 mg of the anti-C5 antibody or antigen binding fragment thereof is administered to a patient weighing ≥20 to <30 kg. In another embodiment, 1200 mg or 2700 mg of the anti-C5 antibody or antigen binding fragment thereof is administered to a patient weighing ≥30 to <40 kg. In another embodiment, 2400 mg or 3000 mg of the anti-C5 antibody or antigen binding fragment thereof is administered to a patient weighing ≥40 to <60 kg. In another embodiment, 2700 mg or 3300 mg of the anti-C5 antibody or antigen binding fragment thereof is administered to a patient weighing ≥60 to <100 kg. In another embodiment, 3000 mg or 3600 mg of the anti-C5 antibody or antigen binding fragment thereof is administered to a patient weighing ≥100 kg. In certain embodiments, dosage regimens are adjusted to provide the optimum desired response (e.g., an effective response).

In another embodiment, the anti-C5 antibody or antigen binding fragment thereof is administered for one or more administration cycles. In one embodiment, the administration cycle is 26 weeks. In one embodiment, the anti-C5 antibody or antigen binding fragment thereof is administered at a loading dose once on Day 1 of the administration cycle and then at a maintenance dose on Day 15 of the administration cycle and every four weeks thereafter. In another embodiment, the anti-C5 antibody or antigen binding fragment thereof is administered at a loading dose once on Day 1 of the administration cycle and then at a maintenance dose on Day 15 of the administration cycle and every eight weeks thereafter.

In another embodiment, a method of treating a human pediatric patient with Atypical Hemolytic Uremic Syndrome (aHUS), the method comprising administering to the patient an effective amount of an anti-C5 antibody or antigen binding fragment thereof, comprising CDR1, CDR2 and CDR3 heavy chain sequences as set forth in SEQ ID NOs: 19, 18 and 3, respectively, and CDR1, CDR2 and CDR3 light chain sequences as set forth in SEQ ID NOs: 4, 5 and 6, respectively, wherein the anti-C5 antibody or antigen binding fragment thereof, is administered: (a) once on Day 1 at a loading dose of: i. 600 mg to a patient weighing ≥5 to <10 kg, ii. 600 mg to a patient weighing ≥10 to <20 kg, iii. 900 mg to a patient weighing ≥20 to <30 kg, iv. 1200 mg to a patient weighing ≥30 to <40 kg, v. 2400 mg to a patient weighing ≥40 to <60 kg, vi. 2700 mg to a patient weighing ≥60 to <100 kg, or vii. 3000 mg to a patient weighing ≥100 kg; and (b) on Day 15 at a maintenance dose of: i. 300 mg to a patient weighing ≥5 to <10 kg, ii. 600 mg to a patient weighing ≥10 to <20 kg, iii. 2100 mg to a patient weighing ≥20 to <30 kg, iv. 2700 mg to a patient weighing ≥30 to <40 kg, v. 3000 mg to a patient weighing ≥40 to <60 kg, vi. 3300 mg to a patient weighing ≥60 to <100 kg, or vii. 3600 mg to a patient weighing ≥100 kg; wherein patients weighing <20 kg receive additional maintenance doses every four weeks thereafter, and patients weighing ≥20 kg receive additional maintenance doses every eight weeks thereafter.

In one embodiment, the disclosure is directed to a method of treating a human pediatric patient with Atypical Hemolytic Uremic Syndrome (aHUS), the method comprising administering to the patient an effective amount of an anti-C5 antibody or antigen binding fragment thereof, comprising CDR1, CDR2 and CDR3 heavy chain sequences as set forth in SEQ ID NOs: 19, 18 and 3, respectively, CDR1, CDR2 and CDR3 light chain sequences as set forth in SEQ ID NOs: 4, 5 and 6, respectively, and a variant human Fc constant region that binds to human neonatal Fc receptor (FcRn), wherein the variant human Fc CH3 constant region comprises Met429Leu and Asn435Ser substitutions at residues corresponding to methionine 428 and asparagine 434, each according to the EU numbering convention, wherein the anti-C5 antibody or antigen binding fragment thereof, is administered: (a) once on Day 1 at a loading dose of: i. 600 mg to a patient weighing ≥5 to <10 kg, ii. 600 mg to a patient weighing ≥10 to <20 kg, iii. 900 mg to a patient weighing ≥20 to <30 kg, iv. 1200 mg to a patient weighing ≥30 to <40 kg, v. 2400 mg to a patient weighing ≥40 to <60 kg, vi. 2700 mg to a patient weighing ≥60 to <100 kg, or vii. 3000 mg to a patient weighing ≥100 kg; and (b) on Day 15 at a maintenance dose of: i. 300 mg to a patient weighing ≥5 to <10 kg, ii. 600 mg to a patient weighing ≥10 to <20 kg, iii. 2100 mg to a patient weighing ≥20 to <30 kg, iv. 2700 mg to a patient weighing ≥30 to <40 kg, v. 3000 mg to a patient weighing ≥40 to <60 kg, vi. 3300 mg to a patient weighing ≥60 to <100 kg, or vii. 3600 mg to a patient weighing ≥100 kg; wherein patients weighing <20 kg receive additional maintenance doses every four weeks thereafter, and patients weighing ≥20 kg receive additional maintenance doses every eight weeks thereafter. In a particular embodiment, the anti-C5 antibody comprises a heavy chain variable region set forth in SEQ ID NO: 12 and a light chain variable region set forth in SEQ ID NO:8. In a particular embodiment, the anti-C5 antibody further comprises a heavy chain constant region set forth in SEQ ID NO:13. In a particular embodiment, the antibody comprises a heavy chain polypeptide comprising the amino acid sequence set forth in SEQ ID NO:14 and a light chain polypeptide comprising the amino acid sequence set forth in SEQ ID NO:11. In a particular embodiment, the anti-C5 antibody binds to human C5 at pH 7.4 and 25 C with an affinity dissociation constant ($K_D$) that is in the range 0.1 nM to 1 nM. In a particular embodiment, the anti-C5 antibody binds to human C5 at pH 6.0 and 25 C with a $K_D \geq 10$ nM. In a particular embodiment, the treatment maintains a serum trough concentration of the anti-C5 antibody or antigen binding fragment thereof of 100 g/mL or greater. In a particular embodiment, the treatment maintains a serum trough concentration of the anti-C5 antibody or antigen binding fragment thereof of 200 µg/mL or greater. In a particular embodiment, the treatment maintains a free C5 concentration of 0.309 to 0.5 µg/mL or lower. In a particular embodiment, the anti-C5 antibody is administered at a dose of 300 mg or 600 mg every four weeks after the treatment for up to two years. In a particular embodiment, the anti-C5 antibody is administered at a dose of 2100 mg, 2700 mg, 3000 mg, 3300 mg or 3600 mg every eight weeks after the treatment for up to two years. In a particular embodiment, the anti-C5 antibody is formulated for intravenous administration. In a particular embodiment, the patient has not previously been treated with a complement inhibitor. In a particular embodiment, the patient is <18 years of age. In a particular embodiment, the treatment is an administration cycle comprising a total of 26 weeks of treatment. In a particular embodiment, the treatment results in terminal complement inhibition. In a particular embodiment, the treatment results in a complete thrombotic microangiopathy (TMA) response (platelet count normalization, LDH normalization, and 25% improvement in serum creatinine from Baseline). In a particular embodiment, the treatment results in a ≥25% reduction in serum creatinine levels compared to baseline. In a particular embodiment, the treatment results in an increase in platelet count compared to baseline. In a particular embodiment, the treatment produces a reduction or cessation of at least one therapeutic marker selected from the group consisting of: severe hypertension, proteinuria, uremia, lethargy, fatigue, irritability, thrombocytopenia, microangiopathic hemolytic anemia and renal function impairment, compared to baseline. In a particular embodiment, the treatment produces a shift toward normal levels of a marker selected from the group consisting of: Factor Ba, soluble tumor necrosis factor receptor 1 (sTNFR1), soluble vascular adhesion molecule 1 (sVCAM1), thrombomodulin, D-dimer and cystatin C, compared to baseline. In a particular embodiment, the treatment produces a reduction in the need for blood transfusions compared to baseline. In a particular embodiment, the treatment produces a reduction in major adverse vascular events (MAVEs) compared to baseline. In a particular embodiment, the treatment produces a change from baseline in quality of life, assessed via the Functional Assessment of Chronic Illness Therapy (FACIT)-Fatigue Scale, version 4 or the European Organisation for Research and Treatment of Cancer, Quality of Life Questionnaire-Core 30 Scale compared to baseline.

In another embodiment, lactate dehydrogenase (LDH) levels are used to evaluate responsiveness to a therapy (e.g., a reduction of hemolysis compared to baseline as assessed by LDH levels is indicative of an improvement in at least one sign of aHUS). In one embodiment, patients treated according to the disclosed methods experience reductions in LDH levels compared to baseline to near normal levels or to within 10%, or within 20% above what is considered the normal level (e.g., within 105-333 IU/L (international units per liter)). In another embodiment, the patient's LDH levels are normalized throughout maintenance period of treatment. In another embodiment, the treated patient's LDH levels are normalized at least at least 95% of the time while on the maintenance period of treatment. In another embodiment, the treated patient's LDH levels are normalized at least at least 90%, 85% or 80% of the time while on the maintenance period of treatment. In one embodiment, the patient's LDH levels are ≥1.5 fold above the upper limit of normal (LDH≥1.5×ULN) prior to initiating treatment.

In one embodiment, the disclosure is directed to a kit for treating Atypical Hemolytic Uremic Syndrome (aHUS) in a human pediatric patient, the kit comprising: (a) a dose of an anti-C5 antibody or antigen binding fragment thereof, comprising CDR1, CDR2 and CDR3 domains of the heavy chain variable region having the sequence set forth in SEQ ID NO: 12, and CDR1, CDR2 and CDR3 domains of the light chain variable region having the sequence set forth in SEQ ID NO:8; and (b) instructions for using the anti-C5 antibody or antigen binding fragment thereof in the method of claim 1 or 2. In a particular embodiment, the anti-C5 antibody, or antigen binding fragment thereof, is administered to a patient weighing ≥5 to <10 kg: (a) once on Day 1 at a loading dose of 600 mg; and (b) once on Day 15 at a maintenance dose of 300 mg and every four weeks thereafter. In a particular embodiment, the anti-C5 antibody or antigen binding fragment thereof is administered to a patient weighing ≥10 to <20 kg: (a) once on Day 1 at a loading dose of 600 mg; and (b) once on Day 15 at a maintenance dose of 600 mg and every four weeks thereafter. In a particular embodiment, the anti-C5 antibody or antigen binding fragment thereof is administered to a patient weighing ≥20 to <30 kg: (a) once on Day 1 at a loading dose of 900 mg; and (b) once on Day 15 at a maintenance dose of 2100 mg and every eight weeks thereafter. In a particular embodiment, the anti-C5 antibody or antigen binding fragment thereof is administered to a patient weighing ≥30 to <40 kg: (a) once on Day 1 at a loading dose of 1200 mg; and (b) once on Day 15 at a maintenance dose of 2700 mg and every eight weeks thereafter. In a particular embodiment, the anti-C5 antibody or antigen binding fragment thereof is administered to a patient weighing ≥40 to <60 kg: (a) once on Day 1 at a loading dose of 2400 mg; and (b) once on Day 15 at a maintenance dose of 3000 mg and every eight weeks thereafter. In a particular embodiment, the anti-C5 antibody or antigen binding fragment thereof is administered to a patient weighing ≥60 to <100 kg: (a) once on Day 1 at a loading dose of 2700 mg; and (b) once on Day 15 at a maintenance dose of 3300 mg and every eight weeks thereafter. In a particular embodiment, the anti-C5 antibody or antigen binding fragment thereof is administered to a patient weighing ≥100 kg: (a) once on Day 1 at a loading dose of 3000 mg; and (b) once on Day 15 at a maintenance dose of 3600 mg and every eight weeks thereafter.

In one embodiment, the disclosure is directed to an anti-C5 antibody or antigen binding fragment thereof comprising CDR1, CDR2 and CDR3 domains of the heavy chain variable region having the sequence set forth in SEQ ID NO: 12, and CDR1, CDR2 and CDR3 domains of the light chain variable region having the sequence set forth in SEQ ID NO:8, wherein the anti-C5 antibody or antigen binding fragment thereof is administered: (a) once on Day 1 at a loading dose of: i. 600 mg to a patient weighing ≥5 to <10 kg, ii. 600 mg to a patient weighing ≥10 to <20 kg, iii. 900 mg to a patient weighing ≥20 to <30 kg, iv. 1200 mg to a patient weighing ≥30 to <40 kg, v. 2400 mg to a patient weighing ≥40 to <60 kg, vi. 2700 mg to a patient weighing ≥60 to <100 kg, or vii. 3000 mg to a patient weighing ≥100 kg; and (b) on Day 15 at a maintenance dose of: i. 300 mg to a patient weighing ≥5 to <10 kg, ii. 600 mg to a patient weighing ≥10 to <20 kg, iii. 2100 mg to a patient weighing ≥20 to <30 kg, iv. 2700 mg to a patient weighing ≥30 to <40 kg, v. 3000 mg to a patient weighing ≥40 to <60 kg, vi. 3300 mg to a patient weighing ≥60 to <100 kg, or vii. 3600 mg to a patient weighing ≥100 kg; wherein patients weighing <20 kg receive additional maintenance doses every four weeks thereafter, and patients weighing ≥20 kg receive additional maintenance doses every eight weeks thereafter. In a particular embodiment, the antibody is determined to be safe, tolerable, efficacious and sufficiently non-immunogenic after multiple IV doses in aHUS patients.

In another embodiment, the anti-C5 antibody is administered on a monthly basis (e.g., every four weeks) or every other month basis (e.g., every eight weeks) after completion of the treatment (e.g., administration cycle). In another embodiment, the anti-C5 antibody or antigen binding fragment thereof is administered on a monthly basis or every other month basis for a year after completion of the treatment (e.g., administration cycle). In another embodiment, the anti-C5 antibody or antigen binding fragment thereof is administered on a monthly basis or every other month basis for two, three, four, or five years after completion of the treatment (e.g., administration cycle). In a particular embodiment, the anti-C5 antibody or antigen binding fragment thereof is administered on a monthly basis or every other month basis for up to two years after completion of the treatment (e.g., administration cycle).

In another aspect, the treatment regimens described are sufficient to maintain particular serum trough concentrations of the anti-C5 antibody or antigen binding fragment thereof. In one embodiment, the treatment maintains a serum trough concentration of the anti-C5 antibody or antigen binding fragment thereof of 50, 55, 60, 65, 70, 75, 80, 85, 90, 95, 100, 105, 110, 115, 120, 125, 130, 135, 140, 145, 150, 155, 160, 165, 170, 175, 180, 185, 190, 200, 205, 210, 215, 220, 225, 230, 240, 245, 250, 255, 260, 265, 270, 280, 290, 300, 305, 310, 315, 320, 325, 330, 335, 340, 345, 350, 355, 360, 365, 370, 375, 380, 385, 390, 395 or 400 µg/mL or greater. In one embodiment, the treatment maintains a serum trough concentration of the anti-C5 antibody or antigen binding fragment thereof of 100 µg/mL or greater, 150 µg/mL or greater, 200 µg/mL or greater, 250 µg/mL or greater, or 300 µg/mL or greater. In another embodiment, the treatment maintains a serum trough concentration of the anti-C5 antibody or antigen binding fragment thereof of between 100 µg/mL and 200 µg/mL. In another embodiment, the treatment maintains a serum trough concentration of the anti-C5 antibody or antigen binding fragment thereof of about 175 µg/mL.

In another embodiment, to obtain an effective response, the anti-C5 antibody is administered to the patient in an amount and with a frequency to maintain at least 50 µg, 55 µg, 60 µg, 65 µg, 70 µg, 75 µg, 80 µg, 85 µg, 90 µg, 95 µg, 100 µg, 105 µg, 110 µg, 115 µg, 120 µg, 125 µg, 130 µg, 135 µg, 140 µg, 145 µg, 150 µg, 155 µg, 160 µg, 165 µg, 170 µg, 175 µg, 180 µg, 185 µg, 190 µg, 195 µg, 200 µg, 205 µg, 210 µg, 215 µg, 220 µg, 225 µg, 230 µg, 235 µg, 240 µg, 245 µg, 250 µg, 255 µg or 260 µg of antibody per milliliter of the patient's blood. In another embodiment, the anti-C5 antibody is administered to the patient in an amount and with a frequency to maintain between 50 µg and 250 µg of antibody per milliliter of the patient's blood. In another embodiment, the anti-C5 antibody is administered to the patient in an amount and with a frequency to maintain between 100 µg and 200 µg of antibody per milliliter of the patient's blood. In another embodiment, the anti-C5 antibody is administered to the patient in an amount and with a frequency to maintain about 175 µg of antibody per milliliter of the patient's blood.

In another embodiment, to obtain an effective response, the anti-C5 antibody is administered to the patient in an amount and with a frequency to maintain a minimum free C5 concentration. In one embodiment, for example, the anti-C5 antibody is administered to the patient in an amount and with a frequency to maintain a free C5 concentration of 0.5 µg/mL, 0.4 µg/mL, 0.3 µg/mL, 0.2 µg/mL or lower. In another embodiment, the anti-C5 antibody is administered to the patient in an amount and with a frequency to maintain a free C5 concentration of 0.309 to 0.5 µg/mL or lower.

In another embodiment, the treatment results in a complete thrombotic microangiopathy (TMA) response. In another embodiment, the treatment results in a complete thrombotic microangiopathy response (cTMA) that is sustained for more than 170 days (e.g., more than 171 days, 172 days, 173 days, 174 days, 175 days, 176 days, 177 days, 178 days, 179 days, 180 days, 181 days, 182 days 183 days, 184 days, 185 days, 186 days, 187 days, 188 days, 189 days, 190 days, 191 days, 192 days, 193 days, 194 days, 195 days, 196 days, 197 days, 198 days, 199 days, 200 days, 205 days, 210 days, 215 days, 220 days or 225 days) after initiating treatment.

In another embodiment, the treatment results in reduction in serum creatinine levels compared to baseline. In a particular embodiment, the treatment results in a ≥25% reduction in serum creatinine levels compared to baseline.

In another embodiment, the treatment eliminates the need for the patient to receive dialysis. In another embodiment, the patient is weaned off dialysis within 35 days or fewer (e.g., 35 days, 34 days, 33 days, 32 days, 31 days, 30 days, 29 days, 28 days, 27 days, 26 days, 25 days, 24 days, 23 days, 22 days, 21 days, 20 days, 19 days, 18 days, 17 days, 16 days, 15 days, 14 days, 13 days, 12 days, 11 days or 10 days) of initiating treatment.

In another embodiment, the treatment produces a change from baseline in quality of life as assessed via the Functional Assessment of Chronic Illness Therapy (FACIT)-Fatigue Scale, version 4 and the European Organisation for Research and Treatment of Cancer, Quality of Life Questionnaire-Core 30 Scale. In one embodiment, the treatment produces a change from baseline in quality of life as assessed via the FACIT-Fatigue Scale by one or more (e.g., 1, 2 or 3) points. In another embodiment, the treatment produces a change from baseline in quality of life as assessed via the FACIT-Fatigue Scale by 3 points 150 days or more (e.g., 150 days, 151 days, 152 days, 153 days, 154 days, 155 days, 156 days, 157 days, 158 days, 159 days, 160 days, 161 days, 162 days, 163 days, 164 days, 165 days, 166 days, 167 days, 168 days, 169 days, 170 days, 171 days, 172 days, 173 days, 174 days, 175 days, 176 days, 177 days, 178 days, 179 days, 180 days, 181 days, 182 days 183 days, 184 days, 185 days, 186 days, 187 days, 188 days, 189 days, 190 days, 191 days, 192 days, 193 days, 194 days, 195 days, 196 days, 197 days, 198 days, 199 days, 200 days, 205 days, 210 days, 215 days, 220 days or 225 days) after initiating treatment.

In another embodiment, the patient's chronic kidney disease (CKD) improves by one or more stages after initiating treatment, e.g., by one, two, three, four or five stages). In another embodiment, the patient's CKD improves by one or more stages 150 days or more (e.g., 150 days, 151 days, 152 days, 153 days, 154 days, 155 days, 156 days, 157 days, 158 days, 159 days, 160 days, 161 days, 162 days, 163 days, 164 days, 165 days, 166 days, 167 days, 168 days, 169 days, 170 days, 171 days, 172 days, 173 days, 174 days, 175 days, 176 days, 177 days, 178 days, 179 days, 180 days, 181 days, 182 days 183 days, 184 days, 185 days, 186 days, 187 days, 188 days, 189 days, 190 days, 191 days, 192 days, 193 days, 194 days, 195 days, 196 days, 197 days, 198 days, 199 days, 200 days, 205 days, 210 days, 215 days, 220 days or 225 days) after initiating treatment.

DETAILED DESCRIPTION

I. Definitions

Figure 1:
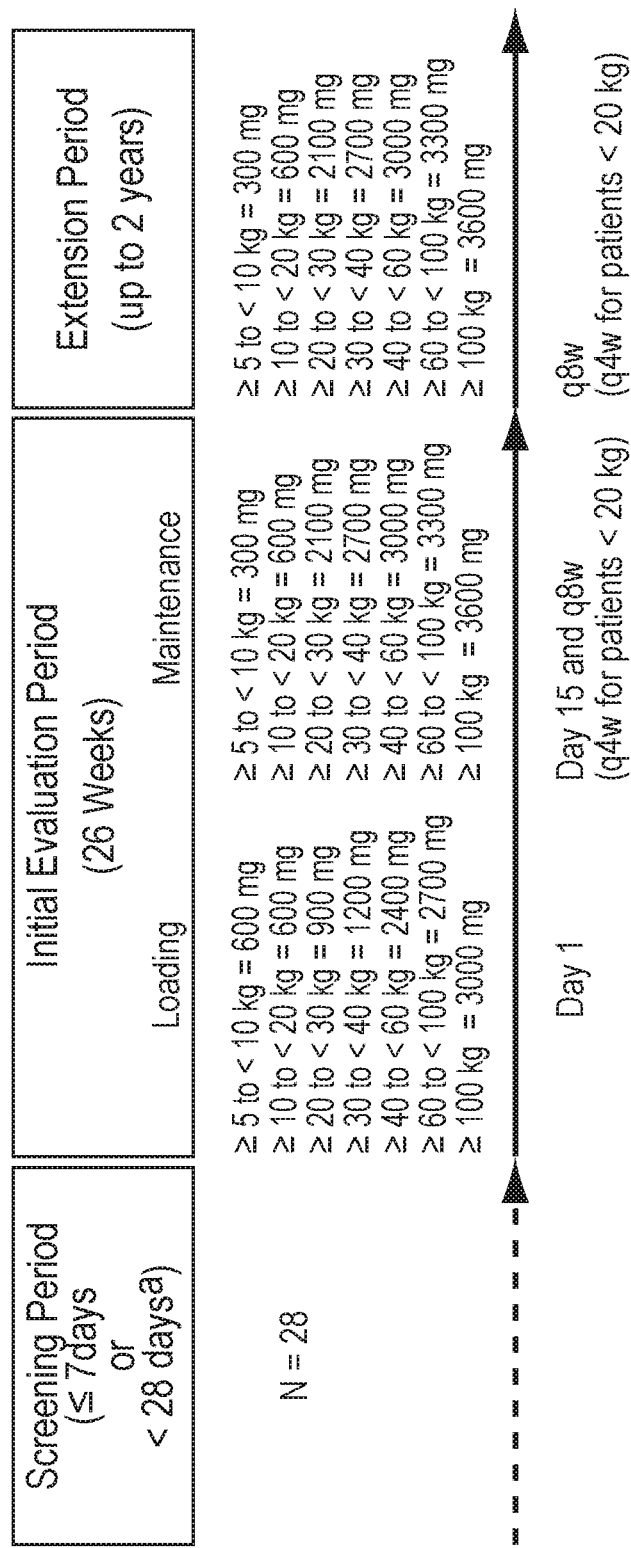
FIG. 1 is a schematic depicting the design of the dose regimen study.

As used herein, the term "subject" or "patient" is a human patient (e.g., a pediatric patient having aHUS).

As used herein, "effective treatment" refers to treatment producing a beneficial effect, e.g., amelioration of at least one symptom of a disease or disorder. A beneficial effect can take the form of an improvement over baseline, i.e., an improvement over a measurement or observation made prior to initiation of therapy according to the method. Effective treatment may refer to alleviation of at least one symptom of aHUS (e.g., severe hypertension, proteinuria, uremia, lethargy/fatigue, irritability, thrombocytopenia, microangiopathic hemolytic anemia, and renal function impairment (e.g., acute renal failure)).

The term "effective amount" refers to an amount of an agent that provides the desired biological, therapeutic and/or prophylactic result. That result can be reduction, amelioration, palliation, lessening, delaying, and/or alleviation of one or more of the signs, symptoms, or causes of a disease, or any other desired alteration of a biological system. In one example, an "effective amount" is the amount of anti-C5 antibody, or antigen binding fragment thereof, clinically proven to alleviate at least one symptom of aHUS (e.g., severe hypertension, proteinuria, uremia, lethargy/fatigue, irritability, thrombocytopenia, microangiopathic hemolytic anemia and renal function impairment (e.g., acute renal failure)). An "effective amount" can be administered in one or more administrations.

As used herein, the terms "induction" and "induction phase" are used interchangeably and refer to the first phase of treatment in the clinical trial setting or as part of a patient treatment regimen.

As used herein, the terms "maintenance" and "maintenance phase" are used interchangeably and refer to the second phase of treatment in the clinical trial setting or as part of a patient treatment regimen. In certain embodiments, treatment is continued as long as clinical benefit is observed or until unmanageable toxicity or disease progression occurs.

As used herein, the term "serum trough level" refers to the lowest level that the agent (e.g., the anti-C5 antibody or antigen binding fragment thereof) or medicine is present in the serum. In contrast, a "peak serum level" refers to the highest level of the agent in the serum. The "average serum level" refers to the mean level of the agent in the serum over time.

The term "antibody" describes a polypeptide comprising at least one antibody-derived antigen binding site (e.g., VH/VL region or Fv, or CDR). Antibodies include known forms of antibodies, e.g., the antibody can be a human antibody, a humanized antibody, a bispecific antibody or a chimeric antibody. The antibody also can be a Fab, Fab'2, ScFv, SMIP, Affibody®, nanobody or a single-domain antibody. The antibody also can be of any of the following isotypes: IgG1, IgG2, IgG3, IgG4, IgM, IgA1, IgA2, IgAsec, IgD, IgE or combinations thereof. The antibody can be a naturally occurring antibody or an antibody that has been altered by a protein engineering technique (e.g., by mutation, deletion, substitution, conjugation to a non-antibody moiety). An antibody can include, for example, one or more variant amino acids (compared to a naturally occurring antibody) that change a property (e.g., a functional property) of the antibody. Numerous such alterations are known in the art that affect, e.g., half-life, effector function, and/or immune responses to the antibody in a patient. The term antibody also includes artificial or engineered polypeptide constructs that comprise at least one antibody-derived antigen binding site.

II. Anti-C5 Antibodies

Anti-C5 antibodies described herein bind to complement component C5 (e.g., human C5) and inhibit the cleavage of C5 into fragments C5a and C5b. As described above, such antibodies also have, for example, improved pharmacokinetic properties relative to other anti-C5 antibodies (e.g., eculizumab) used for therapeutic purposes.

Anti-C5 antibodies (or VH/VL domains derived therefrom) suitable for use in the methods described herein can be generated using methods known in the art. Alternatively, art recognized anti-C5 antibodies can be used. Antibodies that compete for binding to C5 with any of these art recognized antibodies or antibodies described herein can also be used.

An exemplary anti-C5 antibody is ravulizumab comprising heavy and light chains having the sequences shown in SEQ ID NOs: 14 and 11, respectively, or antigen binding fragments and variants thereof. Ravulizumab (also known as BNJ441 and ALXN1210) is described in PCT/US2015/019225 and U.S. Pat. No. 9,079,949, the entire teachings of which are hereby incorporated by reference. The terms ravulizumab, BNJ441, and ALXN1210 may be used interchangeably throughout this document, but all refer to the same antibody. Ravulizumab selectively binds to human complement protein C5, inhibiting its cleavage to C5a and C5b during complement activation. This inhibition prevents the release of the proinflammatory mediator C5a and the formation of the cytolytic pore-forming membrane attack complex (MAC) C5b-9 while preserving the proximal or early components of complement activation (e.g., C3 and C3b) essential for the opsonization of microorganisms and clearance of immune complexes.

In other embodiments, the antibody comprises the heavy and light chain CDRs or variable regions of ravulizumab. Accordingly, in one embodiment, the antibody comprises the CDR1, CDR2 and CDR3 domains of the VH region of ravulizumab having the sequence set forth in SEQ ID NO: 12, and the CDR1, CDR2 and CDR3 domains of the VL region of ravulizumab having the sequence set forth in SEQ ID NO:8. In another embodiment, the antibody comprises heavy chain CDR1, CDR2 and CDR3 domains having the sequences set forth in SEQ ID NOs: 19, 18 and 3, respectively, and light chain CDR1, CDR2 and CDR3 domains having the sequences set forth in SEQ ID NOs: 4, 5 and 6, respectively. In another embodiment, the antibody comprises VH and VL regions having the amino acid sequences set forth in SEQ ID NO: 12 and SEQ ID NO:8, respectively.

Another exemplary anti-C5 antibody is antibody BNJ421 comprising heavy and light chains having the sequences shown in SEQ ID NOs: 20 and 11, respectively, or antigen binding fragments and variants thereof. BNJ421 (also known as ALXN1211) is described in PCT/US2015/019225 and U.S. Pat. No. 9,079,949, the entire teachings of which are hereby incorporated by reference.

In other embodiments, the antibody comprises the heavy and light chain CDRs or variable regions of BNJ421. Accordingly, in one embodiment, the antibody comprises the CDR1, CDR2 and CDR3 domains of the VH region of BNJ421 having the sequence set forth in SEQ ID NO: 12, and the CDR1, CDR2 and CDR3 domains of the VL region of BNJ421 having the sequence set forth in SEQ ID NO:8. In another embodiment, the antibody comprises heavy chain CDR1, CDR2 and CDR3 domains having the sequences set forth in SEQ ID NOs: 19, 18 and 3, respectively, and light chain CDR1, CDR2 and CDR3 domains having the sequences set forth in SEQ ID NOs: 4, 5 and 6, respectively. In another embodiment, the antibody comprises VH and VL regions having the amino acid sequences set forth in SEQ ID NO: 12 and SEQ ID NO: 8, respectively.

The exact boundaries of CDRs are defined differently according to different methods. In some embodiments, the positions of the CDRs or framework regions within a light or heavy chain variable domain are as defined by Kabat et al. [(1991) "Sequences of Proteins of Immunological Interest." NIH Publication No. 91-3242, U.S. Department of Health and Human Services, Bethesda, MD]. In such cases, the CDRs can be referred to as "Kabat CDRs" (e.g., "Kabat LCDR2" or "Kabat HCDR1"). In some embodiments, the positions of the CDRs of a light or heavy chain variable region are as defined by Chothia et al. (Nature, 342:877-83, 1989). Accordingly, these regions can be referred to as "Chothia CDRs" (e.g., "Chothia LCDR2" or "Chothia HCDR3"). In some embodiments, the positions of the CDRs of the light and heavy chain variable regions can be defined by a Kabat-Chothia combined definition. In such embodiments, these regions can be referred to as "combined Kabat-Chothia CDRs." Thomas, C. et al. (Mol. Immunol., 33:1389-401, 1996) exemplifies the identification of CDR boundaries according to Kabat and Chothia numbering schemes.

Another exemplary anti-C5 antibody is the 7086 antibody described in U.S. Pat. Nos. 8,241,628 and 8,883,158. In one embodiment, the antibody comprises the heavy and light chain CDRs or variable regions of the 7086 antibody (see U.S. Pat. Nos. 8,241,628 and 8,883,158). In another embodiment, the antibody, or antigen binding fragment thereof, comprises heavy chain CDR1, CDR2 and CDR3 domains having the sequences set forth in SEQ ID NOs: 21, 22 and 23, respectively, and light chain CDR1, CDR2 and CDR3 domains having the sequences set forth in SEQ ID NOs: 24, 25 and 26, respectively. In another embodiment, the antibody, or antigen binding fragment thereof, comprises the VH region of the 7086 antibody having the sequence set forth in SEQ ID NO:27, and the VL region of the 7086 antibody having the sequence set forth in SEQ ID NO:28.

Another exemplary anti-C5 antibody is the 8110 antibody also described in U.S. Pat. Nos. 8,241,628 and 8,883,158. In one embodiment, the antibody comprises the heavy and light chain CDRs or variable regions of the 8110 antibody. In another embodiment, the antibody, or antigen binding fragment thereof, comprises heavy chain CDR1, CDR2 and CDR3 domains having the sequences set forth in SEQ ID NOs: 29, 30 and 31, respectively, and light chain CDR1, CDR2 and CDR3 domains having the sequences set forth in SEQ ID NOs: 32, 33 and 34, respectively. In another embodiment, the antibody comprises the VH region of the 8110 antibody having the sequence set forth in SEQ ID NO:35, and the VL region of the 8110 antibody having the sequence set forth in SEQ ID NO:36.

Another exemplary anti-C5 antibody is the 305LO5 antibody described in US2016/0176954A1. In one embodiment, the antibody comprises the heavy and light chain CDRs or variable regions of the 305LO5 antibody. In another embodiment, the antibody, or antigen binding fragment thereof, comprises heavy chain CDR1, CDR2 and CDR3 domains having the sequences set forth in SEQ ID NOs: 37, 38 and 39, respectively, and light chain CDR1, CDR2 and CDR3 domains having the sequences set forth in SEQ ID NOs: 40, 41 and 42, respectively. In another embodiment, the antibody comprises the VH region of the 305LO5 antibody having the sequence set forth in SEQ ID NO:43, and the VL region of the 305LO5 antibody having the sequence set forth in SEQ ID NO:44.

Another exemplary anti-C5 antibody is the SKY59 antibody (Fukuzawa, T. et al., Sci. Rep., 7:1080, 2017). In one embodiment, the antibody comprises the heavy and light chain CDRs or variable regions of the SKY59 antibody. In another embodiment, the antibody, or antigen binding fragment thereof, comprises a heavy chain comprising SEQ ID NO:45 and a light chain comprising SEQ ID NO:46.

In some embodiments, an anti-C5 antibody described herein comprises a heavy chain CDR1 comprising, or consisting of, the following amino acid sequence: GHIFSNY- WIQ (SEQ ID NO: 19). In some embodiments, an anti-C5 antibody described herein comprises a heavy chain CDR2 comprising, or consisting of, the following amino acid sequence: EILPGSGHTEYTENFKD (SEQ ID NO:18). In some embodiments, an anti-C5 antibody described herein comprises a heavy chain variable region comprising the following amino acid sequence:

```
                                          (SEQ ID NO: 12)
QVQLVQSGAE VKKPGASVKV SCKASGHIFS NYWIQWVRQA

PGQGLEWMGE ILPGSGHTEY TENFKDRVTM TRDTSTSTVY

MELSSLRSED TAVYYCARYF FGSSPNWYFD VWGQGTLVTV SS.
```

In some embodiments, an anti-C5 antibody described herein comprises a light chain variable region comprising the following amino acid sequence:

```
                                          (SEQ ID NO: 8)
DIQMTQSPSS LSASVGDRVT ITCGASENIY GALNWYQQKP

GKAPKLLIYG ATNLADGVPS RFSGSGSGTD FTLTISSLQP

EDFATYYCQN VLNTPLTFGQ GTKVEIK.
```

An anti-C5 antibody described herein can, in some embodiments, comprise a variant human Fc constant region that binds to human neonatal Fc receptor (FcRn) with greater affinity than that of the native human Fc constant region from which the variant human Fc constant region was derived. The Fc constant region can, for example, comprise one or more (e.g., two, three, four, five, six, seven, or eight or more) amino acid substitutions relative to the native human Fc constant region from which the variant human Fc constant region was derived. The substitutions can increase the binding affinity of an IgG antibody containing the variant Fc constant region to FcRn at pH 6.0, while maintaining the pH dependence of the interaction. Methods for testing whether one or more substitutions in the Fc constant region of an antibody increase the affinity of the Fc constant region for FcRn at pH 6.0 (while maintaining pH dependence of the interaction) are known in the art and exemplified in the working examples. See, e.g., PCT/US2015/019225 and U.S. Pat. No. 9,079,949 the disclosures of each of which are incorporated herein by reference in their entirety.

Substitutions that enhance the binding affinity of an antibody Fc constant region for FcRn are known in the art and include, e.g., (1) the M252Y/S254T/T256E triple substitution (Dall'Acqua, W. et al., *J. Biol. Chem.*, 281:23514-24, 2006); (2) the M428L or T250Q/M428L substitutions (Hinton, P. et al., *J. Biol. Chem.*, 279:6213-6, 2004; Hinton, P. et al., *J. Immunol.*, 176:346-56, 2006); and (3) the N434A or T307/E380A/N434A substitutions (Petkova, S. et al., *Int. Immunol.*, 18:1759-69, 2006). The additional substitution pairings: P257I/Q311I, P257I/N434H and D376V/N434H (Datta-Mannan, A. et al., *J. Biol. Chem.*, 282:1709-17, 2007), the disclosures of each of which are incorporated herein by reference in their entirety.

In some embodiments, the variant constant region has a substitution at EU amino acid position 255 for valine. In some embodiments, the variant constant region has a substitution at EU amino acid position 309 for asparagine. In some embodiments, the variant constant region has a substitution at EU amino acid position 312 for isoleucine. In some embodiments, the variant constant region has a substitution at EU amino acid position 386.

In some embodiments, the variant Fc constant region comprises no more than 30 (e.g., no more than 29, 28, 27, 26, 25, 24, 23, 22, 21, 20, 19, 18, 17, 16, 15, 14, 13, 12, 11, 10, 9, 8, 7, 6, 5, 4, 3 or 2) amino acid substitutions, insertions, or deletions relative to the native constant region from which it was derived. In some embodiments, the variant Fc constant region comprises one or more amino acid substitutions selected from the group consisting of: M252Y, S254T, T256E, N434S, M428L, V259I, T250I and V308F. In some embodiments, the variant human Fc constant region comprises a methionine at position 428 and an asparagine at position 434 of a native human IgG Fc constant region, each in EU numbering. In some embodiments, the variant Fc constant region comprises a 428L/434S double substitution as described in, e.g., U.S. Pat. No. 8,088,376.

In some embodiments the precise location of these mutations may be shifted from the native human Fc constant region position due to antibody engineering. For example, the 428L/434S double substitution when used in a IgG2/4 chimeric Fc may correspond to 429L, and 435S as in the M429L and N435S variants found in ravulizumab and described in U.S. Pat. No. 9,079,949 the disclosure of which is incorporated herein by reference in its entirety.

In some embodiments, the variant constant region comprises a substitution at amino acid position 237, 238, 239, 248, 250, 252, 254, 255, 256, 257, 258, 265, 270, 286, 289, 297, 298, 303, 305, 307, 308, 309, 311, 312, 314, 315, 317, 325, 332, 334, 360, 376, 380, 382, 384, 385, 386, 387, 389, 424, 428, 433, 434 or 436 (EU numbering) relative to the native human Fc constant region. In some embodiments, the substitution is selected from the group consisting of: methionine for glycine at position 237; alanine for proline at position 238; lysine for serine at position 239; isoleucine for lysine at position 248; alanine, phenylalanine, isoleucine, methionine, glutamine, serine, valine, tryptophan, or tyrosine for threonine at position 250; phenylalanine, tryptophan, or tyrosine for methionine at position 252; threonine for serine at position 254; glutamic acid for arginine at position 255; aspartic acid, glutamic acid, or glutamine for threonine at position 256; alanine, glycine, isoleucine, leucine, methionine, asparagine, serine, threonine, or valine for proline at position 257; histidine for glutamic acid at position 258; alanine for aspartic acid at position 265; phenylalanine for aspartic acid at position 270; alanine, or glutamic acid for asparagine at position 286; histidine for threonine at position 289; alanine for asparagine at position 297; glycine for serine at position 298; alanine for valine at position 303; alanine for valine at position 305; alanine, aspartic acid, phenylalanine, glycine, histidine, isoleucine, lysine, leucine, methionine, asparagine, proline, glutamine, arginine, serine, valine, tryptophan, or tyrosine for threonine at position 307; alanine, phenylalanine, isoleucine, leucine, methionine, proline, glutamine, or threonine for valine at position 308; alanine, aspartic acid, glutamic acid, proline, or arginine for leucine or valine at position 309; alanine, histidine, or isoleucine for glutamine at position 311; alanine or histidine for aspartic acid at position 312; lysine or arginine for leucine at position 314; alanine or histidine for asparagine at position 315; alanine for lysine at position 317; glycine for asparagine at position 325; valine for isoleucine at position 332; leucine for lysine at position 334; histidine for lysine at position 360; alanine for aspartic acid at position 376; alanine for glutamic acid at position 380; alanine for glutamic acid at position 382; alanine for asparagine or serine at position 384; aspartic acid or histidine for glycine at position 385; proline for glutamine at position 386; glutamic acid for proline at position 387; alanine or serine for asparagine at position 389; alanine for serine at position 424; alanine, aspartic acid, phenylalanine, glycine, histidine, isoleucine, lysine, leucine, asparagine, proline, glutamine, serine, threonine, valine, tryptophan, or tyrosine for methionine at position 428; lysine for histidine at position 433; alanine, phenylalanine, histidine, serine, tryptophan, or tyrosine for asparagine at position 434; and histidine for tyrosine or phenylalanine at position 436, all in EU numbering.

Suitable anti-C5 antibodies for use in the methods described herein, in some embodiments, comprise a heavy chain polypeptide comprising the amino acid sequence set forth in SEQ ID NO:14 and/or a light chain polypeptide comprising the amino acid sequence set forth in SEQ ID NO:11. Alternatively, the anti-C5 antibodies for use in the methods described herein, in some embodiments, comprise a heavy chain polypeptide comprising the amino acid sequence set forth in SEQ ID NO:20 and/or a light chain polypeptide comprising the amino acid sequence set forth in SEQ ID NO:11.

In one embodiment, the antibody binds to C5 at pH 7.4 and 25 C (and, otherwise, under physiologic conditions) with an affinity dissociation constant ($K_D$) that is at least 0.1 (e.g., at least 0.15, 0.175, 0.2, 0.25, 0.275, 0.3, 0.325, 0.35, 0.375, 0.4, 0.425, 0.45, 0.475, 0.5, 0.525, 0.55, 0.575, 0.6, 0.625, 0.65, 0.675, 0.7, 0.725, 0.75, 0.775, 0.8, 0.825, 0.85, 0.875, 0.9, 0.925, 0.95, or 0.975) nM. In some embodiments, the $K_D$ of the anti-C5 antibody, or antigen binding fragment thereof, is no greater than 1 (e.g., no greater than 0.9, 0.8, 0.7, 0.6, 0.5, 0.4, 0.3, or 0.2) nM.

In other embodiments, the [($K_D$ of the antibody for C5 at pH 6.0 at 25 C)/($K_D$ of the antibody for C5 at pH 7.4 at 25 C)] is greater than 21 (e.g., greater than 22, 23, 24, 25, 26, 27, 28, 29, 30, 35, 40, 45, 50, 55, 60, 65, 70, 75, 80, 85, 90, 95, 100, 110, 120, 130, 140, 150, 160, 170, 180, 190, 200, 210, 220, 230, 240, 250, 260, 270, 280, 290, 300, 350, 400, 450, 500, 600, 700, 800, 900, 1000, 1500, 2000, 2500, 3000, 3500, 4000, 4500, 5000, 5500, 6000, 6500, 7000, 7500 or 8000).

Methods for determining whether an antibody binds to a protein antigen and/or the affinity for an antibody to a protein antigen are known in the art. The binding of an antibody to a protein antigen, for example, can be detected and/or quantified using a variety of techniques such as, but not limited to, Western blot, dot blot, surface plasmon resonance (SPR) detection (e.g., BIAcore system; Pharmacia Biosensor AB, Uppsala, Sweden and Piscataway, N.J.), or enzyme-linked immunosorbent assay (ELISA; Benny K. C. Lo (2004) "Antibody Engineering: Methods and Protocols," Humana Press (ISBN: 1588290921); Johne, B. et al., *J. Immunol. Meth.*, 160:191-8, 1993; Jonsson, U. et al., *Ann. Biol. Clin.*, 51:19-26, 1993; Jönsson, U. et al., *Biotechniques*, 11:620-7, 1991). In addition, methods for measuring the affinity (e.g., dissociation and association constants) are set forth in the working examples.

As used herein, the term "$k_a$" refers to the rate constant for association of an antibody to an antigen. The term "$k_d$" refers to the rate constant for dissociation of an antibody from the antibody/antigen complex. And the term "$K_D$" refers to the equilibrium dissociation constant of an antibody-antigen interaction. The equilibrium dissociation constant is deduced from the ratio of the kinetic rate constants, $K_D = k_d/k_a$. Such determinations can be measured, for example, at 25 C or 37 C (see the working examples). The kinetics of antibody binding to human C5 can be determined, for example, at pH 8.0, 7.4, 7.0, 6.5 and 6.0 via SPR on a BIAcore 3000 instrument using an anti-Fc capture method to immobilize the antibody.

In one embodiment, the anti-C5 antibody, or antigen binding fragment thereof, blocks the cleavage of C5 into C5a and C5b. Through this blocking effect, for example, the pro-inflammatory effects of C5a and the generation of the C5b-9 membrane attack complex (MAC) at the surface of a cell are inhibited.

Methods for determining whether a particular antibody described herein inhibits C5 cleavage are known in the art. Inhibition of human complement component C5 can reduce the cell-lysing ability of complement in a subject's body fluids. Such reductions of the cell-lysing ability of complement present in the body fluid(s) can be measured by methods known in the art such as, for example, by a conventional hemolytic assay such as the hemolysis assay (Kabat and Mayer (eds.), "Experimental Immunochemistry, $2^{nd}$ Edition," 135-240, Springfield, IL, CC Thomas (1961), pages 135-139), or a conventional variation of that assay such as the chicken erythrocyte hemolysis method (Hillmen, P. et al., *N. Engl. J. Med.,* 350:552-9, 2004). Methods for determining whether a candidate compound inhibits the cleavage of human C5 into forms C5a and C5b are known in the art (Evans, M. et al., *Mol. Immunol.,* 32:1183-95, 1995). The concentration and/or physiologic activity of C5a and C5b in a body fluid can be measured, for example, by methods known in the art. For C5b, hemolytic assays or assays for soluble C5b-9 as discussed herein can be used. Other assays known in the art can also be used. Using assays of these or other suitable types, candidate agents capable of inhibiting human complement component C5 can be screened.

Immunological techniques such as, but not limited to, ELISA can be used to measure the protein concentration of C5 and/or its split products to determine the ability of an anti-C5 antibody, or antigen binding fragment thereof, to inhibit conversion of C5 into biologically active products. In some embodiments, C5a generation is measured. In some embodiments, C5b-9 neoepitope-specific antibodies are used to detect MAC formation.

Hemolytic assays can be used to determine the inhibitory activity of an anti-C5 antibody, or antigen binding fragment thereof, on complement activation. To determine the effect of an anti-C5 antibody, or antigen binding fragment thereof, on classical complement pathway-mediated hemolysis in a serum test solution in vitro, for example, sheep erythrocytes coated with hemolysin or chicken erythrocytes sensitized with anti-chicken erythrocyte antibody are used as target cells. The percentage of lysis is normalized by considering 100% lysis equal to the lysis occurring in the absence of the inhibitor. In some embodiments, the classical complement pathway is activated by a human IgM antibody, for example, as utilized in the Wieslab® Classical Pathway Complement Kit (Wieslab® COMPL CP310, Euro-Diagnostica, Sweden). Briefly, the test serum is incubated with an anti-C5 antibody, or antigen binding fragment thereof, in the presence of a human IgM antibody. The amount of C5b-9 that is generated is measured by contacting the mixture with an enzyme conjugated anti-C5b-9 antibody and a fluorogenic substrate and measuring the absorbance at the appropriate wavelength. As a control, the test serum is incubated in the absence of the anti-C5 antibody, or antigen binding fragment thereof. In some embodiments, the test serum is a C5-deficient serum reconstituted with a C5 polypeptide.

To determine the effect of an anti-C5 antibody or antigen binding fragment thereof on alternative pathway-mediated hemolysis, unsensitized rabbit or guinea pig erythrocytes can be used as the target cells. In some embodiments, the serum test solution is a C5-deficient serum reconstituted with a C5 polypeptide. The percentage of lysis is normalized by considering 100% lysis equal to the lysis occurring in the absence of the inhibitor. In some embodiments, the alternative complement pathway is activated by lipopolysaccharide molecules, for example, as utilized in the Wieslab® Alternative Pathway Complement Kit (Wieslab® COMPL AP330, Euro-Diagnostica, Sweden). Briefly, the test serum is incubated with an anti-C5 antibody, or antigen binding fragment thereof, in the presence of lipopolysaccharide. The amount of C5b-9 that is generated is measured by contacting the mixture with an enzyme conjugated anti-C5b-9 antibody and a fluorogenic substrate and measuring the fluorescence at the appropriate wavelength. As a control, the test serum is incubated in the absence of the anti-C5 antibody, or antigen binding fragment thereof.

In some embodiments, C5 activity or inhibition thereof is quantified using a CH50 eq assay. The CH50 eq assay is a method for measuring the total classical complement activity in serum. This test is a lytic assay, which uses antibody-sensitized erythrocytes as the activator of the classical complement pathway and various dilutions of the test serum to determine the amount required to give 50% lysis (CH50). The percent hemolysis can be determined, for example, using a spectrophotometer. The CH50 eq assay provides an indirect measure of terminal complement complex (TCC) formation, since the TCC themselves are directly responsible for the hemolysis that is measured. The assay is known and commonly practiced by those of skill in the art. Briefly, to activate the classical complement pathway, undiluted serum samples (e.g., reconstituted human serum samples) are added to microassay wells containing the antibody-sensitized erythrocytes to thereby generate TCC. Next, the activated sera are diluted in microassay wells, which are coated with a capture reagent (e.g., an antibody that binds to one or more components of the TCC). The TCC present in the activated samples bind to the monoclonal antibodies coating the surface of the microassay wells. The wells are washed and to each well is added a detection reagent that is detectably labeled and recognizes the bound TCC. The detectable label can be, e.g., a fluorescent label or an enzymatic label. The assay results are expressed in CH50 unit equivalents per milliliter (CH50 U Eq/mL).

Inhibition, e.g., as it pertains to terminal complement activity, includes at least a 5 (e.g., at least a 6, 7, 8, 9, 10, 15, 20, 25, 30, 35, 40, 45, 50, 55 or 60) % decrease in the activity of terminal complement in, e.g., a hemolytic assay or CH50 eq assay as compared to the effect of a control antibody (or antigen-binding fragment thereof) under similar conditions and at an equimolar concentration. Substantial inhibition, as used herein, refers to inhibition of a given activity (e.g., terminal complement activity) of at least 40 (e.g., at least 45, 50, 55, 60, 65, 70, 75, 80, 85, 90, or 95 or greater) %. In some embodiments, an anti-C5 antibody described herein contains one or more amino acid substitutions relative to the CDRs of eculizumab (i.e., SEQ ID NOs: 1-6), yet retains at least 30 (e.g., at least 31, 32, 33, 34, 35, 36, 37, 38, 39, 40, 41, 42, 43, 44, 45, 46, 47, 48, 49, 50, 55, 60, 65, 70, 75, 80, 85, 90 or 95) % of the complement inhibitory activity of eculizumab in a hemolytic assay or CH50 eq assay.

An anti-C5 antibody described herein has a serum half-life in humans that is at least 20 (e.g., at least 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54 or 55) days. In another embodiment, the anti-C5 antibody described herein has a serum half-life in humans that is at least 40 days. In another embodiment, the anti-C5 antibody described herein has a serum half-life in humans that is approximately 43 days. In another embodiment, the anti-C5 antibody described herein has a serum half-life in humans that is between 39-48 days. Methods for measuring the serum half-life of an antibody are known in the art. In some embodiments, an anti-C5 antibody, or antigen binding fragment thereof, described herein has a serum half-life that is at least 20 (e.g., at least 30, 35, 40, 45, 50, 55, 60, 65, 70, 75, 80, 85, 90, 95, 100, 125, 150, 175, 200, 250, 300, 400 or 500) % greater than the serum half-life of eculizumab, e.g., as measured in one of the mouse model systems described in the working examples (e.g., the C5-deficient/NOD/scid mouse or hFcRn transgenic mouse model system).

In one embodiment, the antibody competes for binding with, and/or binds to the same epitope on C5 as an antibody described herein. The term "binds to the same epitope" with reference to two or more antibodies means that the antibodies bind to the same segment of amino acid residues, as determined by a given method. Techniques for determining whether antibodies bind to the same epitope on C5 with an antibody described herein include, for example, epitope mapping methods, such as, x-ray analyses of crystals of antigen: antibody complexes, and hydrogen/deuterium exchange mass spectrometry (HDX-MS). Other methods monitor the binding of the antibody to peptide antigen fragments or mutated variations of the antigen where loss of binding due to a modification of an amino acid residue within the antigen sequence is often considered an indication of an epitope component. In addition, computational combinatorial methods for epitope mapping can also be used. These methods rely on the ability of the antibody of interest to affinity isolate specific short peptides from combinatorial phage display peptide libraries. Antibodies having the same VH and VL or the same CDR1, CDR2 and CDR3 sequences are expected to bind to the same epitope.

Antibodies that "compete with another antibody for binding to a target" refer to antibodies that inhibit (partially or completely) the binding of the other antibody to the target. Whether two antibodies compete with each other for binding to a target, i.e., whether and to what extent one antibody inhibits the binding of the other antibody to a target, may be determined using known competition experiments. In certain embodiments, an antibody competes with, and inhibits binding of another antibody to a target by at least 10%, 20%, 30%, 40%, 50%, 60%, 70%, 80%, 90% or 100%. The level of inhibition or competition may be different depending on which antibody is the "blocking antibody" (i.e., the antibody that is incubated first with the target). Competing antibodies can bind to, for example, the same epitope, an overlapping epitope or to adjacent epitopes (e.g., as evidenced by steric hindrance).

Anti-C5 antibodies, or antigen-binding fragments thereof described herein, used in the methods described herein can be generated using a variety of art-recognized techniques. Monoclonal antibodies can be obtained by various techniques familiar to those skilled in the art. Briefly, spleen cells from an animal immunized with a desired antigen are immortalized, commonly by fusion with a myeloma cell (Köhler, G. & Milstein, C., *Eur. J. Immunol.*, 6:511-9, 1976)). Methods of immortalization include transformation with Epstein Barr Virus, oncogenes, or retroviruses or other methods known in the art. Colonies arising from single immortalized cells are screened for production of antibodies of the desired specificity and affinity for the antigen, and yield of the monoclonal antibodies produced by such cells may be enhanced by various techniques, including injection into the peritoneal cavity of a vertebrate host. Alternatively, one may isolate DNA sequences that encode a monoclonal antibody or a binding fragment thereof by screening a DNA library from human B cells (Huse, W. et al., *Science,* 246:1275-81, 1989).

III. Compositions

Also provided herein are compositions comprising an anti-C5 antibody or antigen binding fragment thereof. In one embodiment, the composition comprises an anti-C5 antibody comprising the CDR1, CDR2 and CDR3 domains in a heavy chain variable region having the sequence set forth in SEQ ID NO:12, and the CDR1, CDR2 and CDR3 domains in a light chain variable region having the sequence set forth in SEQ ID NO:8. In another embodiment, the anti-C5 antibody comprises heavy and light chains having the sequences shown in SEQ ID NOs: 14 and 11, respectively. In another embodiment, the anti-C5 antibody comprises heavy and light chains having the sequences shown in SEQ ID NOs: 20 and 11, respectively.

The compositions can be formulated as a pharmaceutical solution, e.g., for administration to a subject for the treatment or prevention of a complement-associated disorder. The pharmaceutical compositions generally include a pharmaceutically acceptable carrier. As used herein, a "pharmaceutically acceptable carrier" refers to, and includes, any and all solvents, dispersion media, coatings, antibacterial and antifungal agents, isotonic and absorption delaying agents, and the like that are physiologically compatible. The compositions can include a pharmaceutically acceptable salt, e.g., an acid addition salt or a base addition salt, sugars, carbohydrates, polyols and/or tonicity modifiers.

The compositions can be formulated according to standard methods. Pharmaceutical formulation is an established art (see, for example, Gennaro (2000) "Remington: The Science and Practice of Pharmacy," 20th Edition, Lippincott, Williams & Wilkins (ISBN: 0683306472); Ansel et al. (1999) "Pharmaceutical Dosage Forms and Drug Delivery Systems," $7^{th}$ Edition, Lippincott Williams & Wilkins Publishers (ISBN: 0683305727); and Kibbe (2000) "Handbook of Pharmaceutical Excipients American Pharmaceutical Association," $3^{rd}$ Edition (ISBN: 091733096X)). In some embodiments, a composition can be formulated, for example, as a buffered solution at a suitable concentration and suitable for storage at 2-8 C (e.g., 4 C). In some embodiments, a composition can be formulated for storage at a temperature below OC (e.g., −20 C or −80 C). In some embodiments, the composition can be formulated for storage for up to 2 years (e.g., 1 month, 2 months, 3 months, 4 months, 5 months, 6 months, 7 months, 8 months, 9 months, 10 months, 11 months, 1 year, 1½ years or 2 years) at 2-8° C. (e.g., 4 C). Thus, in some embodiments, the compositions described herein are stable in storage for at least 1 year at 2-8 C (e.g., 4 C).

The pharmaceutical compositions can be in a variety of forms. These forms include, e.g., liquid, semi-solid and solid dosage forms, such as liquid solutions (e.g., injectable and infusible solutions), dispersions or suspensions, tablets, pills, powders, liposomes and suppositories. The preferred form depends, in part, on the intended mode of administration and therapeutic application. Compositions containing a composition intended for systemic or local delivery, for example, can be in the form of injectable or infusible solutions. Accordingly, the compositions: can be formulated for administration by a parenteral mode (e.g., intravenous, subcutaneous, intraperitoneal, or intramuscular injection).

"Parenteral administration," "administered parenterally" and other grammatically equivalent phrases, as used herein, refer to modes of administration other than enteral and topical administration, usually by injection, and include, without limitation, intravenous, intranasal, intraocular, pulmonary, intramuscular, intraarterial, intrathecal, intracapsular, intraorbital, intracardiac, intradermal, intrapulmonary, intraperitoneal, transtracheal, subcutaneous, subcuticular, intraarticular, subcapsular, subarachnoid, intraspinal, epidural, intracerebral, intracranial, intracarotid and intrasternal injection and infusion.

IV. Outcomes aHUS is an ultra-rare disorder driven by chronic uncontrolled complement activation. Ongoing complement dysregulation leads to increased activation of C5 systemically with consequent terminal complement activation, resulting in the devastating clinical manifestations of this disorder. Patients with aHUS are at risk of substantial morbidity and mortality.

aHUS can be genetic, acquired, or idiopathic. Hereditable forms of aHUS can be associated with mutations in a number of human complement components including, e.g., complement factor H (CFH), membrane cofactor protein (MCP), complement factor I (CFI), C4b-binding protein (C4BP), complement factor B (CFB), and complement component 3 (C3) (Caprioli, J. et al., *Blood,* 108:1267-79, 2006). Certain mutations in the gene encoding CD55, though not yet implicated in aHUS, are associated with the severity of aHUS (Esparza-Gordillo, J. et al., *Hum. Mol. Genet.,* 14:703-12, 2005). aHUS can be considered genetic when two or more (e.g., three, four, five or six or more) members of the same family are affected by the disease at least six months apart and exposure to a common triggering agent has been excluded, or when one or more aHUS-associated gene mutations (e.g., one or more mutations in CFH, MCP/CD46, CFB, or CFI) are identified in a subject. A subject can have CFH-associated aHUS, CFB-associated aHUS, CFI-associated aHUS or MCP-associated aHUS, for example. Up to 30% of genetic aHUS is associated with mutations in CFH, 12% with mutations in MCP, 5-10% with mutations in CFI, and less than 2% with mutations in CFB. Genetic aHUS can be multiplex (i.e., familial; two or more affected family members) or simplex (i.e., a single occurrence in a family). aHUS can be considered acquired when an underlying environmental factor (e.g., a drug, systemic disease or viral or bacterial agents that do not result in Shiga-like exotoxins) or trigger can be identified. aHUS can be considered idiopathic when no trigger (genetic or environmental) is evident.

aHUS is rare and has a mortality rate of up to 25%. Many patients with this disease will sustain permanent neurological or renal impairment, e.g., at least 50% of aHUS patients progress to end-stage renal failure (ESRF) (Kavanagh, D. et al., *Br. Med. Bull.,* 77-78:5-22, 2006). Until recently, treatment options for patients with aHUS were limited and often involved plasma infusion or plasma exchange. In some cases, aHUS patients undergo uni- or bilateral nephrectomy or renal transplantation (Artz, M. et al., *Transplantation,* 76:821-6, 2003). Recurrence of the disease in treated patients is common, however.

Laboratory tests can be performed to determine whether a human subject has thrombocytopenia, microangiopathic hemolytic anemia, or acute renal insufficiency. Thrombocytopenia can be diagnosed by a medical professional as one or more of: (i) a platelet count that is less than 150,000/mm$^3$ (e.g., less than 60,000/mm$^3$); (ii) a reduction in platelet survival time that is reduced, reflecting enhanced platelet disruption in the circulation; and (iii) giant platelets observed in a peripheral smear, which is consistent with secondary activation of thrombocytopoiesis. Microangiopathic hemolytic anemia can be diagnosed by a medical professional as one or more of: (i) hemoglobin concentrations that are less than 10 mg/dL (e.g., less than 6.5 mg/dL); (ii) increased serum lactate dehydrogenase (LDH) concentrations (≥460 U/L); (iii) hyperbilirubinemia, reticulocytosis, circulating free hemoglobin, and low or undetectable haptoglobin concentrations; and (iv) the detection of fragmented red blood cells (schistocytes) with the typical aspect of burr or helmet cells in the peripheral smear together with a negative Coombs test (Kaplan et al. (1992) "Hemolytic Uremic Syndrome and Thrombotic Thrombocytopenia Purpura," Informa Health Care (ISBN 0824786637) and Zipfel (2005) "Complement and Kidney Disease," Springer (ISBN 3764371668)). Blood concentrations of C3 and C4 can also be used as a measure of complement activation or dysregulation. In addition, a subject's condition can be further characterized by identifying the subject as harboring one or more mutations in a gene associated with aHUS such as CFI, CFB, CFH, or MCP (supra). Suitable methods for detecting a mutation in a gene include, e.g., DNA sequencing and nucleic acid array techniques (Breslin, E. et al., *Clin. Am. Soc. Nephrol.*, 1:88-99, 2006; Goicoechea de Jorge, E. et al., *Proc. Natl. Acad. Sci. USA*, 104:240-5, 2007).

Provided herein are methods for treating aHUS in a pediatric patient comprising administering to the patient an anti-C5 antibody. Symptoms of aHUS include, but are not limited to severe hypertension, proteinuria, uremia, lethargy/fatigue, irritability, thrombocytopenia, microangiopathic hemolytic anemia, and renal function impairment (e.g., acute renal failure). Patients treated according to the methods disclosed herein preferably experience improvement in at least one sign of aHUS. The treatment may produce, for example, at least one therapeutic effect selected from the group consisting of a reduction or cessation in severe hypertension, proteinuria, uremia, lethargy/fatigue, irritability, thrombocytopenia, microangiopathic hemolytic anemia and renal function impairment (e.g., acute renal failure) compared to baseline.

In another embodiment, the treatment results in a substantial or complete thrombotic microangiopathy (TMA) inhibition In another embodiment, the treatment results in a substantial or complete thrombotic microangiopathy inhibition that is sustained for more than, for example, 170 days (e.g., more than 171 days, 172 days, 173 days, 174 days, 175 days, 176 days, 177 days, 178 days, 179 days, 180 days, 181 days, 182 days 183 days, 184 days, 185 days, 186 days, 187 days, 188 days, 189 days, 190 days, 191 days, 192 days, 193 days, 194 days, 195 days, 196 days, 197 days, 198 days, 199 days, 200 days, 205 days, 210 days, 215 days, 220 days or 225 days) after initiating treatment.

In another embodiment, the treatment results in an increase in platelet count compared to baseline. In another embodiment, the treatment results in reduction in serum creatinine levels compared to baseline. In a particular embodiment, the treatment results in a ≥25% reduction in serum creatinine levels compared to baseline.

In another embodiment, the treatment produces a shift toward normal levels of Factor Ba, soluble tumor necrosis factor receptor 1 [sTNFR1]), soluble vascular adhesion molecule 1 [sVCAM1], thrombomodulin, D-dimer, and cystatin C.

In another embodiment, the treatment produces a reduction in the need for blood transfusions compared to baseline.

In another embodiment, the treatment eliminates the need for the patient to receive dialysis. In another embodiment, the patient is weaned off dialysis within 35 days or less (e.g., 35 days, 34 days, 33 days, 32 days, 31 days, 30 days, 29 days, 28 days, 27 days, 26 days, 25 days, 24 days, 23 days, 22 days, 21 days, 20 days, 19 days, 18 days, 17 days, 16 days, 15 days, 14 days, 13 days, 12 days, 11 days or 10 days) of initiating treatment.

In another embodiment, the treatment produces a reduction in major adverse vascular events (MAVEs) (e.g., thrombophlebitis/deep vein thrombosis, pulmonary embolus, myocardial infarction, transient ischemic attack, unstable angina, renal vein thrombosis/renal artery thrombosis/glomerular thrombosis, renal infarction, acute peripheral vascular occlusion, mesenteric/visceral vein/arterial thrombosis or infarction, hepatic/portal vein thrombosis, cerebral arterial occlusion/cerebrovascular accident, cerebral venous occlusion, renal arterial thrombosis, or multi-infarct dementia).

In another embodiment, the treatment produces a change from baseline in quality of life as assessed via the Functional Assessment of Chronic Illness Therapy (FACIT)-Fatigue Scale, version 4 and the European Organisation for Research and Treatment of Cancer, Quality of Life Questionnaire-Core 30 Scale. In one embodiment, the treatment produces a change from baseline in quality of life as assessed via the FACIT-Fatigue Scale by one or more (e.g., 1, 2 or 3) points. In another embodiment, the treatment produces a change from baseline in quality of life as assessed via the FACIT-Fatigue Scale by 3 points 150 days or more (e.g., 150 days, 151 days, 152 days, 153 days, 154 days, 155 days, 156 days, 157 days, 158 days, 159 days, 160 days, 161 days, 162 days, 163 days, 164 days, 165 days, 166 days, 167 days, 168 days, 169 days, 170 days, 171 days, 172 days, 173 days, 174 days, 175 days, 176 days, 177 days, 178 days, 179 days, 180 days, 181 days, 182 days 183 days, 184 days, 185 days, 186 days, 187 days, 188 days, 189 days, 190 days, 191 days, 192 days, 193 days, 194 days, 195 days, 196 days, 197 days, 198 days, 199 days, 200 days, 205 days, 210 days, 215 days, 220 days or 225 days) after initiating treatment.

In another embodiment, the patient's chronic kidney disease (CKD) improves by one or more stages after initiating treatment. For example, the patient's CKD improves by one, two, three, four, or five stages). In another embodiment, the patient's CKD improves by one or more stages 150 days or more (e.g., 150 days, 151 days, 152 days, 153 days, 154 days, 155 days, 156 days, 157 days, 158 days, 159 days, 160 days, 161 days, 162 days, 163 days, 164 days, 165 days, 166 days, 167 days, 168 days, 169 days, 170 days, 171 days, 172 days, 173 days, 174 days, 175 days, 176 days, 177 days, 178 days, 179 days, 180 days, 181 days, 182 days 183 days, 184 days, 185 days, 186 days, 187 days, 188 days, 189 days, 190 days, 191 days, 192 days, 193 days, 194 days, 195 days, 196 days, 197 days, 198 days, 199 days, 200 days, 205 days, 210 days, 215 days, 220 days or 225 days) after initiating treatment.

In another embodiment, lactate dehydrogenase (LDH) levels can be used to evaluate responsiveness to a therapy (e.g., a reduction of hemolysis as assessed by lactate dehydrogenase (LDH) levels is indicative of an improvement in at least one sign of aHUS). LDH is a marker of intravascular hemolysis (Hill, A. et al., *Br. J. Haematol.*, 149:414-25, 2010; Hillmen, P. et al., *N. Engl. J. Med.*, 350:552-9, 2004; Parker, C. et al., *Blood*, 106:3699-709, 2005). Red blood cells contain large amounts of LDH, and a correlation between cell-free hemoglobin and LDH concentration has been reported in vitro (Van Lente, F. et al., *Clin. Chem.*, 27:1453-5, 1981) and in vivo (Kato, G. et al., *Blood*, 107:2279-85, 2006). The consequences of hemolysis are independent of anemia (Hill, A. et al., Haematologica, 93 (s1): 359 Abs.0903, 2008; Kanakura, Y. et al., *Int. J. Hematol.*, 93:36-46, 2011). LDH concentration obtained at baseline and then serially throughout a treatment period, is an important measure of hemolysis. Baseline levels of cell-free plasma hemoglobin are highly elevated in patients with aHUS with LDH≥1.5-fold above the upper limit of normal (LDH≥1.5×ULN), with a significant correlation between LDH and cell-free plasma hemoglobin (Hillmen, P. et al., *N. Engl. J. Med.*, 355:1233-43, 2006). The normal LDH value range is 105-333 IU/L (international units per liter).

LDH levels can be measured using any suitable test or assay, such as those described by Ferri F F, ed. *Ferri's Clinical Advisor* 2014. Philadelphia: Pa: Elsevier Mosby; 2014: Section IV—Laboratory tests and interpretation of results. LDH concentration can be measured in various samples obtained from a patient, in particular, serum samples. As used herein, the term "sample" refers to biological material from a subject. Although serum LDH concentration is of interest, samples can be derived from other sources, including, for example, single cells, multiple cells, tissues, tumors, biological fluids, biological molecules or supernatants or extracts of any of the foregoing. Examples include tissue removed for biopsy, tissue removed during resection, blood, urine, lymph tissue, lymph fluid, cerebrospinal fluid, mucous and stool samples. The sample used can vary based on the assay format, the detection method and the nature of the tumors, tissues, cells or extracts to be assayed. Methods for preparing samples are known in the art and can be readily adapted to obtain a sample that is compatible with the method utilized.

In one embodiment, patients treated according to the disclosed methods experience reductions in LDH levels to normal levels or to within 10%, or within 20% above what is considered the normal level (e.g., within 105-333 IU/L). In one embodiment, the patient's LDH levels are ≥1.5 fold above the upper limit of normal (LDH≥1.5×ULN) prior to initiating treatment.

V. Kits and Unit Dosage Forms

Also provided herein are kits that include a pharmaceutical composition containing an anti-C5 antibody or antigen binding fragment thereof, such as ravulizumab or BNJ421, and a pharmaceutically acceptable carrier, in a therapeutically effective amount adapted for use in the preceding methods. The kits optionally also can include instructions, e.g., comprising administration schedules, to allow a practitioner (e.g., a physician, nurse, or patient) to administer the composition contained therein to administer the composition to a patient having aHUS. The kit also can include a syringe.

Optionally, the kits include multiple packages of the single-dose pharmaceutical compositions each containing an effective amount of the anti-C5 antibody, or antigen binding fragment thereof, for a single administration in accordance with the methods provided above. Instruments or devices necessary for administering the pharmaceutical composition(s) also may be included in the kits. A kit may provide, for example, one or more pre-filled syringes containing an amount of the anti-C5 antibody or antigen binding fragment thereof.

In one embodiment, a kit for treating aHUS in a human patient, the kit comprises: (a) a dose of an anti-C5 antibody or antigen binding fragment thereof comprising CDR1, CDR2 and CDR3 domains of the heavy chain variable region having the sequence set forth in SEQ ID NO:12, and CDR1, CDR2 and CDR3 domains of the light chain variable region having the sequence set forth in SEQ ID NO:8; and (b) instructions for using the anti-C5 antibody or antigen binding fragment thereof according to any of the methods described herein.

In one embodiment, the kit comprises a dose of an anti-C5 antibody or antigen binding fragment thereof, wherein the anti-C5 antibody or antigen binding fragment thereof is administered to a pediatric patient weighing ≥5 to <10 kg: (a) once on Day 1 at a dose of 300 mg; and (b) once on Day 15 at a dose of 300 mg and every four weeks thereafter.

In one embodiment, the kit comprises a dose of an anti-C5 antibody or antigen binding fragment thereof, wherein the anti-C5 antibody or antigen binding fragment thereof, is administered to a patient weighing ≥5 to <10 kg: (a) once on Day 1 at a dose of 600 mg; and (b) on Day 15 and every four weeks thereafter at a dose of 300 mg.

In another embodiment, the kit comprises a dose of an anti-C5 antibody or antigen binding fragment thereof, wherein the anti-C5 antibody or antigen binding fragment thereof, is administered to a patient weighing ≥10 to <20 kg: (a) once on Day 1 at a dose of 600 mg; and (b) on Day 15 and every four weeks thereafter at a dose of 600 mg.

In another embodiment, the kit comprises a dose of an anti-C5 antibody or antigen binding fragment thereof, wherein the anti-C5 antibody, or antigen binding fragment thereof, is administered to a patient weighing ≥20 to <30 kg: (a) once on Day 1 at a dose of 900 mg; and (b) on Day 15 and every eight weeks thereafter at a dose of 2100 mg.

In another embodiment, the kit comprises a dose of an anti-C5 antibody or antigen binding fragment thereof, wherein the anti-C5 antibody, or antigen binding fragment thereof, is administered to a patient weighing ≥30 to <40 kg: (a) once on Day 1 at a dose of 1200 mg; and (b) on Day 15 and every eight weeks thereafter at a dose of 2700 mg.

In another embodiment, the kit comprises a dose of an anti-C5 antibody, or antigen binding fragment thereof, wherein the anti-C5 antibody, or antigen binding fragment thereof, is administered to a patient weighing ≥40 to <60 kg: (a) once on Day 1 at a dose of 2400 mg; and (b) on Day 15 and every eight weeks thereafter at a dose of 3000 mg.

In another embodiment, the kit comprises a dose of an anti-C5 antibody, or antigen binding fragment thereof, wherein the anti-C5 antibody, or antigen binding fragment thereof, is administered to a patient weighing ≥60 to <100 kg: (a) once on Day 1 at a dose of 2700 mg; and (b) on Day 15 and every eight weeks thereafter at a dose of 3300 mg.

In another embodiment, the kit comprises a dose of an anti-C5 antibody or antigen binding fragment thereof, wherein the anti-C5 antibody, or antigen binding fragment thereof, is administered to a patient weighing ≥100 kg: (a) once on Day 1 at a dose of 3000 mg; and (b) on Day 15 and every eight weeks thereafter at a dose of 3600 mg.

The following examples are merely illustrative and should not be construed as limiting the scope of this disclosure in any way as many variations and equivalents will become apparent to those skilled in the art upon reading the present disclosure. The contents of all references, Genbank entries, patents and published patent applications cited throughout this application are expressly incorporated herein by reference.

EXAMPLES

Example 1: A Phase 3, Open-Label, Multicenter Study of Ravulizumab in Children and Adolescent Patients with aHUS A Phase 3, single-treatment arm, multicenter study is conducted to evaluate the safety, efficacy, pharmacokinetics, and pharmacodynamics of ravulizumab administered by intravenous (IV) infusion to approximately 23 to 28 pediatric patients, from birth to <18 years of age, with confirmed diagnosis of aHUS. The study has 2 cohorts. Cohort 1 includes complement inhibitor treatment-naïve patients. Cohort 2 includes eculizumab-experienced adolescent patients (12 to <18 years of age). The study consists of a Screening Period (of up to 7 days for Cohort 1 or up to 28 days for Cohort 2), a 26-week Initial Evaluation Period, and a 2-year Extension Period. The study design is depicted in FIG. 1.

Approximately 23 to 28 pediatric patients with documented aHUS are planned. The minimum number of patients for each age category is as follows: (1) Birth to <2 years: 4 patients, (2) 2 to <6 years: 4 patients, (3), 6 to <12 years: 4 patients, and (4) 12 to <18 years: 8 patients. Cohort 2 patients must be 12 to <18 years of age.

Consenting patients in Cohort 1 are screened for study eligibility up to 7 days prior to Day 1. Consenting patients in Cohort 2 are screened for study eligibility up to 28 days prior to Day 1; the first dose of study drug is given 14 days from the eligible patient's last dose of eculizumab. Patients who are eligible based on the Inclusion and Exclusion Criteria are enrolled into the Initial Evaluation Period and receive a weight-based loading dose of ravulizumab on Day 1, followed by weight-based maintenance treatment with ravulizumab on Day 15 and once every eight weeks (q8w) thereafter for patients weighing ≥20 kg, or once every 4 weeks (q4w) for patients weighing <20 kg, for a total of 26 weeks of treatment. Weight-based dosing is based on the patient's body weight recorded on Dose Regimen Decision Days (if the Dose Regimen Day is a dosing day, body weight is recorded predose), as shown in Table 1 below.

TABLE 1

Weight-Based Dosing

| Body Weight Range (kg)[a] | Loading Dose (mg) | Maintenance Doses (mg) | Maintenance Dosing Frequency |
|---|---|---|---|
| ≥5 to <10 | 600 | 300 | q4w |
| ≥10 to <20 | 600 | 600 | q4w |
| ≥20 to <30 | 900 | 2100 | q8w |
| ≥30 to <40 | 1200 | 2700 | q8w |
| ≥40 to <60 | 2400 | 3000 | q8w |
| ≥60 to <100 | 2700 | 3300 | q8w |
| ≥100 | 3000 | 3600 | q8w |

Abbreviations:
q4w = once every 4 weeks;
q8w = once every 8 weeks
[a]Body weight Z recorded on dose Regimen Decision Days. If the Dose Regimen day is also dosing day, body weight is recorded predose with dosing that day based on the previous Dose regimen day body weight.

An initial analysis, including review of ravulizumab PK and serum free C5 levels, is conducted after four complement inhibitor treatment-naïve (i.e., Cohort 1) patients weighing ≥5 kg to <40 kg have completed dosing through Day 71. In addition, safety data are reviewed. Enrollment of patients proceeds without interruption while the analysis is ongoing. The primary purpose of this review is to assure patients are achieving adequate complement inhibition during this study with the goal of achieving complete terminal complement blockade. Based on this review, if dose adjustment is considered needed and tolerable, subsequent treatment for all patients continues at the adjusted dose regimen. After the Initial Evaluation Period, patients roll over into an Extension Period in which all patients continue their weight-based maintenance dose of ravulizumab on Day 183 and once every eight weeks (q8w) thereafter for patients weighing ≥20 kg, or once every four weeks (q4w) for patients weighing <20 kg, until the product is registered or approved (in accordance with country specific regulation) or for up to 2 years, whichever occurs first. Note that q4w visits during the Extension Period are not applicable for patients weighing ≥20 kg and receiving ravulizumab q8w. The end of trial is defined as the last patient's last visit or follow-up (whether on site or via phone call) of the 2-year Extension Period, whichever is later.

1. Objectives

The primary objective of the study is to assess the efficacy of ravulizumab in complement inhibitor treatment-naïve pediatric patients (i.e., Cohort 1) with aHUS to inhibit complement-mediated thrombotic microangiopathy (TMA) as characterized by thrombocytopenia, hemolysis and renal impairment.

Secondary objectives for complement inhibitor treatment-naïve patients (i.e., Cohort 1) are to (1) characterize the safety and tolerability of ravulizumab, (2) evaluate the efficacy of ravulizumab by dialysis requirement status, time to complete TMA response, complete TMA response status over time, observed value and change from baseline in estimated glomerular filtration rate (eGFR), chronic kidney disease (CKD) stage, as evaluated by eGFR at select target days and classified as improved, stable (no change), or worsened compared to baseline, observed value and change from baseline in hematologic parameters (platelets, lactate dehydrogenase [LDH], hemoglobin), increase in hemoglobin of ≥20 g/L from baseline, observed at 2 separate assessments obtained at least 4 weeks (28 days) apart, and any measurement in between, and change from baseline in quality of life (QoL), as measured by the pediatric FACIT-Fatigue questionnaire, (3) characterize the pharmacokinetics (PK)/pharmacodynamics (PD) of ravulizumab, including changes in serum ravulizumab concentration over time and changes in serum free complement component 5 (C5) concentrations over time, and (4) evaluate the long-term safety and efficacy of ravulizumab.

Secondary objectives for eculizumab-experienced patients (i.e., Cohort 2) are to (1) characterize the safety and tolerability of ravulizumab, (2) evaluate the efficacy of ravulizumab by dialysis requirement status, observed value and change from baseline in eGFR, CKD stage, as evaluated by eGFR at select target days and classified as improved, stable (no change), or worsened compared to baseline, observed value and change from baseline in hematologic parameters (platelets, LDH, hemoglobin), and change from baseline in QoL, as measured by the pediatric FACIT-Fatigue questionnaire, (3) to characterize the PK/PD of ravulizumab, including changes in serum ravulizumab concentration over time and changes in serum free C5 concentrations over time, and (4) and evaluate the long-term safety and efficacy of ravulizumab.

2. Diagnosis and Main Criteria for Inclusion and Exclusion

Patients must satisfy all inclusion and exclusion criteria to have a confirmed diagnosis of aHUS and be eligible for the study. Patients who fail any of the eligibility criteria can be rescreened. Patients can be rescreened a maximum of two times. For Cohort 1, samples collected at Screening can be tested at either a local or central laboratory. If a local laboratory is used to define eligibility, additional samples are collected during the Screening Period for LDH, platelet count, hemoglobin and serum creatinine and tested at the central laboratory. All analyses in this study are based on results from the central laboratory (unless the result is missing). If Cohort 1 patients are found not to satisfy the eligibility criteria for serum creatinine (Inclusion Criterion 2c) based on central laboratory results, they must not be enrolled into the study; if the subject has received the first dose of ravulizumab, the patient must be withdrawn from the study, and may be replaced. For Cohort 1 patients, laboratory results for Exclusion Criterion number 1 and/or Exclusion Criterion number 2 may not be available prior to first dose. Later results for Exclusion Criterion number 1 and/or Exclusion Criterion number 2 could lead to discontinuation and replacement of the patient.

For Cohort 2, samples collected at Screening must be tested at a central laboratory. Historical test results via chart review, however, should be utilized for Inclusion Criterion 3 and Exclusion Criteria 1, 2, 3 and 24.

The following entry criteria are applicable for patients in both cohorts unless otherwise noted as specific for Cohort 1 or Cohort 2.

Inclusion Criteria are as follows:
1. Patients from birth up to <18 years of age and weighing ≥5 kg at the time of consent who:
   a. For Cohort 1 patients, have not been previously treated with complement inhibitors
   b. For Cohort 2 patients, are between 12 and <18 years of age and have been treated with eculizumab according to the labeled dosing recommendation for aHUS for at least 90 days prior to Screening
2. For Cohort 1 patients, evidence of TMA, including thrombocytopenia, evidence of hemolysis, and kidney injury, based on the following laboratory findings:
   a. Platelet count <150,000 per microliter (μL) during the Screening Period or within 28 days prior to the start of the Screening Period, and
   b. LDH≥1.5× upper limit of normal (ULN) during the Screening Period or within 28 days prior to the start of the Screening Period, and hemoglobin ≤lower limit of normal (LLN) for age and gender during the Screening Period or within 28 days prior to the start of the Screening Period, and
   c. Serum creatinine level ≥97.5$^{th}$ percentile for age at Screening (patients who require dialysis for acute kidney injury are also eligible regardless of serum creatinine level).
3. For Cohort 2 patients, documented diagnosis of aHUS including:
   a. Increase in LDH >ULN and creatinine >ULN, and decrease in platelets <LLN documented by local laboratories at the time of the TMA event
4. For Cohort 2 patients, clinical evidence of response to eculizumab indicated by stable TMA parameters (via central laboratory results) at Screening, including:
   a. LDH<1.5×ULN, and
   b. Platelet count ≥150,000/μL, and
   c. eGFR ≥30 mL/min/1.73 m$^2$ using the Schwartz formula
5. Among patients with a kidney transplant:
   a. Known history of aHUS prior to current kidney transplant, or
   b. No known history of aHUS, and persistent evidence of TMA at least four days after modifying the immunosuppressive regimen (e.g., suspending or reducing the dose) of calcineurin inhibitor ([CNI]; e.g., cyclosporine, tacrolimus) or mammalian target of rapamycin inhibitor ([mTORi]; e.g., sirolimus, everolimus).
6. Among patients with onset of TMA postpartum, persistent evidence of TMA for ≥3 days after the day of childbirth.
7. To reduce the risk of meningococcal infection (*Neisseria meningitidis*), all patients must be vaccinated against meningococcal infections within three years prior to, or at the time of, initiating study drug. Patients who receive a meningococcal vaccine less than two weeks before initiating ravulizumab treatment must receive treatment with appropriate prophylactic antibiotics until two weeks after vaccination. Patients who have not been vaccinated prior to initiating ravulizumab treatment should receive prophylactic antibiotics prior to and for at least two weeks after meningococcal vaccination. Patients who cannot be vaccinated must receive antibiotic prophylaxis for the entire treatment period and for eight months following last dose.
8. Patients must have been vaccinated against *Haemophilus influenzae* type b (Hib) and *Streptococcus pneumoniae* according to national and local vaccination schedule guidelines.
9. Female patients of childbearing potential and male patients with female partners of childbearing potential must follow protocol-specified guidance for avoiding pregnancy while on treatment and for 8 months after last dose of study drug.
10. Patient's legal guardian must be willing and able to give written informed consent and the patient must be willing to give written informed assent (if applicable as determined by the central or local Institutional Review Board [IRB]/Institutional (or Independent) Ethics Committee [IEC]) and comply with the study visit schedule.

Exclusion criteria are as follows:
1. Known familial or acquired 'a disintegrin and metalloproteinase with a thrombospondin type 1 motif, member 13' (ADAMTS13) deficiency (activity <5%).
2. Known Shiga toxin-related hemolytic uremic syndrome (STEC-HUS) as demonstrated by a positive test for Shiga toxin or culture of Shiga toxin producing bacteria.
3. Positive direct Coombs test.
4. Known Human Immunodeficiency Virus (HIV) infection.
5. Unresolved meningococcal disease.
6. Patients with a confirmed diagnosis of ongoing sepsis defined as positive blood cultures within seven days prior to the start of Screening and untreated with antibiotics.

7. Presence or suspicion of active and untreated systemic bacterial infection that, in the opinion of the Investigator, confounds an accurate diagnosis of aHUS or impedes the ability to manage the aHUS disease.
8. Females who plan to become pregnant during the study or are currently pregnant or breastfeeding.
9. Heart, lung, small bowel, pancreas or liver transplant.
10. Among patients with a kidney transplant, acute kidney dysfunction within four weeks of transplant consistent with the diagnosis of acute antibody-mediated rejection (AMR) according to Banff 2013 criteria.
11. Among patients without a kidney transplant, history of kidney disease other than aHUS, such as known kidney biopsy finding suggestive of underlying disease other than aHUS, known kidney ultrasound finding consistent with an alternative diagnosis to aHUS (e.g., small kidneys for age), known family history and/or genetic diagnosis of non-complement mediated genetic renal disease (e.g., focal segmental glomerulosclerosis).
12. Identified drug exposure-related HUS.
13. For Cohort 1 patients, receiving plasma exchange/plasma infusion (PE/PI), for 28 days or longer, prior to the start of Screening for the current TMA.
14. History of malignancy within five years of Screening with the exception of a non-melanoma skin cancer or carcinoma in situ of the cervix that has been treated with no evidence of recurrence.
15. Bone marrow transplant (BMT)/hematopoietic stem cell transplant (HSCT) within the last six months prior to the start of Screening.
16. HUS related known genetic defects of cobalamin C metabolism.
17. Known systemic sclerosis (scleroderma), systemic lupus erythematosus (SLE), or antiphospholipid antibody positivity or syndrome.
18. Chronic dialysis (defined as dialysis on a regular basis as renal replacement therapy for end-stage kidney disease).
19. Patients receiving chronic intravenous immunoglobulin (IVIg) within 8 weeks prior to the start of Screening, unless for unrelated medical condition (e.g., hypogammaglobinemia); or chronic rituximab therapy within 12 weeks prior to the start of Screening.
20. Patients receiving other immunosuppressive therapies such as steroids, mTORi (e.g., sirolimus, everolimus), CNI (e.g., cyclosporine or tacrolimus) are excluded unless part of an established post-transplant antirejection regimen, or a patient has confirmed anti-complement factor antibodies requiring immunosuppressive therapy, or steroids are being used for a condition other than aHUS (e.g., asthma).
21. Participation in another interventional treatment study or use of any experimental therapy within 30 days before initiation of study drug on Day 1 in this study or within 5 half-lives of that investigational product, whichever is greater.
22. For Cohort 1 patients, prior use of any complement inhibitors.
23. For Cohort 2 patients, prior use of complement inhibitors other than eculizumab.
24. For Cohort 2 patients, any known abnormal TMA parameters within 90 days prior to Screening (e.g., LDH≥1.5×ULN, or platelet count <150,000/μL, or eGFR≤30 mL/min/1.73 m$^2$ using the Schwartz formula).
25. Hypersensitivity to any ingredient contained in the study drug, including hypersensitivity to murine proteins.
26. Any medical or psychological condition that, in the opinion of the Investigator or Sponsor, could increase the risk to the patient by participating in the study or confound the outcome of the study.
27. Known or suspected history of drug or alcohol abuse or dependence within one year prior to the start of Screening.
28. Use of tranexamic acid within seven days prior to Screening is prohibited.

3. Investigational Product, Dosage and Mode of Administration

Ravulizumab, a humanized anti-C5 monoclonal antibody composed of two 448 amino acid heavy chains and two 214 amino acid light chains, is an IgG2/4 kappa immunoglobulin consisting of human constant regions, and murine complementarity-determining regions grafted onto human framework light- and heavy-chain variable regions.

Ravulizumab drug product is supplied for clinical studies as a sterile, preservative-free 10 mg/mL solution in single-use vials and designed for infusion by diluting into commercially available saline (0.9% sodium chloride injection; country-specific pharmacopeia) for administration via IV infusion. Table 2 and the current IB provide additional information.

TABLE 2

| | Study Drug |
|---|---|
| Product Name | Ravulizumab |
| Dosage Form | Concentrated solution (10 mg/mL) for infusion |
| Route of Administration | Intravenous infusion |
| Physical Description | Clear to translucent, slight whitish color, practically free from particles |
| Manufacturer | Alexion Pharmaceuticals, Inc. or Contracted Manufacturing Organization |

Ravulizumab is packaged in United States Pharmacopeia (USP)/European Union Pharmacopeia (EP) Type 1 borosilicate glass vials and stoppered with a butyl rubber stopper with an aluminum overseal and a flip-off cap. Study drug is supplied in kits. Ravulizumab is released to each site upon receipt of all required essential documents based upon applicable regulations.

Upon arrival of the study drug kits at the study site, the pharmacist (or trained designee) promptly removes the study drug kits from the shipping cooler and stores them in their original cartons under refrigerated conditions at 2 C to 8 C and protected from light. Ravulizumab is not frozen. Study drug is stored in a secure, limited-access storage area, and the temperature is monitored daily.

The admixed drug product is at room temperature prior to administration. The material is not heated (e.g., by using a microwave or other heat source) other than by ambient air temperature.

Ravulizumab is not administered as an IV push or bolus injection. Infusions of study drug are prepared using aseptic technique. The patient's required dose of ravulizumab is further diluted into commercially available saline (0.9% sodium chloride; country-specific pharmacopeia) at the volume specified in Table 3. Ravulizumab admixture is administered to the patient using an IV tubing administration set via an infusion pump. Use of a 0.2 micron filter for infusion is required.

TABLE 3

Dosing Reference Chart for Ravulizumab Dose Preparation

| Dose Type | Body Weight (kg)[a] | Dose (mg) | Ravulizumab Volume (mL) | Saline Volume (mL) | Total Volume (mL) | Min. Infusion Duration minutes (hours) | Max. Infusion Rate (mL/hour) |
|---|---|---|---|---|---|---|---|
| Loading | ≥5 to <10 | 600 | 60 | 60 | 120 | 228 (3.8) | 31.5 |
| | ≥10 to <20 | 600 | 60 | 60 | 120 | 113 (1.9) | 63.1 |
| | ≥20 to <30 | 900 | 90 | 90 | 180 | 86 (1.5) | 120.0 |
| | ≥30 to <40 | 1200 | 120 | 120 | 240 | 77 (1.3) | 184.6 |
| | ≥40 to <60 | 2400 | 240 | 240 | 480 | 114 (1.9) | 253 |
| | ≥60 to <100 | 2700 | 270 | 270 | 540 | 102 (1.7) | 318 |
| | ≥100 | 3000 | 300 | 300 | 600 | 108 (1.8) | 333 |
| Maintenance | ≥5 to <10 | 300 | 30 | 30 | 60 | 113 (1.9) | 31.5 |
| | ≥10 to <20 | 600 | 60 | 60 | 120 | 113 (1.9) | 63.1 |
| | ≥20 to <30 | 2100 | 210 | 210 | 420 | 194 (3.3) | 127.2 |
| | ≥30 to <40 | 2700 | 270 | 270 | 540 | 167 (2.8) | 192.8 |
| | ≥40 to <60 | 3000 | 300 | 300 | 600 | 140 (2.4) | 250 |
| | ≥60 to <100 | 3300 | 330 | 330 | 660 | 120 (2.0) | 330 |
| | ≥100 | 3600 | 360 | 360 | 720 | 132 (2.2) | 328 |

Refer to the Pharmacy Manual for additional dose preparation instructions.
[a]Body weight as recorded on Dose Regimen Decision Days. If the Dose Regimen Day is also dosing day, body weight is recorded predose with dosing that day based on the previous Dose Regimen Day body weight.

Doses of study drug are only prepared and dispensed by a pharmacist or a medically qualified study personnel. Study drug is dispensed only to enrolled patients who are confirmed eligible for participation in this study. Once study drug is prepared for a patient, it is only administered to that patient. Vials of study drug are for one-time use only and any drug product remaining in the vial is not used for another patient. Any drug remaining in the infusion tubing or infusion bag is not used for another patient.

All clinical study material is stored in a secure place and allocated and dispensed by appropriately trained persons. Detailed records of the amounts of the investigational product received, dispensed and destroyed are maintained. Unless otherwise notified, empty vials and vials with residual materials are kept for inspection and accountability by the study monitor prior to their destruction or handled per local pharmacy standard operating procedures (SOPs) for clinical study drugs. To satisfy regulatory requirements regarding drug accountability, at the end of the study all remaining ravulizumab inventory is reconciled and destroyed or returned according to applicable regulations.

For Cohort 1 and Cohort 2, ravulizumab loading doses on Day 1 and maintenance doses on Day 15 and once every eight weeks (q8w) thereafter for patients weighing ≥20 kg, or once every four weeks (q4w) for patients weighing <20 kg are administered by IV infusion. Dosages are based on the patient's body weight recorded on Dose Regimen Decision Days (if the Dose Regimen Day is a dosing day, body weight is recorded predose), as shown in Table 3.

During the Initial Evaluation Period, changes to dose regimen (dose level or dose frequency [e.g., q4w vs q8w]) are based on the patient's body weight on the "Dose Regimen Decision Day (patients on q4w or q8w schedules)" preceding the day of administration. Patients changing from q4w to q8w are administered their first q8w dose on the ravulizumab administration day ("ravulizumab administration [patients weighing ≥20 kg]") following the "Dose Regimen Decision Day (patients on q4w or q8w schedules)." Patients changing from q8w to q4w are administered their first q4w dose on the ravulizumab administration day ("ravulizumab administration [patients weighing <20 kg]") following the "Dose Regimen Decision Day (patients on q4w or q8w schedules)."

During the Extension Period, the dose of ravulizumab is based on the patient's body weight on the preceding "Dose Regimen Decision Day (patients on q4w schedule)" or "Dose Regimen Decision Day (patients on q8w schedule)." Patients changing from q4w to q8w are administered their first q8w dose on the ravulizumab administration day ("ravulizumab administration [patients weighing ≥20 kg]") following the "Dose Regimen Decision Day (patients on q4w schedule)." Patients changing from q8w to q4w are administered their first q4w dose on the ravulizumab administration day ("ravulizumab administration [patients weighing 5<20 kg]") 8 weeks after the "Dose Regimen Decision Day (patients on q8w schedule)."

4. Endpoints: Efficacy Assessments

As patients previously treated with eculizumab have stabilized TMA parameters at study entry, Cohort 2 patients are excluded from the following efficacy assessments: Complete TMA Response, Time to Complete TMA Response, Complete TMA Response status over time, and increase in hemoglobin from baseline.

The primary efficacy endpoint for Cohort 1 is Complete TMA Response during the 26-week Initial Evaluation Period, as evidenced by normalization of hematological parameters (platelet count and LDH) and ≥25% improvement in serum creatinine from baseline. Patients must meet all Complete TMA Response criteria at two separate assessments obtained at least 4 weeks (28 days) apart, and any measurement in between.

The secondary efficacy endpoints for Cohort 1 are the following and are measured through 26 weeks and over the entire study period: (1) dialysis requirement status, (2) time to Complete TMA Response, (3) complete TMA Response status over time, (4) observed value and change from baseline in eGFR, (5) CKD stage, as evaluated by eGFR at select target days and classified as improved, stable (no change), or worsened compared to baseline, (6) observed value and change from baseline in hematologic parameters (platelets, LDH, hemoglobin), (7) increase in hemoglobin of ≥20 g/L from baseline, observed at 2 separate assessments obtained at least 4 weeks (28 days) apart, and any measurement in between, and (8) change from baseline in QoL, as measured by pediatric FACIT-Fatigue questionnaire (patients ≥5 years of age).

The secondary efficacy endpoints for Cohort 2 are the following and are measured through 26 weeks and over the entire study period: (1) dialysis requirement status, (2) observed value and change from baseline in eGFR, (3) CKD stage, as evaluated by eGFR at select target days and classified as improved, stable (no change), or worsened compared to baseline, (4) observed value and change from baseline in hematologic parameters (platelets, LDH, hemoglobin), and (5) change from baseline in QoL, as measured by Pediatric FACIT-Fatigue questionnaire (patients ≥5 years of age).

The following PK/PD endpoints are applicable for Cohort 1 and Cohort 2: (1) changes in serum ravulizumab concentration over time and (2) changes in serum free C5 concentrations over time.

Biomarker, genetic, and extra-renal signs or symptoms of aHUS are exploratory endpoints that are applicable for Cohort 1 and Cohort 2. Exploratory biomarkers of PD effect may include, but are not limited to, change from baseline in levels of markers of complement dysregulation (e.g., factor Ba), vascular inflammation (e.g., soluble tumor necrosis factor receptor 1 [sTNFR1]), endothelial activation/damage (e.g., soluble vascular adhesion molecule 1 [sVCAM-1], thrombomodulin), coagulation (e.g., D-dimer), and renal injury (e.g., cystatin C). Additional assessments may include measurements of ravulizumab excretion in urine, chicken red blood cell (cRBC) hemolysis, total C5, autoantibodies to complement proteins (e.g., anti-factor H).

Exploratory genetics may be performed to investigate genetic variants in genes known to be associated with aHUS, as well as to identify novel genetic variants associated with aHUS, complement dysregulation, or metabolism or efficacy of ravulizumab. Patients (or legal guardians) may decline from providing a sample for exploratory genetics and still participate in the study.

The Investigator evaluates extra-renal signs or symptoms of aHUS using clinical laboratory measurements, vital signs, and an organ system review.

For Cohort 1 and Cohort 2, the long-term safety and tolerability of ravulizumab are evaluated by physical examinations, vital signs, physical growth (height, weight, and head circumference [the latter only in patients ≤2 years of age]), electrocardiograms (ECG), laboratory assessments, and incidence of adverse events (AEs) and serious adverse events (SAEs). The proportion of patients who develop antidrug antibodies (ADA) are also assessed.

5. Statistical Methods

Continuous variables are summarized using descriptive statistics, including number of observations and mean, standard deviation (SD), median, minimum, and maximum values. Categorical variables are summarized by frequency counts and percentage of patients. The analyses for Cohort 1 and Cohort 2 are conducted and reported separately. Analyses specific to Cohort 1 are indicated as such below; all other endpoints are performed for both cohorts. Tabulated summaries do not include a direct comparison between Cohort 1 and Cohort 2.

An interim clinical study report (CSR) is prepared when 12 to 14 complement inhibitor treatment-naïve (i.e., Cohort 1) patients have completed or withdrawn from the 26-week Initial Evaluation Period. An additional interim CSR is prepared when all study patients have completed or withdrawn from the 26-week Initial Evaluation Period. Each interim CSR includes efficacy, safety and PK/PD analyses. A final CSR to summarize long-term efficacy, safety and PK/PD is produced at study completion. Available exploratory data are summarized after study completion, but may not be included in the CSR. All data collected are presented using summary tables, figures and data listings. Planned summaries are presented overall and by age groups when applicable.

Efficacy analyses are performed on the Full Analysis Set (FAS). The analysis of the FAS is the primary analysis. The FAS for Cohort 1 is based on a modified intent to treat (mITT) approach. With this approach, confirmation of eligibility in patients may occur after receiving study drug. This specifically applies to Inclusion Criterion number 2c (must be confirmed via a central laboratory), Exclusion Criterion number 1 (may be confirmed via a central or local laboratory), and Exclusion Criterion number 2 (may be confirmed via a central or local laboratory). Based on the above, the FAS includes all patients who receive at least one dose of ravulizumab, have at least one post-baseline efficacy assessment, and meet all of the following criteria (these are the same criteria that if not satisfied result in discontinuation of the patient and potential replacement): (1) patients who satisfy Inclusion Criterion number 2c, (2) patients who satisfy Exclusion Criterion number 1, and (3) patients who satisfy Exclusion Criterion number 2. The FAS for Cohort 2 includes all patients who receive at least one dose of ravulizumab and have at least one post-baseline efficacy assessment. The FAS is determined prior to database lock and prior to the database snapshots for the analyses performed at the end of the 26-week Initial Evaluation Period.

The primary efficacy endpoint is Complete TMA Response during the 26-week Initial Evaluation Period. The primary analysis consists in estimating the proportion of complete TMA responders among ravulizumab treated patients. This is performed by calculating the point estimate and a 95% confidence interval (CI) for the proportion of complete TMA responders in ravulizumab treated patients. The CI is based on exact confidence limits using the Clopper-Pearson method. This analysis is only performed for Cohort 1.

For the secondary efficacy endpoint of time to Complete TMA Response, a Kaplan-Meier cumulative distribution curve is generated along with a 2-sided 95% CI. The corresponding summary table presents the cumulative distribution function (CDF) estimate, the number of patients at risk, the number of patients responding, and the number of patients censored at each post-baseline time point. The table also presents first quartile, median and third quartile, along with corresponding 2-sided 95% CI, of time to complete response. This analysis is only performed for Cohort 1.

Complete TMA response is also summarized over time by presenting the number and proportion of responders along with a 2-sided 95% CI for each post-baseline time point. A similar approach is used to summarize the number and proportion of patients with an increase from baseline in hemoglobin ≥20 g/L, observed at 2 separate assessments obtained at least 4 weeks (28 days) apart, and any measurement in between. This analysis is only performed for Cohort 1.

Kidney function (dialysis requirement status, eGFR, CKD stage), as well as hematologic parameters (platelets, LDH, hemoglobin), is summarized at baseline and each post-baseline time point. These analyses are performed for both Cohort 1 and Cohort 2. Descriptive statistics for continuous variables (eGFR, platelets, LDH, hemoglobin) are used to summarize the observed value, as well as the change from baseline. A mixed model for repeated measures (MMRM) with the fixed, categorical effect of visit and fixed, continuous effect of the specific test's baseline value as covariates may be fit to test whether changes differ from zero at each time point. Dialysis requirement status and CKD stage are summarized over time. Dialysis requirement status is summarized among patients receiving dialysis within five days prior to ravulizumab treatment initiation by presenting the number and proportion of those patients receiving and not receiving dialysis at each time point. A 2-sided 95% CI for the proportion receiving dialysis is provided. CKD stage is summarized over time by presenting the number and proportion of patients that improved (excluding those with Stage 1 at baseline as they cannot improve), worsened (excluding those with Stage 5 at baseline as they cannot worsen), and stayed the same compared to CKD stage at baseline. Stage 5 is considered the worst category, while Stage 1 is considered the best category. A 2-sided 95% CI for the proportion is provided for each category.

Quality of life is assessed in patients ≥5 years of age by the pediatric FACIT-Fatigue Questionnaire (patient-reported for patients who were ≥8 years of age at the time of enrollment; caregiver-reported or caregiver assistance for patients who were 5 to <8 years of age at the time of enrollment). This measure is summarized at baseline and each post-baseline time point using descriptive statistics for continuous variables for the observed value, as well as the change from baseline. A MMRM with the fixed, categorical effect of visit and fixed, continuous effect of the test's baseline value as covariates may be fit to test whether changes differ from zero at each time point. These analyses are performed for both Cohort 1 and Cohort 2. Analyses are separate for patients who were 5 to <8 years of age at the time of enrollment (caregiver-reported or caregiver assistance) and patients who were ≥8 years of age at the time of enrollment (patient-reported).

Safety analyses are performed on the Safety Set defined as all patients who received at least 1 dose of ravulizumab for both Cohort 1 and Cohort 2. The incidence of treatment emergent adverse events (TEAEs) and SAEs are summarized by system organ class (SOC) and preferred term (PT) overall, by severity, and by relationship to treatment. Observed values and changes from baseline (last assessment prior to ravulizumab) in ECGs, vital signs, and laboratory assessments, as well as presence of ADA, are summarized. Shifts from baseline in laboratory assessments are summarized for all study visits. These analyses are performed for both Cohort 1 and Cohort 2.

Meningococcal infections are an important identified risk in this study.

An adverse event (AE) is any untoward medical occurrence in a patient administered a pharmaceutical product that does not necessarily have a causal relationship with this treatment. An AE can therefore be any unfavorable or unintended sign (e.g., an abnormal laboratory finding), symptom, or disease temporally associated with the use of a medicinal product, whether or not considered related to the medicinal product.

Situations in which an untoward medical occurrence did not occur (e.g., hospitalization for elective surgery if planned before the start of the study, admissions for social reasons or convenience), and anticipated day-to-day fluctuations of pre-existing disease(s) or condition(s) present or detected at the start of the study that do not worsen are not AEs.

The severity of AEs is graded using Common Terminology Criteria for Adverse Events (CTCAE) version 4.03 or higher. A grading (severity) scale is provided for each AE term. Each CTCAE term is a Lowest Level Term (LLT) per the Medical Dictionary for Regulatory Activities (MedDRA®). Each LLT is coded to a MedDRA preferred term (PT). Grade refers to the severity of the AE. The CTCAE assigns a grade of 1 through 5, with unique clinical descriptions of severity for each AE (Table 4).

TABLE 4

Adverse Event Severity Grading Scale

| Grade | Description |
| --- | --- |
| Grade 1 | Mild; asymptomatic or mild symptoms; clinical or diagnostic observations only; intervention not indicated |
| Grade 2 | Moderate; minimal, local or noninvasive intervention indicated; limiting age-appropriate instrumental activities of daily living (ADL)$^a$ |
| Grade 3 | Severe or medically significant, but not immediately life-threatening; hospitalization or prolongation of hospitalization indicated; disabling; limiting self-care ADL$^b$ |
| Grade 4 | Life-threatening consequences; urgent intervention indicated. |
| Grade 5 | Death related to AE. |

Abbreviations:
ADL = activities of daily living;
AE = adverse event
$^a$Instrumental ADL refers to preparing meals, shopping for groceries or clothes, using the telephone, managing money, etc.
$^b$Self-care ADL refers to bathing, dressing and undressing, feeding self, using the toilet, taking medications, and not bedridden.

Any change in the severity of an AE is documented based on specific guidelines in the eCRF Completion Guidelines. Severity and seriousness are differentiated: severity describes the intensity of an AE, while the term seriousness refers to an AE that has met specific criteria for a serious adverse event (SAE).

An Investigator must provide a causality assessment (Unrelated, Unlikely, Possible, Probable, or Definite) for all AEs (both serious and nonserious) based upon the Investigator's medical judgment and the observed symptoms associated with the event (Table 5). This assessment is recorded on the eCRF and any additional forms as appropriate.

TABLE 5

Causality Assessment Descriptions

| Assessment | Description |
| --- | --- |
| Not Related/ Unrelated | Suggests that there is no causal association between the investigational product and the reported event. |
| Unlikely Related | Suggests that the clinical picture is highly consistent with a cause other than the investigational product but attribution cannot be made with absolute certainty and a relationship between the investigational product and AE cannot be excluded with complete confidence. |

TABLE 5-continued

Causality Assessment Descriptions

| Assessment | Description |
|---|---|
| Possibly Related | Suggests that treatment with the investigational product may have caused or contributed to the AE (e.g., the event follows a reasonable temporal sequence from the time of drug administration and/or follows a known response pattern to the investigational product, but could also have been produced by other factors). |
| Probably Related | Suggests that a reasonable temporal sequence of the event with the investigational product administration exists and the likely causal association of the event with the investigational product. This is based upon the known pharmacological action of the investigational product, known or previously reported adverse reactions to the investigational product or class of drugs, or judgment based on the Investigator's clinical experience. |
| Definitely Related | Temporal relationship to the investigational product, other conditions (concurrent illness, concurrent medication reaction, or progression/expression of disease state) do not appear to explain event, corresponds with the known pharmaceutical profile, improvement on discontinuation, reappearance on rechallenge. |

A serious adverse event (SAE) is any untoward medical occurrence that: results in death, is life-threatening (i.e., patient was at risk of death at the time of the event), requires in-patient hospitalization or prolongation of existing hospitalization, results in persistent or significant disability/incapacity, or is a congenital anomaly/birth defect.

Important medical events that may not result in death, be immediately life-threatening or require hospitalization, may be considered a serious adverse event when, based upon appropriate medical judgment, they may jeopardize the patient or may require intervention to prevent one of the outcomes listed above.

Suspected unexpected serious adverse reactions (SUSARs) are serious events that are not listed in the IB and that the Investigator identifies as related to investigational product or procedure.

All SAEs are recorded regardless of the Investigator's assessment of causality. No time limit exists on reporting SAEs that are thought to be causally related to the study drug. Investigators are at liberty to report SAEs irrespective of causality at any time.

For all SAEs, the Investigator must provide the following: appropriate and requested follow-up information, causality of the SAE(s), treatment of/intervention for the SAE(s), outcome of the SAE(s), and supporting medical records and laboratory/diagnostic information.

Pregnancy data are collected during this study for all patients and female spouse/partner of male patients. Exposure during pregnancy (also referred to as exposure in utero) can be the result of either maternal exposure or transmission of drug product via semen following paternal exposure. Pregnancy in itself is not regarded as an AE unless there is a suspicion that the investigational product may have interfered with the effectiveness of a contraceptive medication. Complications of pregnancy and abnormal outcomes of pregnancy, however, are AEs and may meet the criteria for an SAE (e.g., ectopic pregnancy, spontaneous abortion, intrauterine fetal demise, neonatal death or congenital anomaly). Elective abortions without complications should not be reported as AEs.

Sparse PK and PD (serum free C5) samples are collected over the course of the study. Individual serum concentration data for all patients from the FAS and who have evaluable PK data are used to derive the PK parameters for ravulizumab. These analyses are performed for both Cohort 1 and Cohort 2. Graphs of mean serum concentration-time profiles are constructed. Graphs of serum concentration-time profiles for individual patients may also be provided. Actual dose administration and sampling times are used for all calculations. Descriptive statistics are calculated for serum concentration data at each sampling time, as appropriate. Assessment of population-PK may be considered using data from this study or in combination with data from other studies.

PD analyses are performed for all patients from the Cohort 1 FAS and Cohort 2 FAS who have evaluable PD data. The PD effects of ravulizumab are evaluated by assessing the absolute values and changes and percentage changes from baseline in serum free C5 serum concentrations over time, as appropriate. Descriptive statistics are calculated for the PD data at each sampling time, as appropriate. Assessments of PK/PD relationships may be explored using data from this study or in combination with data from other studies.

Exploratory analyses may be conducted for both Cohort 1 and Cohort 2 to evaluate changes from baseline in biomarkers that may include, but are not limited to, markers of complement dysregulation (e.g., Factor Ba), vascular inflammation (e.g., sTNFR1), endothelial activation/damage (e.g., sVCAM-1, thrombomodulin) coagulation (e.g., D-dimer), and renal injury (e.g., cystatin C). Additional analysis may include evaluation of ravulizumab excretion in urine, cRBC hemolysis, total C5, and autoantibodies to complement proteins (e.g., anti-factor H).

Exploratory genetics may be performed for both Cohort 1 and Cohort 2 to investigate genetic variants in genes known to be associated with aHUS, as well as to identify novel genetic variants associated with aHUS, complement dysregulation, or metabolism or efficacy of ravulizumab. Patients (or legal guardian) may decline from providing a sample for exploratory genetics and still participate in the study.

Extra-renal signs or symptoms of aHUS are summarized at baseline and each post-baseline assessment by presenting the number and proportion of patients with a specific symptom present. This analysis is performed for both Cohort 1 and Cohort 2.

Example 2: Interim Data for Phase 3, Open-Label, Multicenter Study of Ravulizumab in Complement Inhibitor-Naïve Children and Adolescent Patients with aHUS The following is a summary of interim data from a single arm, open label, estimation study of ravulizumab in children and adolescents with aHUS that was conducted substantially according to the protocol described above in Example 1. It includes results through the end of the 26-week Initial Evaluation Period or until study discontinuation for the first 16 patients enrolled in the study, all of whom are in Cohort 1. The study design is depicted in FIG. 1.

The objective of the study is to assess the efficacy of ravulizumab in complement inhibitor treatment-naïve pediatric patients with aHUS to inhibit complement-mediated thrombotic microangiopathy (TMA) as characterized by thrombocytopenia, hemolysis and renal impairment. The primary endpoint is complete TMA response within the initial evaluation period (26 weeks).

A. Data Sets Analyzed

Figure 2:
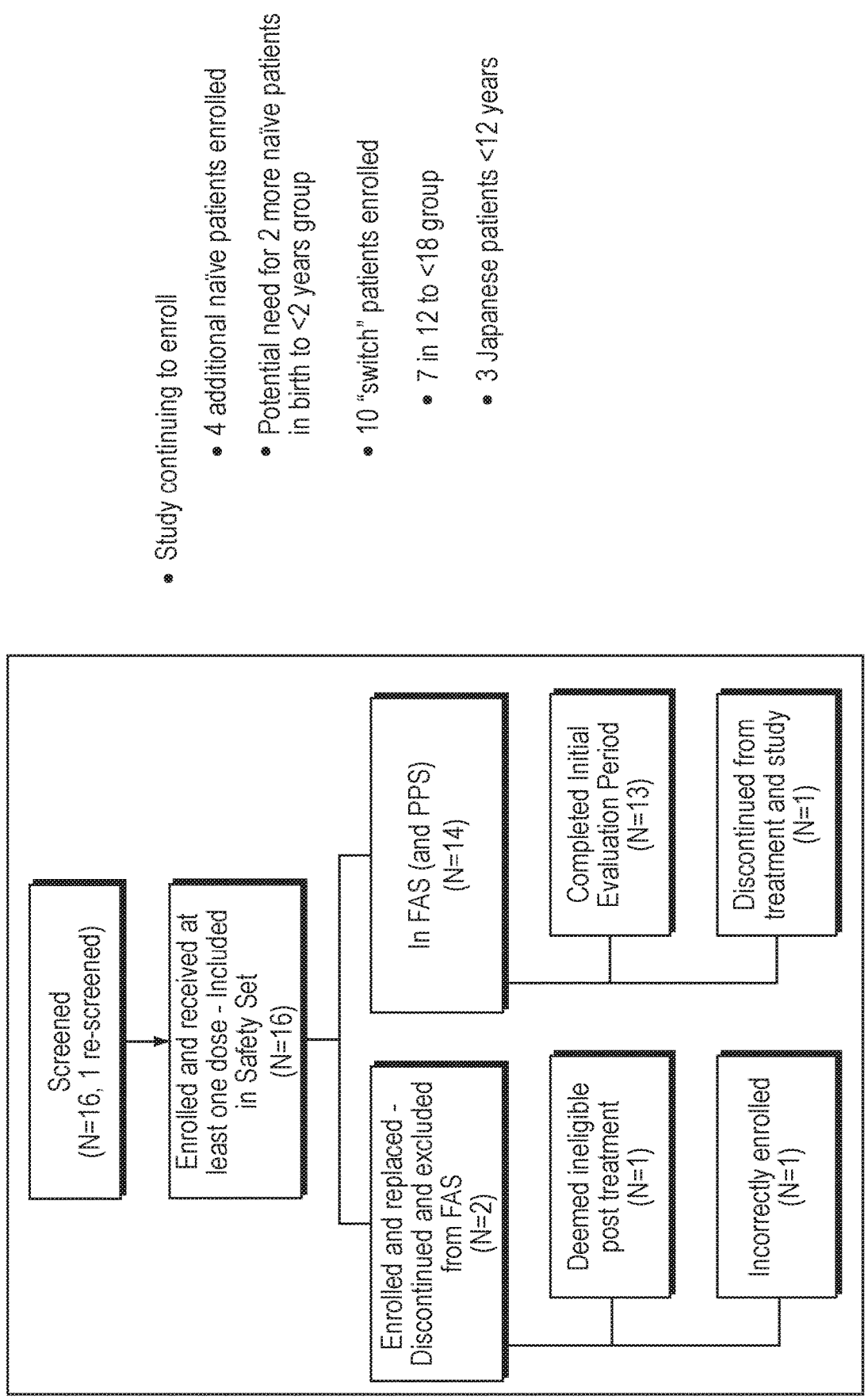
FIG. 2 is a schematic depicting patient disposition.

Four patients in each of four age groups were included, i.e., (A) birth to <2 years, (B) 2 to <6 years, (C) 6 to <12 years and (D) 12 to <18 years. Sixteen subjects were enrolled and received at least one dose (included in safety set), two enrolled and were replaced (deemed ineligible post-first dose and discontinued), and fourteen were in the full analysis set, and one subject discontinued on Day 21 due to adverse events. There was 100% compliance with the study treatment. A patient disposition summary is set forth in FIG. 2 and further described in Table 6. The baseline demographics (Table 7) and baseline disease characteristics (Table 8) are set forth below.

TABLE 6

Disposition of Patients- Initial Evaluation Period (All Enrolled Patients)

| | ravulizumab n (%) |
|---|---|
| Enrolled | 16 (100.0) |
| Treated | 16 (100.0) |
| Completed the Initial Evaluation Period | 13 (81.3) |
| Completed study | 0 |
| Discontinued from treatment | 3 (18.8) |
| Adverse event | 1 (6.3) |
| Non-compliance with study drug | 0 |
| Physician decision | 0 |
| Pregnancy | 0 |
| Protocol violation | 1 (6.3) |
| Subject decision | 0 |
| Lack of efficacy | 0 |
| Other [a] | 1 (6.3) |
| Withdrawn from study | 3 (18.8) |
| Adverse event | 1 (6.3) |
| Death | 0 |
| Lost to follow-up | 0 |
| Non-compliance with study drug | 0 |
| Physician decision | 0 |
| Pregnancy | 0 |
| Protocol violation | 1 (6.3) |
| Study terminated by Sponsor | 0 |
| Withdrawal by subject | 0 |
| Lack of efficacy | 0 |
| Deemed ineligible post-treatment | 1 (6.3) |
| Other | 0 |

[a] This patient was withdrawn from study drug since the patient was deemed ineligible based on the central laboratory results received after the first dose.

TABLE 7

Baseline Demographics

| Variable | Overall (N = 14) |
|---|---|
| Age at Time of First Infusion (years) | |
| Mean (SD) | 6.1 (4.52) |
| Median (min, max) | 5.2 (0.9, 17.3) |
| Age at Time of First Infusion (years) category, n (%): | |
| Birth to <2 years | 2 (14.3) |
| 2 to <6 years | 7 (50.0) |
| 6 to <12 years | 4 (28.6) |
| 12 to <18 years | 1 (7.1) |
| Sex. n(%): Males | 5 (35.7) |
| Sex. n(%): Females | 9 (64.3) |
| Ethnicity, n (%): Hispanic or Latino | 2 (14.3) |
| Ethnicity, n (%): Not Hispanic or Latino | 12 (85.7) |
| Race, n(%): | |
| American Indian or Alaskan Native | 1 (7.1) |
| Asian | 4 (28.6) |
| Black or African American | 2 (14.3) |
| Native Hawaiian or Other Pacific Islander | 0 (0.0) |
| White | 7 (50.0) |
| Unknown | 1 (7.1) |

TABLE 7-continued

Baseline Demographics

| Variable | Overall (N = 14) |
|---|---|
| Japanese Descent, n (%) | |
| Yes | 1 (7.1) |
| No | 13 (92.9) |
| Height at Baseline (cm) | |
| Mean (SD) | 108.5 (24.70) |
| Median (min, max) | 108.5 (64, 138.1) |
| Weight at Time of First Infusion (kg), Mean (SD) | |
| Mean | 19.8 (9.94) |
| Median (min, max) | 16.2 (8.4, 35.75) |
| Weight at Time of First Infusion (kg) category, n (5) | |
| >=5 to <10 kg | 2 (14.3) |
| >=10 to <20 kg | 7 (50.0) |
| >=20 to <30 kg | 2 (14.3) |
| >=30 to <40 kg | 3 (21.4) |

TABLE 8

Baseline Disease Characteristics

| Variable | Overall (N = 14) |
|---|---|
| Age(years) at time of first aHUS symptoms, Mean (SD) | 4.94 (3.081) |
| Pre-treatment Extra-Renal signs or symptoms of aHUS, n(%) | 10 (71.4) |
| Kidney Transplant Prior to Entering the study, n(%) | 1 (7.1) |
| CKD stage at baseline, n(%) | |
| 1 | 0 (0.0) |
| 2 | 2 (14.3) |
| 3a | 1 (7.1) |
| 3b | 0 (0.0) |
| 4 | 6 (42.9) |
| 5 | 5 (35.7) |
| Dialysis Within 5 Days of First Dose, n(%) | 5 (35.7) |

The first 16 patients enrolled and treated in Cohort 1 are included in the Safety Set (Table 9). Two patients were excluded from the full analysis set. Both of these patients were treated based on verification of inclusion and exclusion criteria through local laboratory results and then later discontinued due to failure to meet certain eligibility criteria once all Screening/Day 1 central laboratory results were available. All 14 patients in the full analysis set were included in the per protocol set.

TABLE 9

Analysis Data Sets (All Enrolled Patients)

| Variable | ravulizumab n (%) |
|---|---|
| Number of enrolled patients | 16 (100.0) |
| Number of patients in the FAS | 14 (87.5) |
| Number of patients excluded from the FAS | 2 (12.5) |
| Number of patients in the PP Set | 14 (87.5) |

TABLE 9-continued

Analysis Data Sets (All Enrolled Patients)

| Variable | ravulizumab n (%) |
|---|---|
| Number of patients excluded from the PP Set | 2 (12.5) |
| Number of patients in the Safety Set | 16 (100.0) |
| Number of patients excluded from the Safety Set | 0 |
| Number of patients in the PK/PD Analysis Set | 14 (87.5) |
| Number of patients excluded from the PK Analysis Set | 2 (12.5) |

Abbreviations: FAS = Full Analysis Set; PD = pharmacodynamics; PK = pharmacokinetics; PP = Per Protocol.

For the 14 patients in the full analysis set, the mean age at the time of first aHUS symptoms was 4.94 years (Table).

At baseline (within 5 days of the first dose of study drug), 5 (35.7%) of the 14 patients in the FAS had received kidney dialysis related to kidney failure caused by aHUS. One (7.1%) patient in the full analysis set had a kidney transplant related to aHUS prior to entering the. The majority of patients (11 of 16 patients) evaluated at baseline were CKD Stage 4 or 5, with 5 patients (35.7%) being Stage 5.

TABLE 10

Disease Characteristics (Full Analysis Set)

| Characteristic | ravulizumab (N = 14) |
|---|---|
| Age (years) at time of first aHUS symptoms | |
| Mean (SD) | 4.94 (3.081) |
| Median (min, max) | 4.10 (0.8, 11.2) |
| Dialysis at baseline, n (%) | 5 (35.7) |
| Any kidney transplant prior to entering the study[a], n (%) | 1 (7.1) |
| Related to aHUS[b] | 1 (100.0) |
| Baseline platelets ($10^9$/L) blood [normal range 229 to 533 $10^9$/L] | |
| Mean (SD) | 60.50 (33.281) |
| Median (min, max) | 64.00 (14, 125) |
| Baseline LDH (U/L) serum [normal range 165 to 395 U/L] | |
| Mean (SD) | 2324.11 (1361.515) |
| Median (min, max) | 2077.00 (772, 4985) |
| Baseline hemoglobin (g/L) blood [normal range 107 to 131 g/L] | |
| Mean (SD) | 74.82 (19.516) |
| Median (min, max) | 74.25 (32, 106) |
| Baseline eGFR (mL/min/1.73 m$^2$) [normal range ≥60 mL/min/1.73 m$^2$] | |
| Mean (SD) | 28.4 (23.11) |
| Median (min, max) | 22.0 (10, 84) |
| Baseline CKD stage, n (%) | |
| 1 | 0 |
| 2 | 2 (14.3) |
| 3A | 1 (7.1) |
| 3B | 0 |
| 4 | 6 (42.9) |
| 5 | 5 (35.7) |

Abbreviations: aHUS = atypical hemolytic uremic syndrome; chronic kidney disease; eGFR = estimated glomerular filtration rate; LDH = lactate dehydrogenase; LLN = lower limit of normal; max = maximum; min = minimum.

The majority (10/14; 71.4%) of patients had pretreatment extra-renal signs or symptoms of aHUS at baseline (Table).

TABLE 11

Pretreatment Extra-renal Signs or Symptoms of aHUS (Full Analysis Set)

| Organ System Sign or Symptom | ravulizumab (N = 14) n (%) |
|---|---|
| Any pretreatment extra-renal signs or symptoms of aHUS | 10 (71.4) |
| Cardiovascular | 7 (50.0) |
| Hypertension | 5 (35.7) |
| Sinus tachycardia | 1 (7.1) |
| Pericardial effusion | 1 (7.1) |
| Other | 1 (7.1) |
| Pulmonary | 1 (7.1) |
| Pulmonary hemorrhage | 1 (7.1) |
| Pleural effusion | 1 (7.1) |
| Central nervous system | 5 (35.7) |
| Lethargy | 3 (21.4) |
| Irritability | 2 (14.3) |
| Headache | 1 (7.1) |
| Seizures | 1 (7.1) |
| Other | 1 (7.1) |
| Gastrointestinal | 8 (57.1) |
| Nausea | 4 (28.6) |
| Vomiting | 5 (35.7) |
| Abdominal pain | 4 (28.6) |
| Elevated transaminases (ALT/AST) | 4 (28.6) |
| Pancreatitis | 1 (7.1) |
| Other | 4 (28.6) |
| Skin | 7 (50.0) |
| Petechiae | 5 (35.7) |
| Other | 4 (28.6) |
| Skeletal muscle | 1 (7.1) |
| Myalgias | 1 (7.1) |
| Other | 1 (7.1) |

Note:
Extra-renal signs or symptoms of aHUS were evaluated by the Investigator using clinical laboratory measurements (e.g., troponin I, amylase, and lipase), vital signs (e.g., heart rate, respiratory rate, pulse oximetry), and an organ system review. In summarizing n (%), if a patient had multiple reports for a particular organ system/sign or symptom, he/she was counted only once for that organ system/sign or symptom. Patients could have been counted in more than 1 organ system/sign or symptom category. Abbreviations: aHUS = atypical hemolytic uremic syndrome; ALT = alanine aminotransferase; AST = aspartate aminotransferase.

All 14 patients in the full analysis set had a hospitalization and/or an emergency room visit due to aHUS prior to start of Screening as shown in Table 12. Prior to Screening, 6 (42.9%) patients had received ICU level care during hospitalizations due to aHUS with the mean (SD) duration of the ICU stay of 10.0 (18.63 days). At the time of the first dose of study drug, 13/14 (92.9%) patients were hospitalized due to aHUS.

TABLE 12

Emergency Room Visits and Hospitalization Due to aHUS Prior to Start of Screening (Full Analysis Set)

| | ravulizumab (N = 14) n (%) |
|---|---|
| Any emergency room visits or hospitalizations, n (%)[a] | 14 (100.0) |
| Visit type, n (%)[b] | |
| Emergency room visit | 3 (21.4) |
| Hospitalization | 13 (92.9) |
| ICU level of care, n (%)[b] | |
| Yes | 6 (42.9) |
| No | 8 (57.1) |

TABLE 12-continued

Emergency Room Visits and Hospitalization Due to aHUS
Prior to Start of Screening (Full Analysis Set)

|  | ravulizumab (N = 14) n (%) |
|---|---|
| Number of days of ICU stay | |
| n[c] | 8 |
| Mean (SD) | 10.0 (18.63) |
| Median | 4.0 |
| Min, max | 1, 56 |

Note:
Patients may have been counted in both emergency room visit and hospitalization.
[a]Percentages were based on the total number of patients.
[b]Percentages were based on the total number of patients who had any emergency room visits or hospitalizations due to aHUS prior to the start of Screening.
[c]Patient could have had more than one ICU stay.
Abbreviations: aHUS = atypical hemolytic uremic syndrome; ICU = intensive care unit; max = maximum; min = minimum.

All 16 patients had a history of prior medication use. The most commonly reported (≥15% of patients) groupings of prior medications included pneumococcal vaccines (87.5%), Hib vaccines (75%), meningococcal vaccines (50.0%), sulfonamides (43.8%), solutions affecting the electrolyte balance (37.5%), combined bacterial and viral vaccines (31.3%), benzodiazepine derivatives (31.3%), blood substitutes and plasma protein fractions (31.3%), electrolyte solutions (31.3%), other general anesthetics (31.3%), anilides (25.0%), dihydropyridine derivatives (25.0%), H$_2$-receptor antagonists (25.0%), proton pump inhibitors (25.0%), alpha and beta blocking agents (18.8%), glucocorticoids (18.8%), opioid anesthetics (18.8%), other antianemic preparations (18.8%), potassium (18.8%), substituted alkylamines (18.8%), third-generation cephalosporins (18.8%), and other quaternary ammonium compounds (18.8%).

Prior to the study, 87.5% of the patients underwent a nonpharmacologic therapy or medical procedure within 28 days of screening. A total of 31.3% of the patients had pre-treatment plasma exchange/plasma infusion (PE/PI) related to the current TMA and 37.5% of the patients had kidney dialysis within 56 days prior to the first dose of study drug.

All of the patients took at least one concomitant medication. The most commonly reported (≥15% of patients) groupings of concomitant medications were penicillins with extended spectrum (75.0%), anilides (68.8%), dihydropyridine derivatives (68.8%), meningococcal vaccines (68.8%), solutions affecting the electrolyte balances (62.5%), osmotically acting laxatives (56.3%), serotonin antagonists (50.0%), benzodiazepine derivatives (43.8%), electrolyte solutions (43.8%), enemas (43.8%), other general anesthetics (43.8%), plain ACE inhibitors (37.5%), glucocorticoids (37.5%), hydrazinophthalazine derivatives (37.5%), selective immunosuppressants (37.5%), plain sulfonamides (37.5%), first-generation cephalosporins (31.3%), H$_2$-receptor antagonists (31.3%), heparin group (31.3%), other antianemic preparations (31.3%), proton pump inhibitors (31.3%), third-generation cephalosporins (31.3%), vitamin D and analogues (31.3%), alpha and beta blocking agents (25.0%), anesthetics for topical use (25.0%), oral iron bivalent preparations (25.0%), mucolytics (25.0%), natural opium alkaloids (25.0%), phenylpiperidine derivatives (25.0%), pneumococcal vaccines (25.0%), selective beta-2-adrenoreceptor agonists (25.0%), amides (18.8%), plain angiotension II antagonists (18.8%), antibiotics (18.8%), beta-lactamase sensitive penicillins (18.8%), drugs for treatment of hyperkalemia and hyperphosphatemia (18.8%), fluoroquinolones (18.8%), influenza vaccines (18.8%), solutions for parenteral nutrition (18.8%), and magnesium (18.8%).

During the study, 93.8% of patients received nonpharmacologic therapies or medical procedures. None of the patients received PE/PI.

For the 14 patients in the full analysis set, the mean (SD) treatment duration was 24.51 (6.196) weeks and all patients received all of the planned infusions during the Initial Evaluation Period. The one patient who discontinued study drug was considered 100% compliant because she had no missed doses prior to the date of discontinuation. Infusion interruption due to an adverse event was reported for one patient.

B. Efficacy Results

Figure 3:
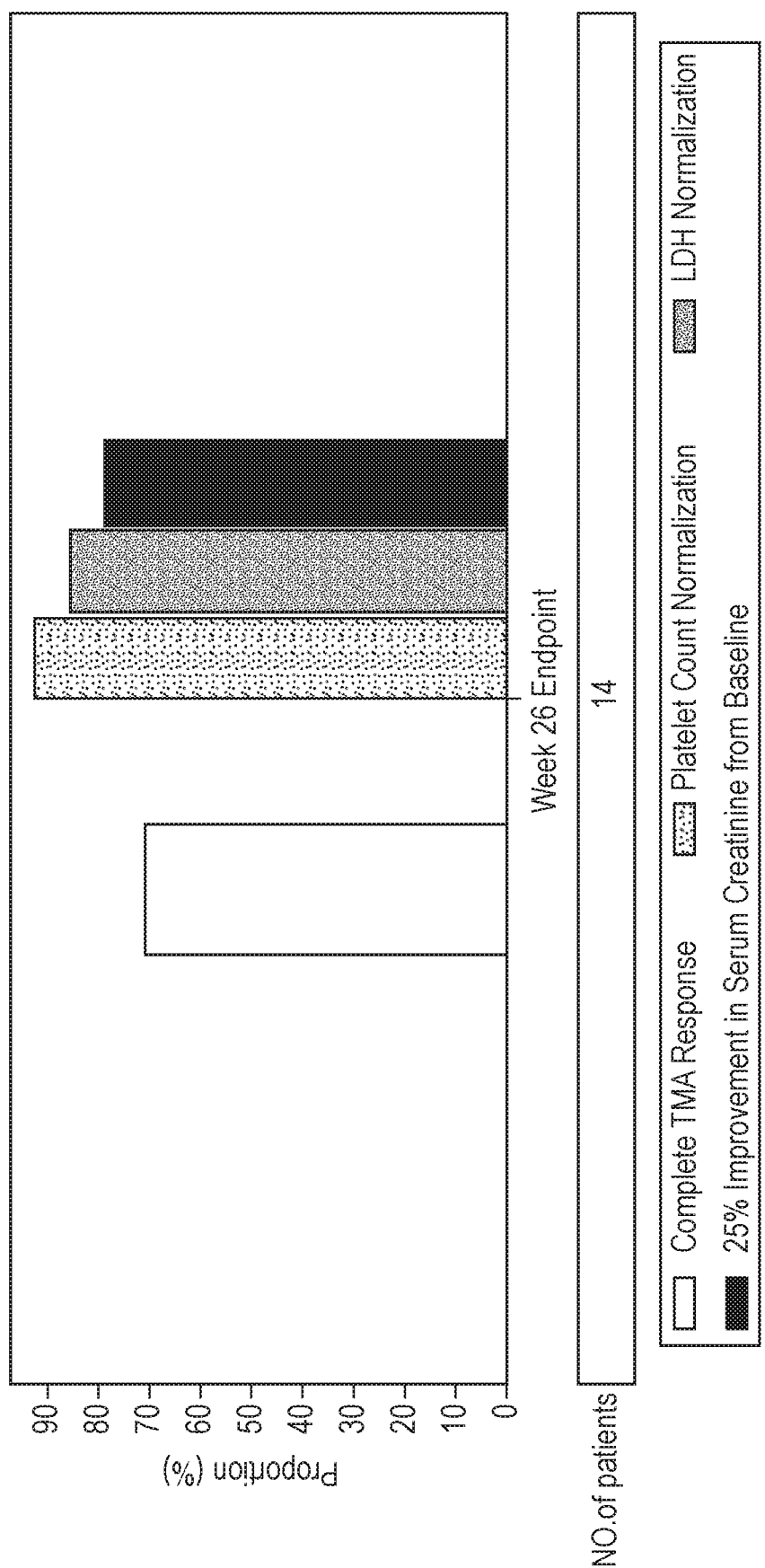
FIG. 3 is a graph depicting primary complete thrombotic microangiopathy (cTMA) response.
Figure 4:
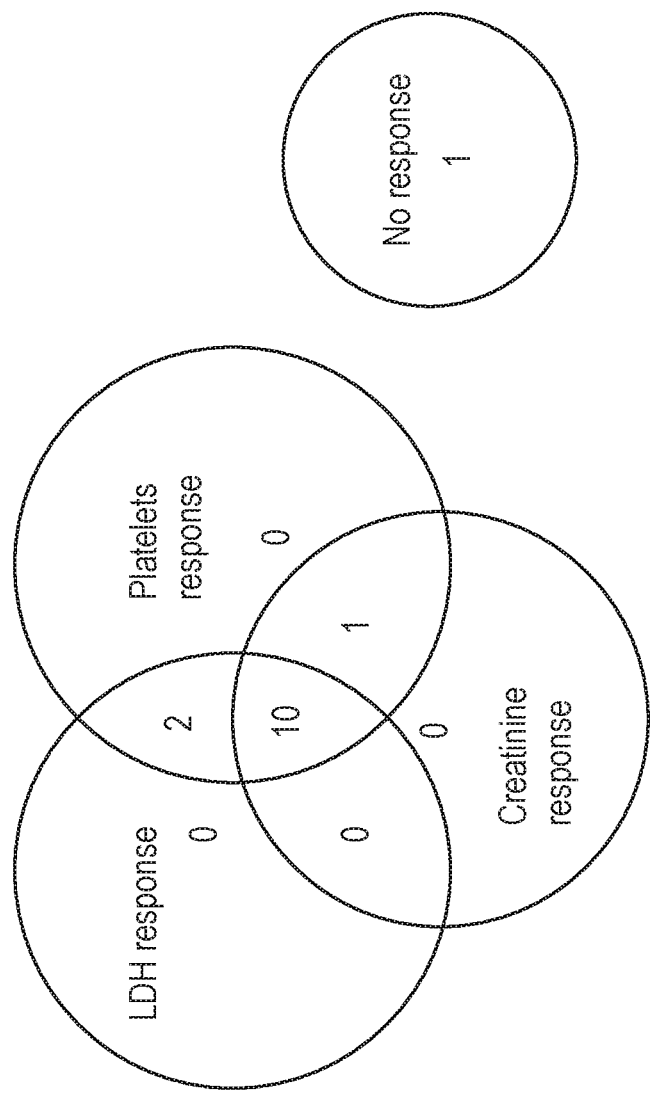
FIG. 4 is a Venn diagram showing primary cTMA response.

With respect to efficacy, the primary efficacy endpoint of complete TMA response showed a proportion of response of 71.4% (10/14) with a 95% CI=(0.419, 0.916) during the 26-week Initial Evaluation Period as shown in FIG. 3 and Table 13. The criteria for Complete TMA Response are (1) normalization of platelet count, (2) Normalization of LDH and (3) ≥25% improvement in serum creatinine from baseline. Components of complete TMA response, as well as other secondary efficacy endpoints, also showed consistent results to cTMA response as shown in FIG. 4.

TABLE 13

Complete TMA Response and Complete TMA Response
Components Analysis During the 26-Week Initial
Evaluation Period (Full Analysis Set)

|  |  | Responder | |
|---|---|---|---|
|  | Total | n | Proportion (95% CI)[a] |
| Complete TMA Response | 14 | 10 | 0.714 (0.419, 0.916) |
| Components of Complete TMA Response | | | |
| Platelet count normalization | 14 | 13 | 0.929 (0.661, 0.998) |
| LDH normalization | 14 | 12 | 0.857 (0.572, 0.982) |
| 25% improvement in serum creatinine from Baseline | 14 | 11 | 0.786 (0.492, 0.953) |
| Hematologic normalization | 14 | 12 | 0.857 (0.572, 0.982) |

[a]95% CIs for the proportion were based on exact confidence limits using the Clopper-Pearson method. Abbreviations: CI = confidence intervals; LDH = lactate dehydrogenase; TMA = thrombotic microangiopathy.

Patients must have met all Complete TMA Response criteria at 2 separate assessments obtained at least 4 weeks (28 days) apart, and any measurement in between. Hematologic normalization includes normalization of platelet count and normalization of LDH. Platelet values obtained from the day of a blood transfusion of platelets through 3 days after the transfusion were excluded from all analyses. All serum creatinine values obtained while a patient was on dialysis were excluded from all analyses. When a patient was on dialysis at baseline, then the first valid creatinine value to be used as the baseline value was the first assessment ≥6 days post-dialysis. If a patient was on dialysis during the entire 26-week Initial Evaluation Period, then the baseline creatinine was not calculated.

With the exception of one patient who withdrew from the study after 2 doses of ravulizumab, all 13 patients achieved platelet count normalization during the Initial Evaluation Period as shown in Table 13. Twelve patients achieved LDH normalization and 11 patients achieved renal function improvement (defined as 25% reduction in serum creatinine from baseline) during the Initial Evaluation Period.

Among four patients who did not achieve Complete TMA Response, two patients achieved LDH and platelet count normalization and one patient achieved platelet count normalization and renal function improvement during the Initial Evaluation Period. The one patient who did not have improvement in any of the Complete TMA response components withdrew from the study due to an adverse event after receiving 2 doses of study drug.

A separate sensitivity analysis was performed using a modified version of Complete TMA Response. The modification applied strictly to the patients on dialysis at baseline. For the modified Complete TMA Response analysis, Complete TMA Response was observed a majority of these patients (71.4% [95% CI: 41.9%, 91.6%) in the FAS and PP Set.

Figure 5:
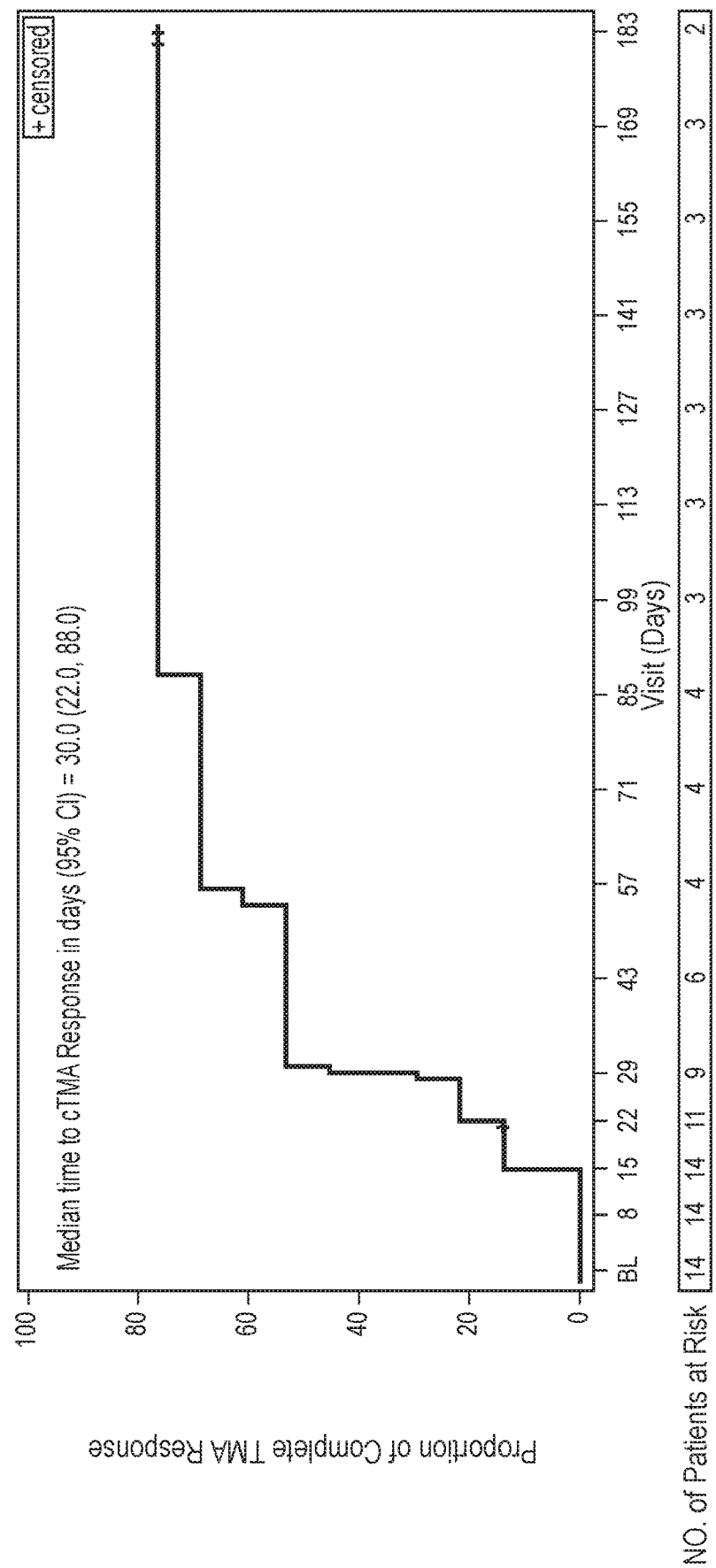
FIG. 5 is a graph depicting time to cTMA response.

The median time to Complete TMA Response during the Initial Evaluation Period was 30 days and occurred as early as 15 days following the first dose of ravulizumab as shown in FIG. 3. As shown in FIG. 5, the latest response was observed at Day 88 and all cTMA responses were sustained to Day 183. Patients who did not have a response were censored at the date of last visit or study discontinuation. One patient was censored at Day 21, one at Day 181 and two at Day 183.

Figure 6:
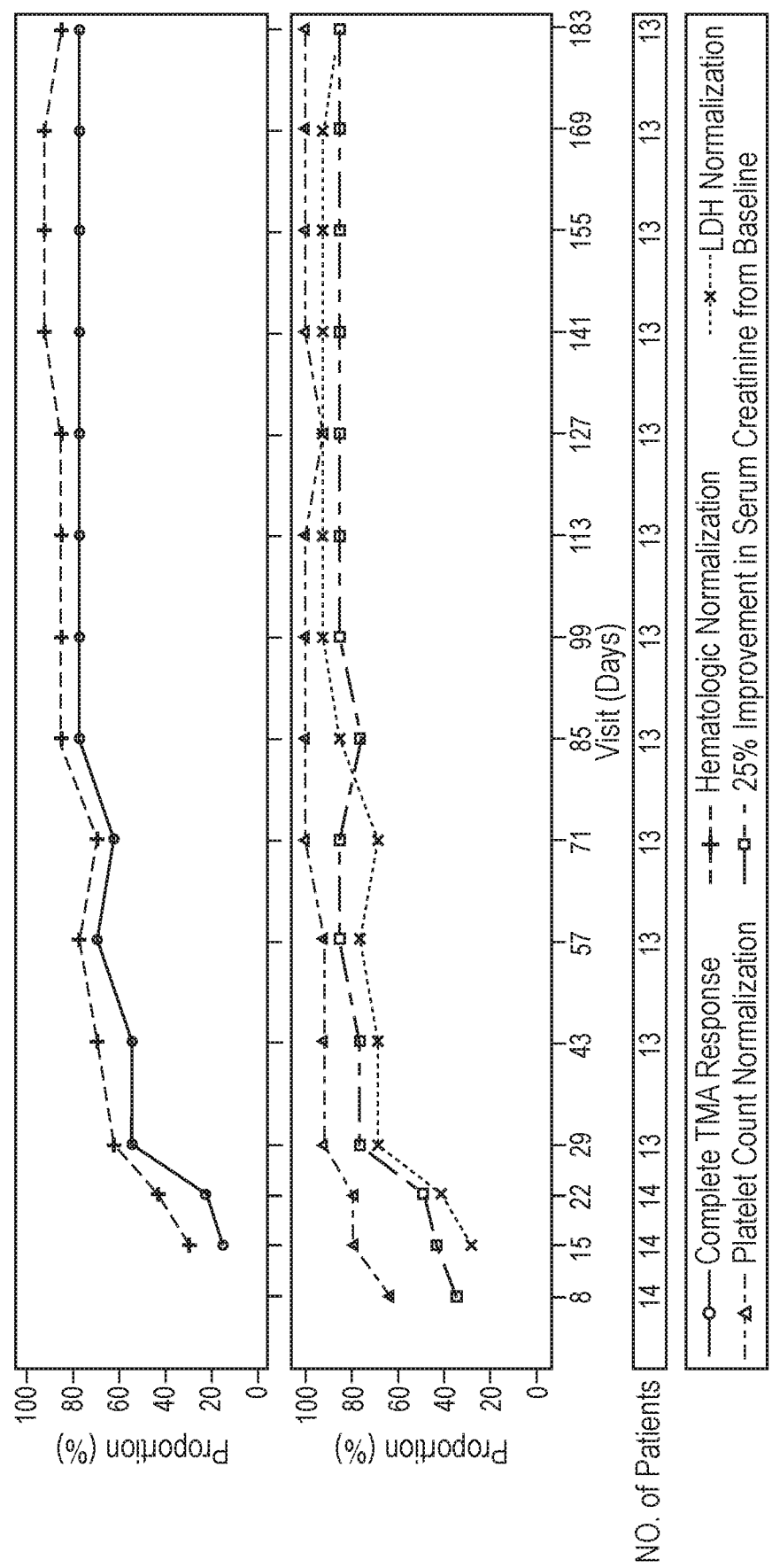
FIG. 6 is a graph depicting cTMA response, hematologic normalization, and cTMA response status components status over time.

The 10 patients who achieved the Complete TMA Response status had all done so by Day 85 as shown in Table 14 and FIG. 6. Nine of these responders had sustained their response status from the first time point when they achieved Complete TMA Response through the end of the 26-week Initial Evaluation Period. One patient achieved a Complete TMA Response at Day 15 and continued to meet the response criteria through the end of the 26-week Initial Evaluation Period, except at 1 visit time point (Day 71).

TABLE 14

Complete TMA Response Status Over Time With a Confirmatory Result (Full Analysis Set)

| Visit | n/m | Overall (N = 14) Proportion (95% CI)[a] |
|---|---|---|
| Day 8 | 0/13 | 0.000 (0.000, 0.247) |
| Day 15 | 2/13 | 0.154 (0.019, 0.454) |
| Day 22 | 3/13 | 0.231 (0.050, 0.538) |
| Day 29 | 7/13 | 0.538 (0.251, 0.808) |
| Day 43 | 7/13 | 0.538 (0.251, 0.808) |
| Day 57 | 9/13 | 0.692 (0.386, 0.909) |
| Day 71 | 8/13 | 0.615 (0.316, 0.861) |
| Day 85 | 10/13 | 0.769 (0.462, 0.950) |
| Day 99 | 10/13 | 0.769 (0.462, 0.950) |
| Day 113 | 10/13 | 0.769 (0.462, 0.950) |
| Day 127 | 10/13 | 0.769 (0.462, 0.950) |
| Day 141 | 10/13 | 0.769 (0.462, 0.950) |
| Day 155 | 10/13 | 0.769 (0.462, 0.950) |
| Day 169 | 10/13 | 0.769 (0.462, 0.950) |
| Day 183 | 10/13 | 0.769 (0.462, 0.950) |

[a]95% CIs for the proportion are based on exact confidence limits using the Clopper-Pearson method. Abbreviations: CI = confidence interval; m = number of patients with a possible confirmatory result available at each visit; TMA = thrombotic microangiopathy.

With the exception of 1 patient who withdrew from the study after 2 doses of ravulizumab, all remaining 13 patients in the FAS achieved platelet count normalization as shown in FIG. 6. Platelet count normalization was achieved after the first dose of study drug (i.e., by Day 15) for 12 patients; 9 patients at Day 8 and 3 patients at Day 15. The latest response was observed at Day 71 (n=1). When platelet count normalization was achieved, it was sustained by all patients, with the exception of one patient who did not meet this criterion at a single time point and then platelet count normalization resumed for the remainder of the Initial Evaluation Period.

For the 12 patients who achieved LDH normalization, this was achieved by Day 15 for 4 patients as shown in FIG. 6. The latest response was observed at Day 99 (n=1). When LDH normalization was achieved, it was sustained by all patients, with the exception of 2 patients who did not meet this criterion at a single time point (1 patient at Day 183; 1 patient transiently at Day 71 and then LDH count normalization resumed for the remainder of the Initial Evaluation Period).

For the 11 patients in the full analysis set that achieved renal function improvement, this improvement was achieved after the first dose of study drug (i.e., by Day 15) for 6 patients; 5 patients by Day 8 and 1 patient by Day 15 as shown in FIG. 6. The latest response was observed at Day 57 (n=1). All of the patients that met the criteria for the renal function improvement component sustained this response during the Initial Evaluation Period).

Hematologic normalization included normalization of platelet count and normalization of LDH. During the Initial Evaluation Period, hematologic normalization was observed in 12 of 14 patients (85.7% [95% CI: 57.2%, 98.2%]) as shown in Table 15 and FIG. 6.

Overall, patients in the full analysis set showed improvement in all of the hematologic TMA parameters (platelets, LDH and hemoglobin) during the Initial Evaluation Period with improvements in platelets and LDH observed starting on Day 8 and improvement in hemoglobin starting on Day 22.

Figure 7:
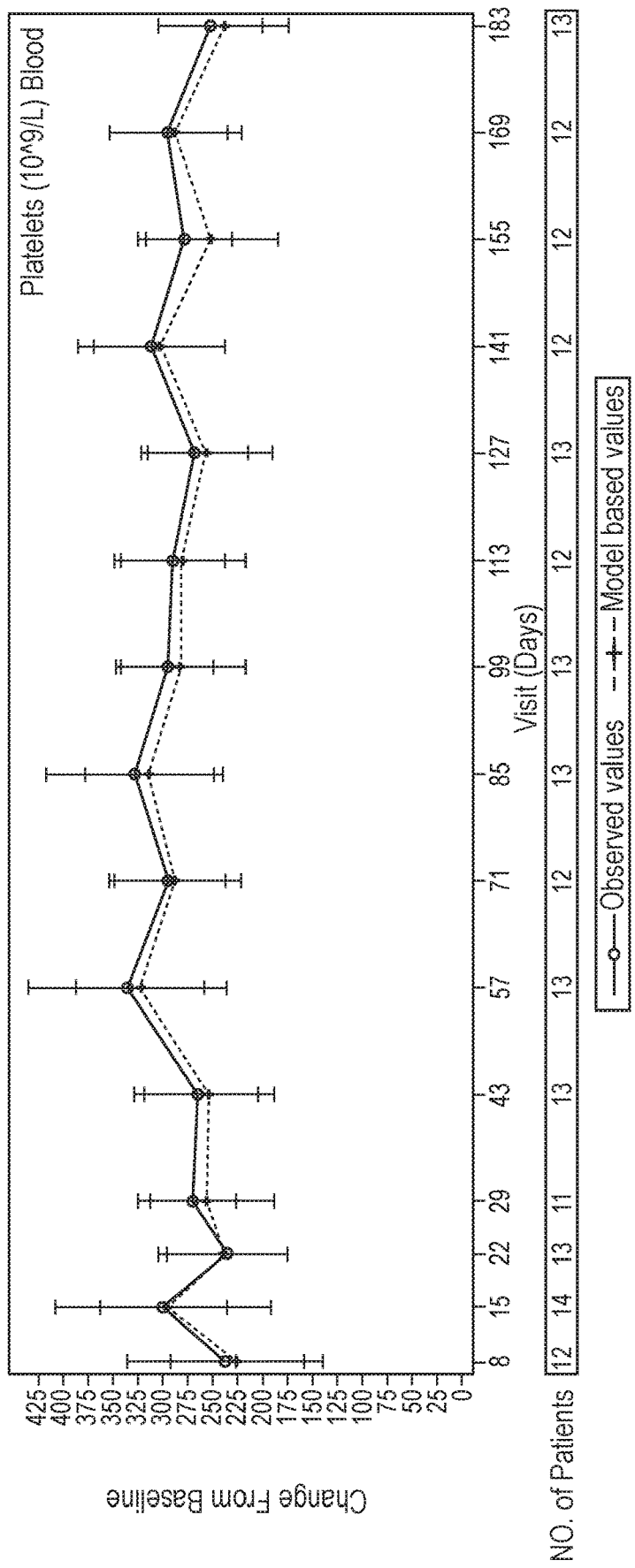
FIG. 7 is a graph depicting observed values and model based values of changes in platelets over time during the initial evaluation period (Full Analysis Set).

The mean (SD) change from baseline in platelet count was 238.08 (154.402) at Day 8 and this mean increase was sustained over the duration of the Initial Evaluation Period (see FIG. 7).

Figure 8:
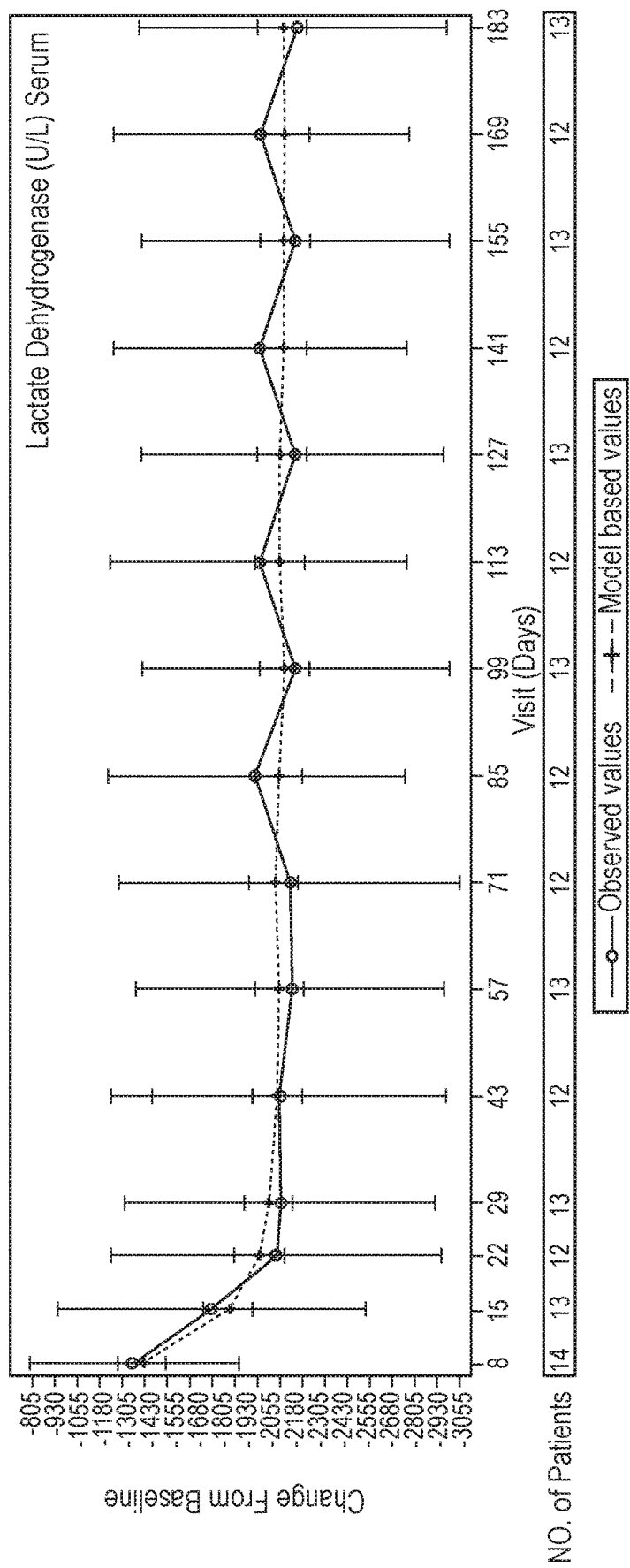
FIG. 8 is a graph depicting observed values and model based values of changes in LDH over time during the initial evaluation period (Full Analysis Set).

The mean (SD) change from baseline in LDH was −1330.61 (952.371) at Day 8, and increased to −2111.88 (1350.886) at Day 29, and this mean decrease was sustained over the duration of the Initial Evaluation Period (see FIG. 8).

Figure 9:
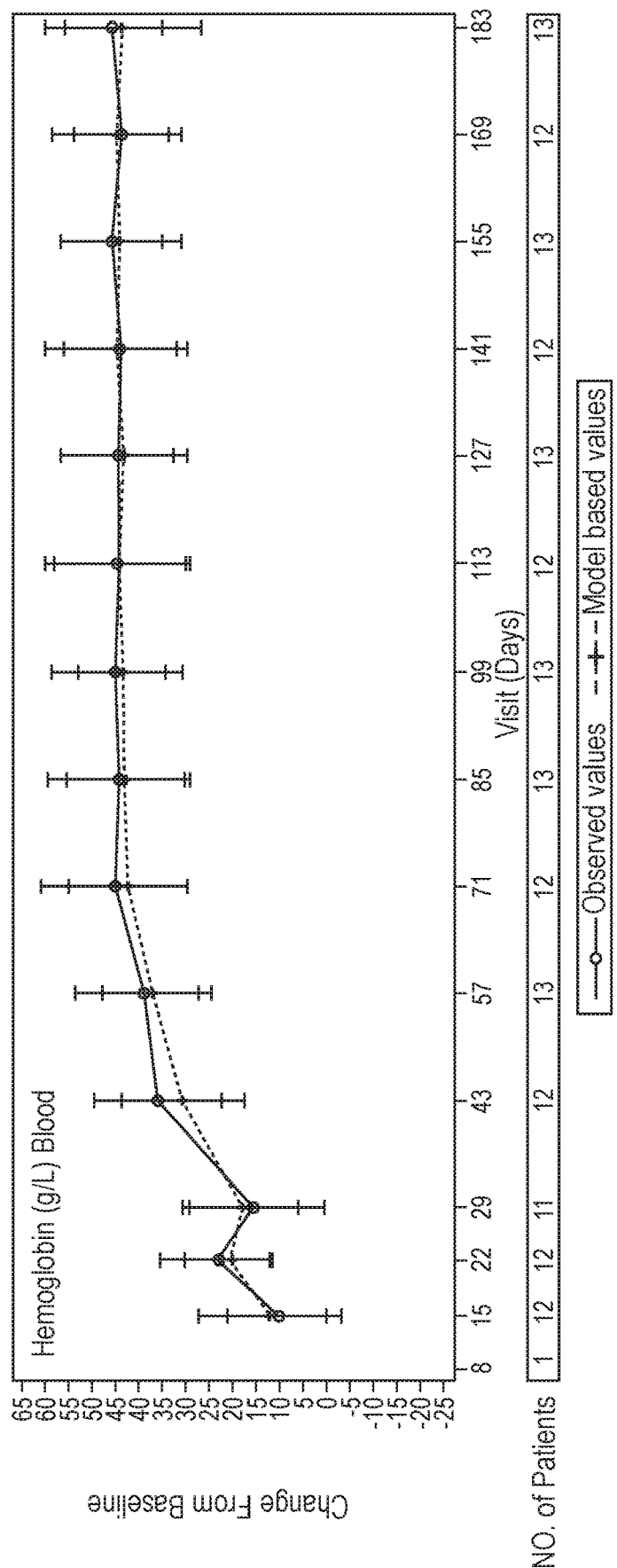
FIG. 9 is a graph depicting observed values and model based values of changes in hemoglobin over time during the initial evaluation period (Full Analysis Set).

The mean (SD) change from baseline in hemoglobin was 10.79 (16.120) at Day 15, and increased to 36.13 (21.597) at Day 43, and this mean increase was sustained over the duration of the Initial Evaluation Period (see FIG. 9).

During the Initial Evaluation Period, 12 of the 14 patients in the full analysis set (85.7% [95% CI: 57.2%, 98.2%]) had an increase in hemoglobin of ≥20 g/L compared to baseline with a confirmatory result (e.g., a hemoglobin response). Of the 13 patients that completed the 26 weeks of ravulizumab treatment, 12 patients had a hemoglobin response as of Day 99 as shown in Table 15.

TABLE 15

Hemoglobin Response With a Confirmatory Result (Full Analysis Set)

| Parameter | Visit | n/m | Overall (N = 14) Proportion (95% CI)[a] |
|---|---|---|---|
| Hemoglobin ≥20 g/L increase from baseline | Day 8 | 0/13 | 0.000 (0.000, 0.247) |
| | Day 15 | 2/13 | 0.154 (0.019, 0.454) |
| | Day 22 | 6/13 | 0.462 (0.192, 0.749) |
| | Day 29 | 6/13 | 0.462 (0.192, 0.749) |
| | Day 43 | 9/13 | 0.692 (0.386, 0.909) |
| | Day 57 | 11/13 | 0.846 (0.546, 0.981) |
| | Day 71 | 11/13 | 0.846 (0.546, 0.981) |
| | Day 85 | 11/13 | 0.846 (0.546, 0.981) |
| | Day 99 | 12/13 | 0.923 (0.640, 0.998) |
| | Day 113 | 12/13 | 0.923 (0.640, 0.998) |
| | Day 127 | 12/13 | 0.923 (0.640, 0.998) |
| | Day 141 | 12/13 | 0.923 (0.640, 0.998) |
| | Day 155 | 12/13 | 0.923 (0.640, 0.998) |
| | Day 169 | 12/13 | 0.923 (0.640, 0.998) |
| | Day 183 | 12/13 | 0.923 (0.640, 0.998) |

[a]95% CIs for the proportion were based on exact confidence limits using the Clopper-Pearson method. Abbreviation: CI = confidence interval; m = number of patients with a possible confirmatory result available at each visit.

Baseline value was defined as the average of the values from the assessments performed prior to the first study drug infusion (these could have included results from Screening and the Day 1 visit). A patient was included in the analysis for a specific post-baseline time point if it was possible for the result at that time point to be confirmed. Hemoglobin values obtained from the day of a blood transfusion of either whole blood or packed red blood cells through 7 days after the transfusion were excluded from all analyses.

Figure 10:
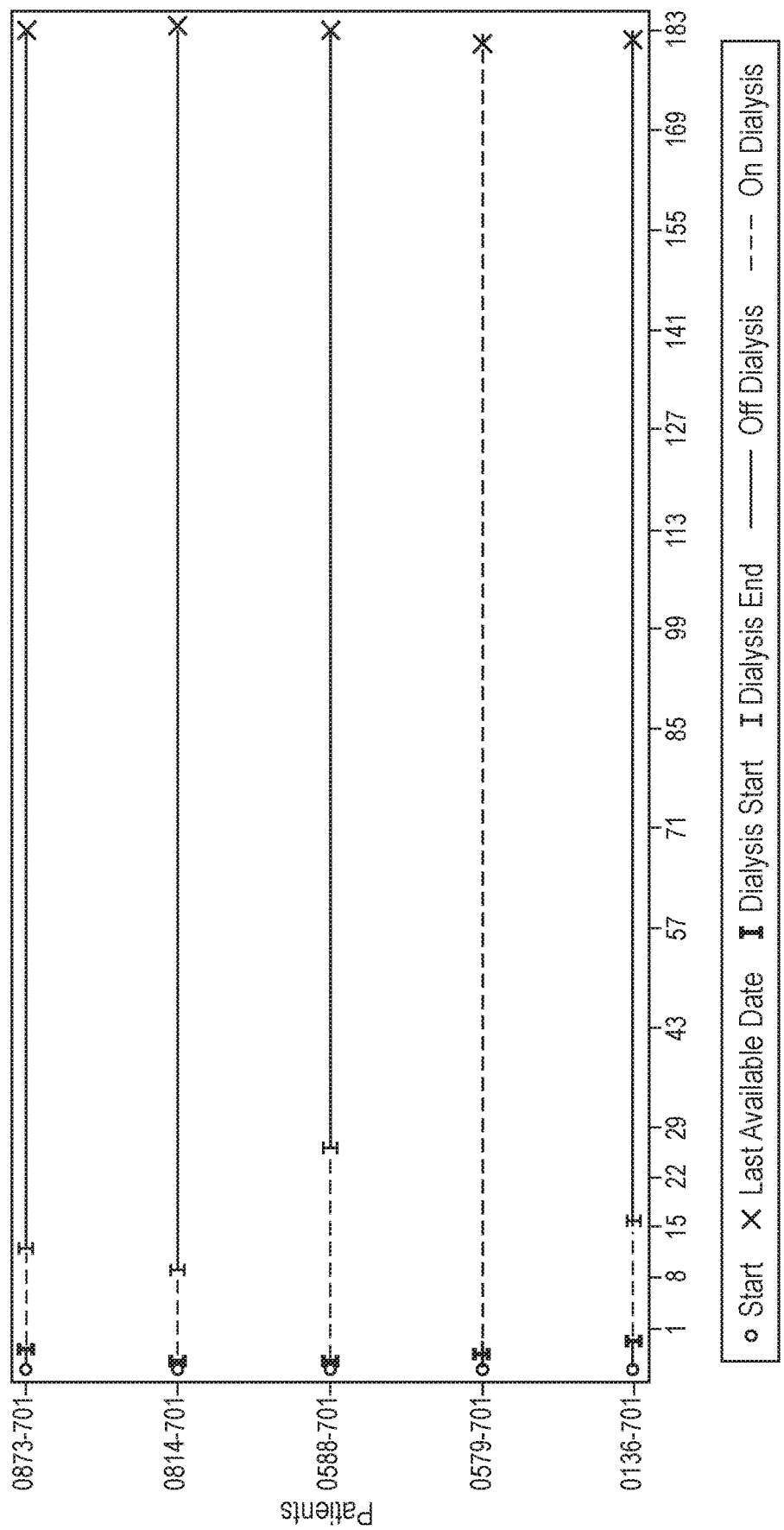
FIG. 10 is a diagram depicting dialysis status or events over time by patient among patients who had dialysis within five days of treatment start or after the first dose (Full Analysis Set).

FIG. 10 shows the dialysis status over time for the patients. Day 1 is the treatment start date. Five days prior to the treatment start date was used as the start. As shown in FIG. 10, four of five patients on dialysis at baseline were weaned off dialysis after 29 days or less of exposure to ravulizumab. No new patients initiated dialysis after starting treatment.

Figure 11:
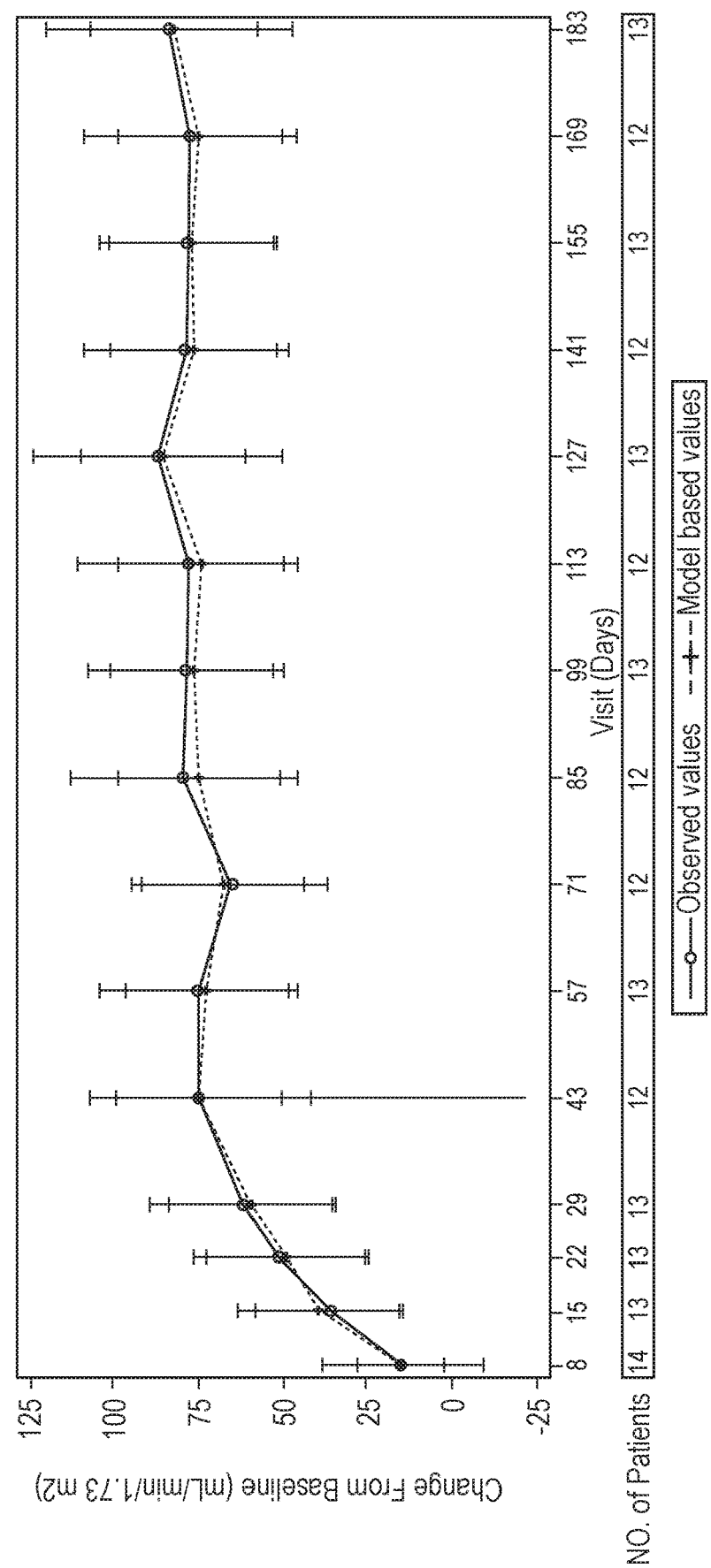
FIG. 11 is a graph depicting observed values and model based values of changes in over time.

FIG. 11 depicts estimated glomerular filtration rate (EGFR) change from baseline, including the mean change and 95% confidence interval. Baseline value was defined as the average of the values from the assessments performed prior to the first study drug infusion (these could include results from Screening and the Day 1 visit). For eGFR, 10 mL/min/1.73 m² was imputed for patients requiring dialysis for acute kidney injury. A mixed model for repeated measures (MMRM) was used. It included the fixed, categorical effect of visit and fixed, continuous effect of the baseline value as covariates. A Toeplitz covariance structure was used to model the within patient errors. Observed values: mean±95% CI. Model based values: mean±95% CI.

Renal function, as assessed by mean (SD) eGFR, improved from 28.4 (23.11) mL/min/1.73 m² at baseline to 108.0 (63.21) mL/min/1.73 m² at the end of the Initial Evaluation Period. Results from the mixed model for repeated measures (MMRM) statistical analysis of the change in eGFR from baseline demonstrated improvements within 29 days of the start of ravulizumab treatment (see FIG. 11). One patient had a history of kidney transplant; this patient also had an improvement in eGFR during the Initial Evaluation Period compared to baseline (22.0 to 29.0 mL/min/1.73 m²).

The majority of patients (11 of 14 patients) evaluated at baseline were chronic kidney disease (CKD) Stage 4 or 5, with 5 (35.7%) patients being Stage 5 as shown in Table 16. With the exception of 2 patients, all of these patients improved their CKD stage (e.g., shifted to a lower CKD stages from baseline through the end of the Initial Evaluation Period (Day 183); the shift was substantial as 9 patients improved by 2 or more stages.

TABLE 16

CKD Stage Shift from Baseline to End of Initial Evaluation Period (26 Weeks [Day 183]) (Full Analysis Set)

| Baseline | | Post-Baseline CKD Stage at Day 183 (N = 13)[a] | | | | | |
|---|---|---|---|---|---|---|---|
| CKD Stage | Baseline n (%) | 1 n (%) | 2 n (%) | 3A n (%) | 3B n (%) | 4 n (%) | 5 n (%) |
| 1 | 0 | 0 | 0 | 0 | 0 | 0 | 0 |
| 2 | 2 (14.3) | 1 (7.7) | 0 | 0 | 0 | 0 | 0 |
| 3A | 1 (7.1) | 1 (7.7) | 0 | 0 | 0 | 0 | 0 |
| 3B | 0 | 0 | 0 | 0 | 0 | 0 | 0 |
| 4 | 6 (42.9) | 3 (23.1) | 1 (7.7) | 1 (7.7) | 0 | 1 (7.7) | 0 |
| 5 | 5 (35.7) | 3 (23.1) | 1 (7.7) | 0 | 0 | 0 | 1 (7.7) |
| Total | 14 (100.0) | 8 (61.5) | 2 (15.4) | 1 (7.7) | 0 | 1 (7.7) | 1 (7.7) |

[a]The percentages for the post-baseline CKD Stage at Day 183 are based on the 13 patients with available data.

Bold values in Table 16 indicate improvement compared to baseline and underlined values indicate worsening compared to baseline. Baseline was derived based on the last available eGFR before starting treatment. Patients with both baseline and at least one value at post-baseline visits were included in the summary. Percentages were based on the total number of patients with non-missing data at both the baseline visit and the post-baseline visit. CKD stage is classified based on the National Kidney Foundation Chronic Kidney Disease Stage. Stages of CKD: Stage 1=eGFR ≥90 (normal); Stage 2=eGFR 60 to 89; Stage 3A=eGFR 45 to 59; Stage 3B=eGFR 30 to 44; Stage 4=eGFR 15 to 29; Stage 5: eGFR <15 (including dialysis: end stage).

At the end of the Initial Evaluation Period, 11 (84.6%) of 13 patients had improvement in CKD Stage compared to baseline as shown in Table 17. Three of these patients had improvement by 5 stages, 4 patients had improvement by 4 stages, 3 patients had improvement by 2 stages, and 1 patient improved by 1 stage.

Two patients had no improvement in the CKD Stage score during the Initial Evaluation Period. One of these patients had a history of kidney transplant prior to the study. None of the patients worsened in CKD Stage during the Initial Evaluation Period.

TABLE 17

Chronic Kidney Disease Stage Shift by Visit (Full Analysis Set)

| Visit | Status[a] | Statistic | Overall (N = 14) |
|---|---|---|---|
| Day 183 | Improved[b] | n/m | 11/13 |
| | | Proportion (95% CI)[d] | 0.846 (0.546, 0.981) |
| | Worsened[c] | n/m | 0/8 |
| | | Proportion (95% CI)[d] | 0.000 (0.000, 0.369) |

TABLE 17-continued

Chronic Kidney Disease Stage Shift by Visit (Full Analysis Set)

| Visit | Status[a] | Statistic | Overall (N = 14) |
|---|---|---|---|
| | Stayed the Same | n/m Proportion (95% CI)[d] | 2/13 0.154 (0.019, 0.454) |

Note:
CKD Stage 5 is considered the worst category, while Stage 1 is considered the best category. Baseline was derived based on the last available eGFR before starting treatment.
[a]Compared to CKD stage at baseline.
[b]Excluded those with Stage 1 at baseline as they cannot improve.
[c]Excluded those with Stage 5 at baseline as they cannot worsen.
[d]95% CIs for the proportion were based on exact confidence limits using the Clopper-Pearson method.
Abbreviations: CI = confidence interval; CKD = chronic kidney disease; m = number of patients available at each visit.

For the 8 treated patients who were ≥5 years of age, Quality of Life (QoL) was assessed using the pediatric FACIT-Fatigue Questionnaire. Baseline was from the Day 1 value. Pediatric FACIT-Fatigue questionnaire was used. The pediatric FACIT-fatigue questionnaire at baseline and each post-infusion timepoint was scored using standard scoring algorithms. A mixed model for repeated measures was used that included the fixed, categorical effect of visit and fixed, continuous effect of the baseline value as covariates. An unstructured covariance structure was used to model the within patient errors. FACIT score ranged from 0-52, with a higher score indicating less Fatigue. Observed values: mean±95% confidence interval (CI). Model based values: mean±95% CI.

Figure 12:
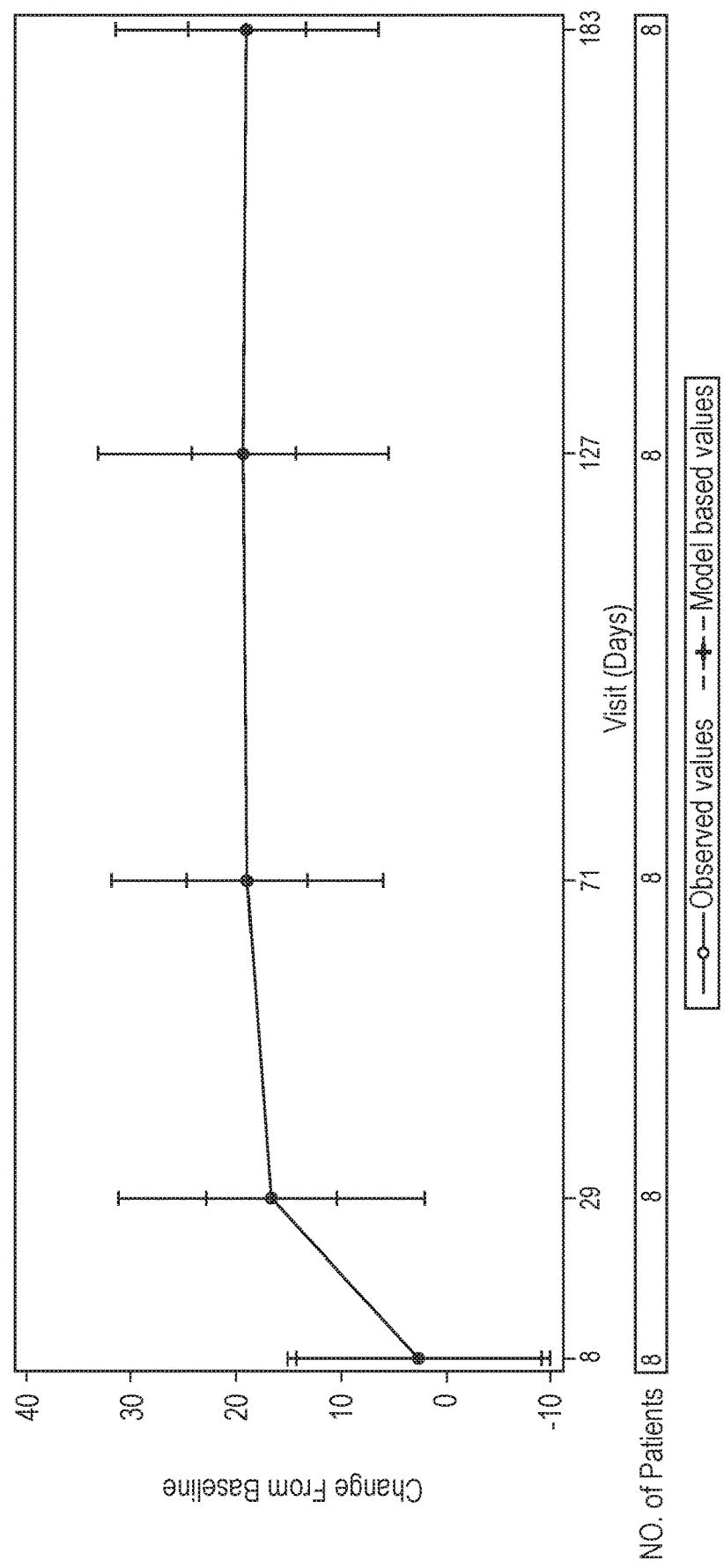
FIG. 12 is a graph depicting observed and model based values of changes in pediatric FACIT fatigue over time (Full Analysis Set).

During the Initial Evaluation Period, these 8 patients had a mean (SD) improvement in the pediatric FACIT-Fatigue score of 18.91 (14.988) compared to baseline as shown in FIG. 12. Three (37.5%) of 8 patients had a 3-point improvement in FACIT-Fatigue total score from baseline at Day 8, 7 (87.5%) patients had a 3-point improvement from baseline at Day 29, and all 8 patients had a 3-point improvement from baseline by Day 71.

C. Efficacy Conclusions

Ten of the 14 (71.4%) patients in the FAS (95% CI: 41.9%, 91.6%) achieved the primary efficacy endpoint, Complete TMA Response during the 26 week Initial Evaluation Period. Thirteen of 14 patients in the FAS achieved platelet count normalization during the Initial Evaluation Period. Twelve patients achieved LDH normalization and 11 patients achieved renal function improvement (defined as 25% reduction in serum creatinine from baseline) during the Initial Evaluation Period.

Results for secondary endpoints were as follows. The median time to Complete TMA Response was 30 days and the earliest response occurred by 15 days following the first dose of ravulizumab. For the 10 patients who achieved Complete TMA Response status, these responses were sustained through the end of the 26 week Initial Evaluation Period.

Hematologic normalization, defined as normalization of both LDH and platelets, was observed in 12 of 14 patients (85.7% [95% CI: 57.2%, 98.2%]).

Twelve of the 14 patients in the full analysis set (85.7% [95% CI: 57.2%, 98.2%]) had an increase in hemoglobin of ≥20 g/L, compared to baseline with a confirmatory result.

Dialysis was discontinued in 4 of 5 patients who had been receiving dialysis at baseline. All 4 of these patients discontinued dialysis within the first 29 days of exposure to ravulizumab. No patients initiated dialysis after starting treatment with ravulizumab.

Renal function, as assessed by eGFR, improved from a mean of 28.4 mL/min/1.73 m² at baseline to 108.0 mL/min/1.73 m² at the end of the Initial Evaluation Period. Most patients had improvement of at least 1 CKD Stage compared to baseline.

Three (37.5%) of 8 patients (e.g., those ≥5 years of age) had at least a 3 point improvement in FACIT-Fatigue total score from baseline at Day 8, 7 (87.5%) patients had at least a 3 point improvement from baseline at Day 29, and all 8 patients had at least a 3 point improvement from baseline by Day 71.

D. Pharmacokinetic and Pharmacodynamic Results

Figure 13:
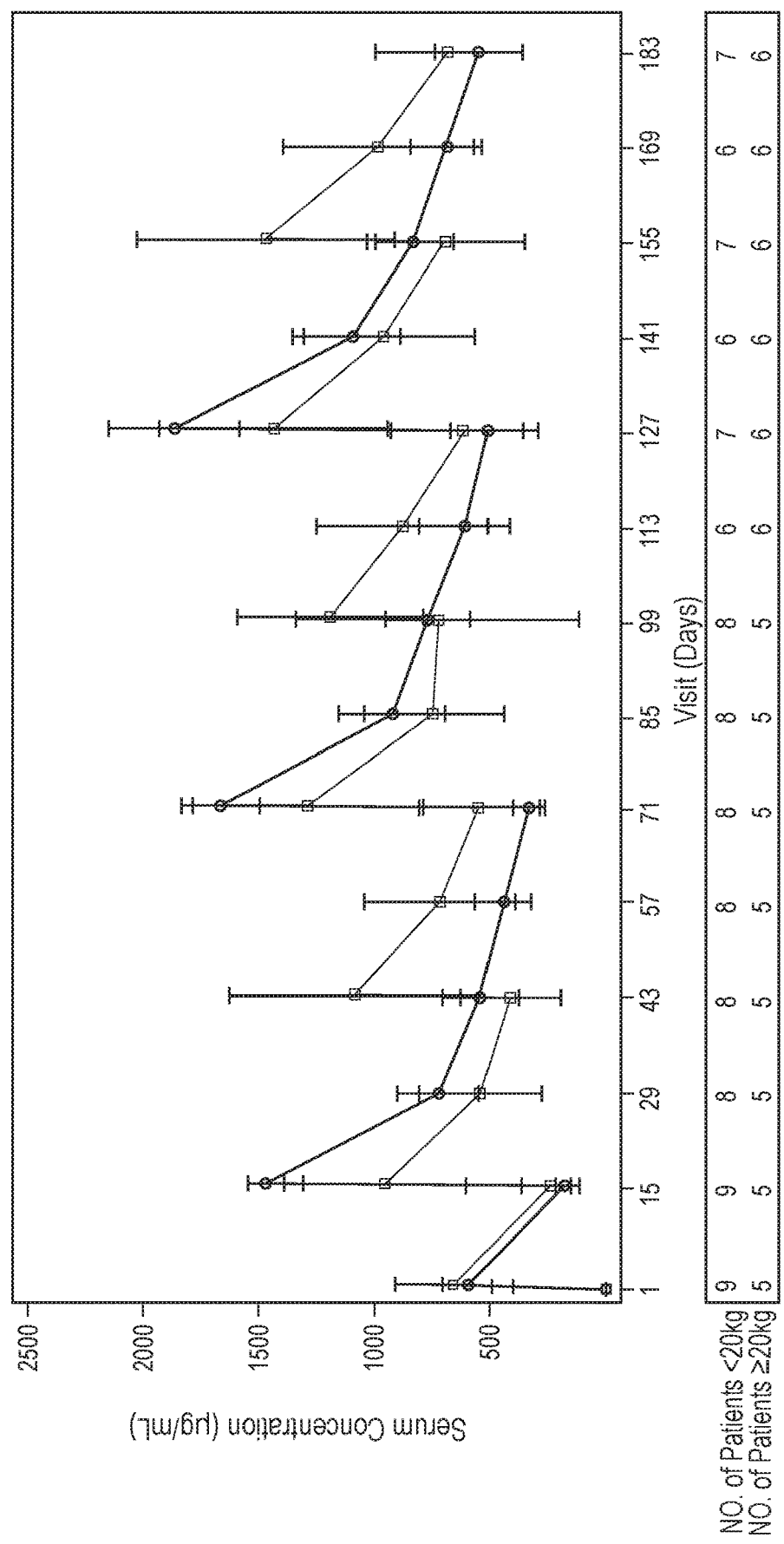
FIG. 13 is a graph depicting mean (SD) ravulizumab serum concentration by dosing interval (Q4W and Q8W), linear scale (PK/PD Analysis Set).

All patients in the full analysis set were included in the PK/PD Analysis Set. The mean (SD) ravulizumab serum concentration by dosing interval (e.g., q4w and q8w) versus time profile (linear scale) is presented in FIG. 13.

Pharmacokinetic parameters for ravulizumab are summarized by dosing interval in Table 18 and Table 19 for the loading and last maintenance doses, respectively. Following the first loading dose mean (SD) $C_{max}$ was 656.4 (250.3) and 599.8 (103.8) μg/mL for the q4w and q8w dosing interval groups, respectively, and $C_{trough}$ was 240.7 (125.4) and 185.6 (30.7) μg/mL, respectively. Following the last maintenance dose mean (SD) $C_{max}$ was 1466.6 (554.4) and 1863.3 (284.6) μg/mL for the q4w and q8w dosing interval groups, respectively, and $C_{trough}$ was 682.9 (315.1) and 549.3 (187.4) μg/mL, respectively. The exposures in patients weighing <20 kg (q4w) and ≥20 kg (q8w) were similar.

TABLE 1 ravulizumab PK Parameters ($C_{max}$ and $C_{trough}$) Following the First (Loading) Dose of ravulizumab by Dosing Interval (q4w and q8w) (PK/PD Analysis Set)

| Parameter | Statistics | q4w (<20 kg) | q8w (≥20 kg) |
|---|---|---|---|
| $C_{max}$ (μg/mL) | n | 8 | 4 |
| | Mean (SD) | 656.4 (250.3) | 599.8 (103.8) |
| | CV % | 38.1 | 17.3 |
| | Median (min, max) | 594.0 (270, 1020) | 555.5 (534, 754) |
| $C_{trough}$ (μg/mL) | n | 9 | 5 |
| | Mean (SD) | 240.7 (125.4) | 185.6 (30.705) |
| | CV % | 52.1 | 16.5 |
| | Median (min, max) | 227.0 (57.9, 432) | 181.0 (142, 217) |

Abbreviations: $C_{max}$ = maximum serum concentration; $C_{trough}$ = trough serum concentration; CV = coefficient of variation; max = maximum; min = minimum; q4w = once every 4 weeks; q8w = once every 8 weeks; SD = standard deviation

TABLE 2 ravulizumab PK Parameters ($C_{max}$ and $C_{trough}$) Following the Final Maintenance Dose of ravulizumab by Dosing Interval (Q4W and Q8W) (PK/PD Analysis Set)

| Parameter | Statistics | q4w (<20 kg) | q8w (≥20 kg) |
|---|---|---|---|
| $C_{max}$ (μg/mL) | n | 7 | 6 |
| | Mean (SD) | 1466.6 (554.4) | 1863.3 (284.6) |
| | CV % | 37.8 | 15.3 |
| | Median (min, max) | 1510.0 (760, 2240) | 1890.0 (1490, 2280) |
| $C_{trough}$ (μg/mL) | n | 7 | 6 |
| | Mean (SD) | 682.9 (315.1) | 549.3 (187.4) |
| | CV % | 46.1 | 34.1 |
| | Median (min, max) | 732.0 (193, 1090) | 556.0 (280, 790) |

Abbreviations: $C_{max}$ = maximum serum concentration; $C_{trough}$ = trough serum concentration; CV = coefficient of variation; max = maximum; min = minimum; q4w = once every 4 weeks; q8w = once every 8 weeks; SD = standard deviation.

Final maintenance dose was administered on Day 155 for the <20 kg group and on Day 127 for the ≥20 kg group.

Noncompartmental PK parameters following the last maintenance dose of ravulizumab are presented by dosing interval in Table 20.

TABLE 20

Summary of ravulizumab Noncompartmental Analysis of PK Parameters Following the Last Maintenance Dose of ravulizumab by Dosing Interval(Q4W and Q8W) (PK/PD Analysis Set)

| PK Parameter (Unit) | q4w (<20 kg) Mean ± SD (% CV) | q8w (≥20 kg) Mean ± SD (% CV) |
|---|---|---|
| n | 7[a] | 6 |
| $t_{max}$ (h)[b] | 2.4 ± 0.22 (9.2) | 3.745 ± 0.47 (12.6) |
| $C_{max}$ (μg/mL)[b] | 1466.6 ± 554.4 (37.8) | 1863.3 ± 284.6 (15.3) |
| $C_{trough}$ (μg/mL) | 682.9 ± 315.1 (46.1) | 549.3 ± 187.4 (34.1) |
| $AUC_\tau$ (h · μg/mL) | ND[c] | 1309000.0 ± 252265.7 (19.3) |
| CL (mL/h) | ND[c] | 1.2 ± 0.3 (27.7) |
| $V_z$ (mL) | ND[c] | 1548.3 ± 213.7 (13.8) |

[a]Patient 0199-701 who was switched from q4w to q8w dosing regimen on Visit Day 127 based on body weight in assignment; Patient 0411-702 who discontinued after Day 15.
[b]$t_{max}$ values are presented as median (minimum, maximum).
[c]These PK parameters could be not derived due to limited data points after $C_{max}$.
Abbreviations: $AUC_\tau$ = area under the serum concentration versus time curve over the dosing interval; $C_{max}$ = maximum observed serum concentration; $C_{trough}$ = concentrations at the end of the dosing interval; CL = total clearance; CV = coefficient of variation; ND = not determined; q4w = once every 4 weeks; q8w = once every 8 weeks; SD = standard deviation; $t_{max}$ = time to maximum observed serum concentration; $V_z$ = volume of distribution at steady state Steady state was achieved following weight-based q4w and q8w maintenance dosing of ravulizumab as shown in Table 21.

TABLE 21

Assessment of ravulizumab PK Steady State Attainment by Dosing Interval (Q4W and Q8W) (PK/PD Analysis Set)

| Steady State Attainment | Dosing Interval Group | Slope | Lower 95% CI | Upper 95% CI | Steady State Reached? |
|---|---|---|---|---|---|
| Days 43, 71, 99, 127, 155, 183 | q4w (<20 kg) | 0.00303 | −0.00042279 | 0.00649 | Yes |
| Days 15, 71, 127, 183 | q8w (≥20 kg) | 0.00028792 | −0.00007662 | 0.00065245 | Yes |
| Days 71, 127, 183 | All Patients | 0.00126 | −0.00267 | 0.00519 | Yes |

Abbreviations: CI = confidence interval; q4w = once every 4 weeks; q8w = once every 8 weeks.

Figure 14:
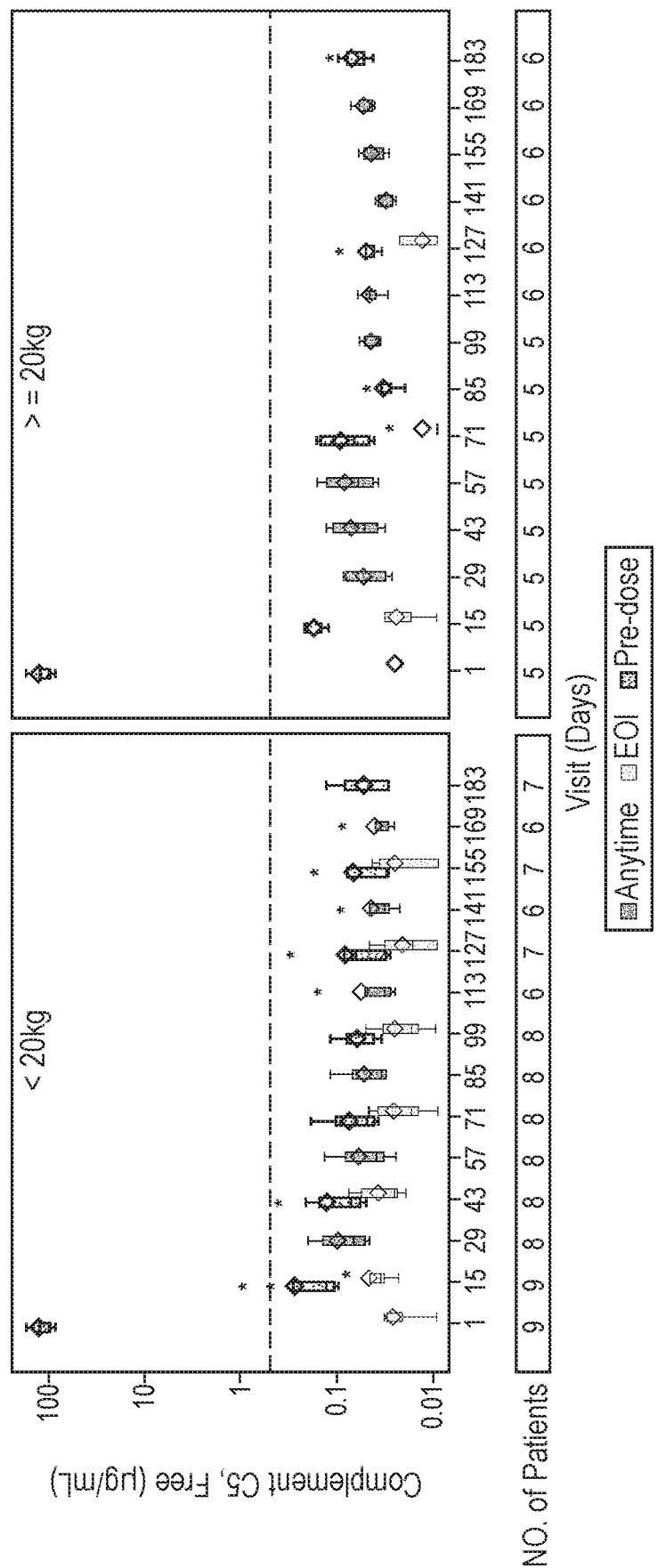
FIG. 14 is a graph depicting serum free C5 concentration time profiles by dosing interval (Q4W and Q8W) (PK/PD Analysis Set).

FIG. 14 presents box plots of serum free C5 concentrations versus time profiles by dosing interval. Following weight-based dosing, ravulizumab treatment resulted in immediate and complete terminal complement inhibition (free C5<0.5 μg/mL) and sustained throughout the entire treatment period for all patients at all times with the exception of a single patient from the ≥5 to <10 kg body weight group at Day 15.

A prespecified initial analysis of PK/PD data in 9 patients (CPR-0019.00) was conducted to assess the suitability of the pediatric dosing. The modeling and simulation results supported all pediatric dosing with the exception of the loading dose in patients weighing ≥5 to <10 kg. Consequently, the loading dose was increased from 300 mg to 600 mg (with no change to the maintenance dosing of 300 mg q4w) in this body weight group.

Figure 15:
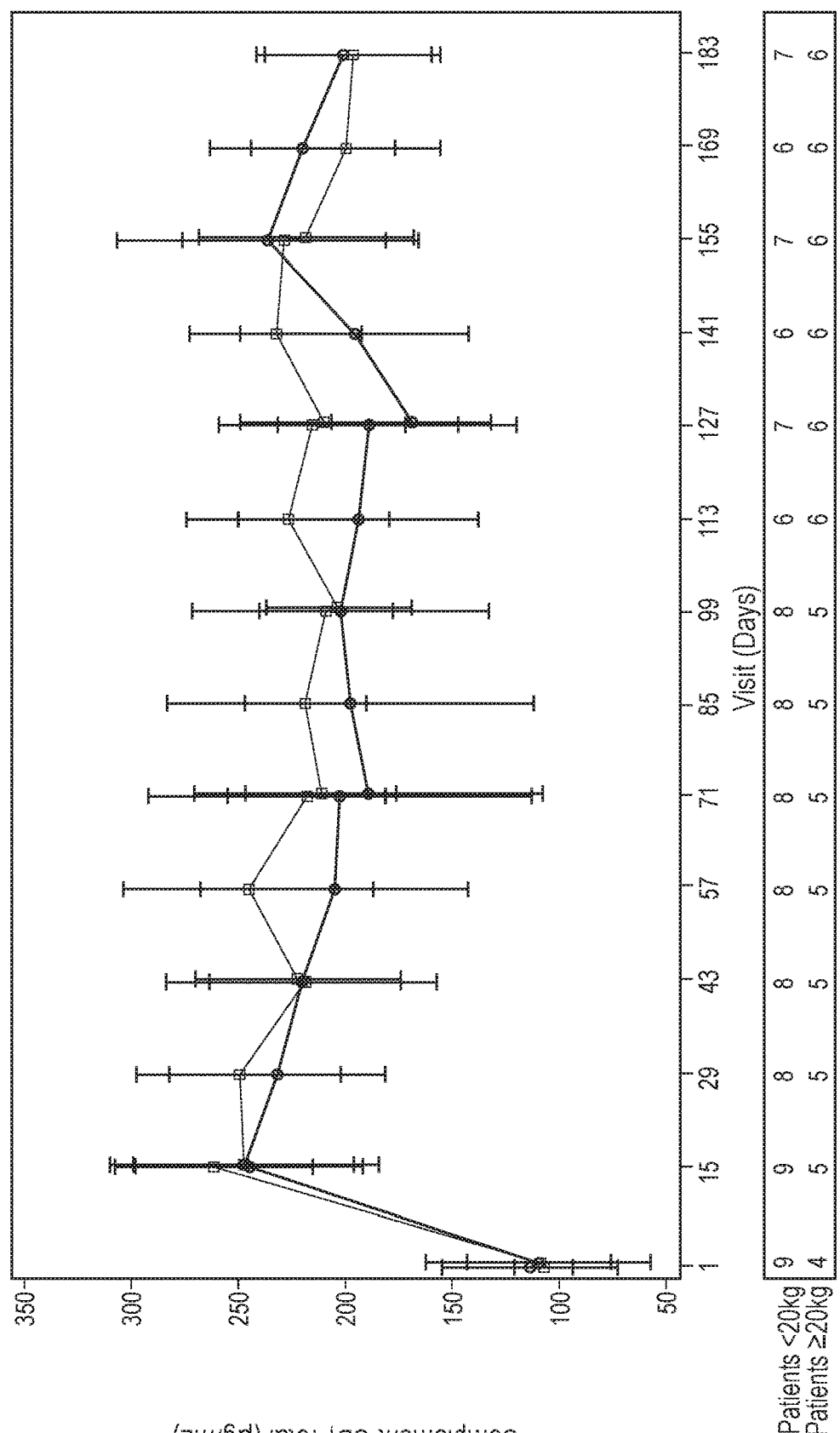
FIG. 15 is a graph depicting mean (95% CI) serum total concentration time profile by dosing interval (Q4W and Q8W) (PK/PD Analysis Set).

The mean (95% CI) total serum C5 concentration versus time profile is presented by weight based dosing regimen in FIG. 15. The rate and magnitude of change in serum total C5 was similar between groups.

E. Pharmacokinetic and Pharmacodynamic Conclusions

Following ravulizumab weight-based dosing, steady-state was achieved for both dosing intervals and across all pediatric patients.

Immediate and complete terminal complement inhibition was achieved (defined as free C5<0.5) and sustained throughout the entire treatment period for all patients at all times with the exception of a single patient at Day 15.

Based on an initial PK/PD analysis as described in the protocol, conducted to assess the suitability of the pediatric dosing, the loading dose in patients from ≥5 to <10 kg body weight has been increased to 600 mg from 300 mg; the dose regimen in all other pediatric weight groups is appropriate.

F. Safety

Exposure to ravulizumab, including follow-up duration, treatment duration, and number of infusions per patient, is summarized in Table. Except for 3 patients who were withdrawn from the study prior to Day 183, all patients received all planned infusions according to the protocol-specified visit schedule and a full dose at each visit during the Initial Evaluation Period. A change to the dose regimen based on patient's body weight was made for 1 patient, whose weight increased to 20.4 kg on Day 113 (Dose Regimen Decision Day).

The median duration of treatment was 26.14 weeks (range: 1 to 26.6 weeks), and all patients were compliant with treatment. Two patients in the weight range of ≥5 to <10 kg received a loading dose of 300 mg, rather than 600 mg, as the patients were enrolled before an Amendment to the protocol was effective.

TABLE 22

Treatment Exposure and Follow-up Duration: Initial Evaluation Period (Safety Set)

| Parameter | Birth to <6 years (N = 9) | 6 to <18 years (N = 7) | Overall (N = 16) |
|---|---|---|---|
| Follow-up duration[a] (weeks) | | | |
| N | 9 | 7 | 16 |
| Mean (SD) | 23.63 (7.742) | 19.06 (12.001) | 21.63 (9.750) |
| Median | 26.29 | 26.00 | 26.14 |
| Min, max | 3, 26.5714 | 1, 26.2857 | 1, 26.5714 |
| Q1, Q3 | 25.86, 26.29 | 2.00, 26.14 | 25.86, 26.29 |
| Treatment duration[b] (weeks) | | | |
| n | 9 | 7 | 16 |
| Mean (SD) | 23.64 (7.745) | 19.06 (11.998) | 21.64 (9.752) |
| Median | 26.30 | 26.00 | 26.10 |
| Min, max | 3, 26.6 | 1, 26.3 | 1, 26.6 |
| Q1, Q3 | 25.90, 26.30 | 2.00, 26.10 | 25.90, 26.30 |
| Number of infusions | | | |
| 1 | 0 (0.0) | 2 (28.6) | 2 (12.5) |
| 2 | 1 (11.1) | 0 (0.0) | 1 (6.3) |
| 4 | 0 (0.0) | 5 (71.4) | 5 (31.3) |
| 6 | 1 (11.1) | 0 (0.0) | 1 (6.3) |
| 7 | 7 (77.8) | 0 (0.0) | 7 (43.8) |
| Compliance, n (%) | | | |
| ≥100% | 9 (100.0) | 7 (100.0) | 16 (100.0) |

[a]Follow-up duration is defined as the number of weeks from date of first dose to completion of study/last available study visit/study discontinuation +1 day.
[b]Treatment duration is defined as ([the date of last dose +56 days] − [the date of first dose]) or ([study discontinuation date] − [the date of first dose]), if study discontinuation date is earlier than (the date of last dose +56 days). The result is presented in weeks.
Abbreviations: max = maximum; min = minimum; Q1 = 25th percentile; Q3 = 75th percentile. q4w = once every 4 weeks.

Percentages are based on the number of patients with non-missing data in each group. Patients received a weight-based loading dose of ravulizumab on Day 1, followed by weight-based maintenance treatment on Day 15 and q8w thereafter for patients weighing ≥20 kg, or q4w for patients weighing <20 kg, for a total of 26 weeks of treatment. Weight-based dosing is based on the patient's body weight recorded on Dose Regimen Decision: Days. Dosing on Day 183 represents the start of the Extension Period and is not included in these calculations.

Exposure to ravulizumab, including follow-up duration, treatment duration, and number of infusions per patient, is summarized in Table. Except for 3 patients who were withdrawn from the study prior to Day 183, all patients received all planned infusions according to the protocol-specified visit schedule and a full dose at each visit during the Initial Evaluation Period. A change to the dose regimen based on patient's body weight was made for 1 patient, whose weight increased to 20.4 kg on Day 113 (Dose Regimen Decision Day).

The median duration of treatment was 26.14 weeks (range: 1 to 26.6 weeks), and all patients were compliant with treatment. Two patients in the weight range of ≥5 to <10 kg received a loading dose of 300 mg, rather than 600 mg, as the patients were enrolled before an amendment to the protocol was effective.

During the Initial Evaluation Period, 15 (93.8%) of patients experienced at least 1 adverse event (162 events) as indicated in Table 23. Eight (50%) patients reported adverse events that were assessed by the investigator to be related to study drug.

The majority of patients experienced adverse events that were Grade 1 or Grade 2 in severity. Three (18.8%) patients experienced adverse events of Grade 3 severity. One patient in the 6 to <18 years age group experienced an adverse event of Grade 4 severity (neutrophil count decreased).

Eight (50%) patients experienced a serious adverse event during the Initial Evaluation Period. One patient (<6 years age group) withdrew from the study due to SAEs (hypertensive crisis and anemia) during the Initial Evaluation Period.

Three patients experienced non-serious AEs during infusion of study drug (hypertension in 2 patients and dizziness in 1 patient). Hypertension in 1 patient (Day 15) was of Grade 2 severity and treatment was interrupted for 10 minutes. The infusion was then restarted and the full dose was completed. The AE was resolving as of the data cutoff date of this report. The other 2 AEs were of Grade 1 severity, did not require interruption of infusion, and resolved during the Initial Evaluation Period.

No death was reported. No meningococcal infection was reported.

TABLE 23

Overall Treatment-Emergent Adverse Events During the Initial Evaluation Period (Safety Set)

| Adverse Event Categories | Birth to <6 years (N = 9) | | 6 to <18 years (N = 7) | | Overall (N = 16) | |
|---|---|---|---|---|---|---|
| | n (%) | E | n (%) | E | n (%) | E |
| Any AE | 8 (88.9) | 70 | 7 (100.0) | 92 | 15 (93.8) | 162 |
| Any SAE | 3 (33.3) | 6 | 5 (71.4) | 7 | 8 (50.0) | 13 |
| Deaths | 0 (0.0) | 0 | 0 (0.0) | 0 | 0 (0.0) | 0 |
| AEs resulting in study drug discontinuations | 1 (11.1) | 2 | 0 (0.0) | 0 | 1 (6.3) | 2 |
| SAEs resulting in study drug discontinuations | 1 (11.1) | 2 | 0 (0.0) | 0 | 1 (6.3) | 2 |
| AEs resulting in study withdrawal | 1 (11.1) | 2 | 0 (0.0) | 0 | 1 (6.3) | 2 |
| SAEs resulting in study withdrawal | 1 (11.1) | 2 | 0 (0.0) | 0 | 1 (6.3) | 2 |

TABLE 23-continued

Overall Treatment-Emergent Adverse Events During the Initial Evaluation Period (Safety Set)

| Adverse Event Categories | Birth to <6 years (N = 9) n (%) | E | 6 to <18 years (N = 7) n (%) | E | Overall (N = 16) n (%) | E |
|---|---|---|---|---|---|---|
| Relationship to study drug[a] | | | | | | |
| Related AEs | 4 (44.4) | 8 | 4 (57.1) | 14 | 8 (50.0) | 22 |
| Not related AEs | 8 (88.9) | 62 | 7 (100.0) | 78 | 15 (93.8) | 140 |
| Severity | | | | | | |
| Grade 1 | 7 (77.8) | 46 | 6 (85.7) | 74 | 13 (81.3) | 120 |
| Grade 2 | 6 (66.7) | 19 | 5 (71.4) | 14 | 11 (68.8) | 33 |
| Grade 3 | 2 (22.2) | 5 | 1 (14.3) | 3 | 3 (18.8) | 8 |
| Grade 4 | 0 (0.0) | 0 | 1 (14.3) | 1 | 1 (6.3) | 1 |
| Grade 5 | 0 (0.0) | 0 | 0 (0.0) | 0 | 0 (0.0) | 0 |

[a]Related AEs include AEs classified as possibly, probably, or definitely related. Not related AEs include AEs classified as not related or unlikely related.
Abbreviations: AE = adverse event; CTCAE = Common Terminology Criteria for Adverse Events; E = total number of events; SAE = serious adverse event.

The most frequently reported AE was pyrexia (5 [31.3%] patients), which was of Grade 1 or Grade 2 severity in all 5 patients) and did not occur during study drug administration (see Table 24). Other events reported by 3 (18.8%) or more patients were pyrexia, constipation, vomiting, hypertension, headache, diarrhea and nasopharyngitis.

TABLE 24

Treatment-Emergent Adverse Events Experienced by 2 or More Patients Overall During the Initial Evaluation Period, by System Organ Class and Preferred Term (Safety Set)

| System Organ Class / Preferred Term | Birth to <6 years (N = 9) n (%) | E | 6 to <18 years (N = 7) n (%) | E | Overall (N = 16) n (%) | E |
|---|---|---|---|---|---|---|
| Any TEAE | 8 (88.9) | 70 | 7 (100.0) | 92 | 15 (93.8) | 162 |
| Gastrointestinal disorders | | | | | | |
| Constipation | 3 (33.3) | 5 | 1 (14.3) | 1 | 4 (25.0) | 6 |
| Vomiting | 2 (22.2) | 6 | 2 (28.6) | 11 | 4 (25.0) | 17 |
| Diarrhoea | 2 (22.2) | 3 | 1 (14.3) | 1 | 3 (18.8) | 4 |
| Abdominal pain | 0 (0.0) | 0 | 2 (28.6) | 4 | 2 (12.5) | 4 |
| Nausea | 0 (0.0) | 0 | 2 (28.6) | 3 | 2 (12.5) | 3 |
| Infections and infestations | | | | | | |
| Nasopharyngitis | 2 (22.2) | 3 | 1 (14.3) | 1 | 3 (18.8) | 4 |
| Tonsillitis | 2 (22.2) | 2 | 0 (0.0) | 0 | 2 (12.5) | 2 |
| Upper respiratory tract infection | 1 (11.1) | 1 | 1 (14.3) | 1 | 2 (12.5) | 2 |
| Respiratory, thoracic and mediastinal disorders | | | | | | |
| Dyspnoea | 1 (11.1) | 1 | 1 (14.3) | 1 | 2 (12.5) | 2 |
| Vascular disorders | | | | | | |
| Hypertension | 2 (22.2) | 2 | 2 (28.6) | 3 | 4 (25.0) | 5 |
| Hypotension | 0 (0.0) | 0 | 2 (28.6) | 2 | 2 (12.5) | 2 |
| General disorders and administration site conditions | | | | | | |
| Pyrexia | 2 (22.2) | 8 | 3 (42.9) | 7 | 5 (31.3) | 15 |
| Investigations | | | | | | |
| Vitamin D decreased | 1 (11.1) | 1 | 1 (14.3) | 1 | 2 (12.5) | 2 |
| Blood and lymphatic system disorders | | | | | | |
| Anaemia | 1 (11.1) | 2 | 1 (14.3) | 1 | 2 (12.5) | 3 |
| Lymphadenopathy | 1 (11.1) | 1 | 1 (14.3) | 1 | 2 (12.5) | 2 |
| Metabolism and nutrition disorders | | | | | | |
| Iron deficiency | 1 (11.1) | 1 | 1 (14.3) | 1 | 2 (12.5) | 2 |
| Musculoskeletal and connective tissue disorders | | | | | | |
| Myalgia | 1 (11.1) | 1 | 1 (14.3) | 2 | 2 (12.5) | 3 |

TABLE 24-continued

Treatment-Emergent Adverse Events Experienced by 2 or More Patients Overall During the Initial Evaluation Period, by System Organ Class and Preferred Term (Safety Set)

| System Organ Class<br>Preferred Term | Birth to <6 years<br>(N = 9) | | 6 to <18 years<br>(N = 7) | | Overall<br>(N = 16) | |
|---|---|---|---|---|---|---|
| | n (%) | E | n (%) | E | n (%) | E |
| Nervous system disorders | | | | | | |
| Headache | 0 (0.0) | 0 | 4 (57.1) | 10 | 4 (25.0) | 10 |
| Injury, poisoning and procedural complications | | | | | | |
| Contusion | 0 (0.0) | 0 | 2 (28.6) | 4 | 2 (12.5) | 4 |

Abbreviations: AE = adverse event; PT = Preferred Term; SOC = System Organ Class.

During the Initial Evaluation Period, 8 (50%) patients reported AEs assessed as related to study drug by the Investigator. None of the related AE preferred terms occurred in more than 1 patient.

During the Initial Evaluation Period, the majority of patients experienced AEs that were Grade 1 (4 [25%] patients) or Grade 2 (8 [50%] patients]) in severity. Three (18.8%) patients experienced Grade 3 events that were reported as SAEs.

One patient had a Grade 4 AE of neutrophil count decreased, but this AE did not require specific treatment or interruption or discontinuation of study drug. This patient also had a Grade 3 AE of pleural effusion, which resolved within 9 days of onset.

During the Initial Evaluation Period, 8 (50.0%) patients experienced SAEs as shown in Table 25. SAEs were reported most frequently in the system organ class of infections and infestations (4 [25.0%] patients), followed by the SOC of gastrointestinal disorders (3 [18.8%] patients) and vascular disorders (2 [12.5%] patients). Apart from abdominal pain, which was reported by 2 (12.5%) patients, other SAEs were reported in no more than 1 patient. An overview of SAEs is provided in Table.

TABLE 25

Treatment-Emergent SAEs During the Initial Evaluation Period, by System Organ Class and Preferred Term (Safety Set)

| System Organ Class<br>Preferred Term | Birth to <6 years<br>(N = 9) | | 6 to <18 years<br>(N = 7) | | Overall<br>(N = 16) | |
|---|---|---|---|---|---|---|
| | n (%) | E | n (%) | E | n (%) | E |
| Any SAE | 3 (33.3) | 6 | 5 (71.4) | 7 | 8 (50.0) | 13 |
| Infections and infestations | 2 (22.2) | 3 | 2 (28.6) | 2 | 4 (25.0) | 5 |
| Cytomegalovirus enteritis | 0 (0.0) | 0 | 1 (14.3) | 1 | 1 (6.3) | 1 |
| Escherichia bacteraemia | 1 (11.1) | 1 | 0 (0.0) | 0 | 1 (6.3) | 1 |
| Escherichia pyelonephritis | 1 (11.1) | 1 | 0 (0.0) | 0 | 1 (6.3) | 1 |
| Gastroenteritis rotavirus | 0 (0.0) | 0 | 1 (14.3) | 1 | 1 (6.3) | 1 |
| Viral infection | 1 (11.1) | 1 | 0 (0.0) | 0 | 1 (6.3) | 1 |
| Gastrointestinal disorders | 1 (11.1) | 1 | 2 (28.6) | 2 | 3 (18.8) | 3 |
| Abdominal pain | 0 (0.0) | 0 | 2 (28.6) | 2 | 2 (12.5) | 2 |
| Pancreatitis | 1 (11.1) | 1 | 0 (0.0) | 0 | 1 (6.3) | 1 |
| Vascular disorders | 1 (11.1) | 1 | 1 (14.3) | 1 | 2 (12.5) | 2 |
| Hypertension | 0 (0.0) | 0 | 1 (14.3) | 1 | 1 (6.3) | 1 |
| Hypertensive crisis | 1 (11.1) | 1 | 0 (0.0) | 0 | 1 (6.3) | 1 |
| Blood and lymphatic system disorders | 1 (11.1) | 1 | 0 (0.0) | 0 | 1 (6.3) | 1 |
| Anaemia | 1 (11.1) | 1 | 0 (0.0) | 0 | 1 (6.3) | 1 |
| General disorders and administration site conditions | 0 (0.0) | 0 | 1 (14.3) | 1 | 1 (6.3) | 1 |
| Pyrexia | 0 (0.0) | 0 | 1 (14.3) | 1 | 1 (6.3) | 1 |
| Respiratory, thoracic and mediastinal disorders | 0 (0.0) | 0 | 1 (14.3) | 1 | 1 (6.3) | 1 |
| Pulmonary haemorrhage | 0 (0.0) | 0 | 1 (14.3) | 1 | 1 (6.3) | 1 |

Abbreviations: PT = Preferred Term; SOC = System Organ Class.

TABLE 26

Overview of All Treatment-Emergent SAEs (Safety Set)

| Patient ID | Serious Adverse Events (Preferred Term) | Onset Day/Resolution Day | Led to Discontinuation (Yes/No) | Relatedness to RAVULIZUMAB |
|---|---|---|---|---|
| Birth to <6 years | | | | |
| A | Escherichia pyelonephritis | 20/24 | No | Possibly related |
|  | Escherichia bacteraemia | 20/24 | No | Possibly related |
|  | Pancreatitis | 129/132 | No | Unlikely related |
| B | Viral infection | 9/10 | No | Unlikely related |
| C | Anaemia | 20/37 | Yes | Possibly related |
|  | Hypertensive crisis | 9/37 | Yes | Not related |
| 6 to <18 years | | | | |
| D | Cytomegalovirus enteritis | 8/Ongoing | No | Not related |
| E | Abdominal pain | 29/30 | No | Not related |
| F[a] | Abdominal pain | 35/41 | Not applicable | Not related |
| G | Pulmonary haemorrhage | 38/39 | No | Unlikely related |
| H | Pyrexia | 3/10 | No | Possibly related |
|  | Hypertension | 3/12 | No | Unlikely related |
|  | Gastroenteritis rotavirus | 85/88 | No | Unlikely related |

[a]Note:
This patient was withdrawn from the study on Day 14 because post-treatment the patient was deemed to be ineligible for participation.

Anemia and hypertensive crisis in 1 patient resulted in discontinuation of study drug and withdrawal from the study.

All SAEs resolved during the Initial Evaluation Period, except for cytomegalovirus enteritis, which was reported as ongoing at data cut off.

During the Initial Evaluation Period, 1 patient (1.8 years of age, 9 kg body weight) experienced AEs (hypertensive crisis and anemia) that led to discontinuation of study drug and withdrawal from the study. The patient had a history of hypertension and developed hypertensive crisis on Day 9. Anemia (verbatim: worsening anemia) occurred on Day 20. Both events were SAEs of Grade 3 severity. The patient was withdrawn from the study on Day 21 and was started on eculizumab 600 mg on the same day. The AEs resolved on Day 37. Anemia was assessed to be possibly related to study drug by the Investigator and hypertensive crisis was assessed as not related to study drug.

During the Initial Evaluation Period, 1 patient (0.9 years of age) experienced non-serious Grade 2 hypertension that resulted in interruption of the infusion. The patient's systolic BP at Screening, Baseline, and Day 15 (pre-dose) was 90 mmHg. On Day 15, during the infusion, the BP value was not reported. The infusion was interrupted for 10 minutes due to hypertension. The infusion was then restarted, and the full dose was completed. The patient started receiving antihypertensive drugs. The patient's systolic BP ranged between 85 mmHg to 100 mmHg during the subsequent visits. The adverse event was reported as resolving as of the data cutoff date of this report. The diastolic BP was within the normal range throughout the Initial Evaluation Period except on 2 occasions, when the values were reported as 70 mm Hg (Day 54) and 55 mm Hg (Day 85).

Meningococcal infections were considered AEs of special interest (AESIs) for this study During the Initial Evaluation Period, no meningococcal infections were reported. No deaths were reported during the Initial Evaluation Period. G. Discussion and Overall Conclusion This is an interim analysis of data from 16 complement inhibitor-naïve pediatric patients (2 patients aged <2 years, 7 patients aged 2 to <6 years, 5 patients aged 6 to <12 years, and 2 patients 12 to <18 years) with aHUS who received ravulizumab during a 26-week treatment period. Two patients were withdrawn prematurely after 1 dose of study drug because they were confirmed to be ineligible based on central laboratory results, thus the FAS consists of 14 patients.

These 14 pediatric patients were extremely ill at baseline: 13/14 (92.9%) were hospitalized when they received their first dose of study drug, 11 (78.6%) had advanced kidney disease (CKD Stage 4 or 5), and 10 (71.4%) had extra-renal signs or symptoms. Five (35.7%) patients were on dialysis at baseline, and 1 (7.1%) had a kidney transplant prior to the study.

The primary endpoint, Complete TMA Response at Week 26, was achieved by 10 of 14 patients (71.4%; 95% CI: 41.9%, 91.6%). This compares favorably to the pivotal eculizumab study (C10-003) in pediatric patients, in which this endpoint was reached by 14 of 22 patients (64%; 95% CI: 41%, 83%). For the 10 patients who achieved Complete TMA Response, this endpoint was achieved rapidly (median 30 days) and was sustained over time. These results demonstrate the adequacy of the dose regimen used in this study, as well as the clinical benefits of the immediate, complete, and sustained complement inhibition provided by ravulizumab treatment.

Most of the patients were between the ages of 2 and 11 years, with 2 patients under 2 years of age. Results from an interim PK/PD analysis showed that the loading dose in the smallest patients (≥5 to <10 kg) was insufficient. One of these 2 patients was withdrawn on Day 21 due to SAEs of hypertensive crisis and anemia; the investigator immediately started this patient on high-dose eculizumab. The protocol has since been amended with a larger loading dose in this weight group.

All 13 (93%) of the patients who completed the Initial Evaluation Period achieved platelet count normalization by Week 26. In addition, 12 patients (86%) achieved LDH normalization and 11 patients (79%) achieved renal function improvement (defined as 25% improvement in serum creatinine from baseline). Improvement in renal function was also evident in shifts to lower CKD stage severity in all but 2 patients. The mean (SD) increase in EGFR from baseline was 84 (60) mL/min/1.73 m$^2$. Immediate, complete and sustained suppression of free C5 was observed throughout the dosing interval. Furthermore, 4 of the 5 patients who were on dialysis at baseline where able to discontinue dialysis within several weeks of initiating ravulizumab, and no patients needed to initiate dialysis while on study. These functional improvements were reflected in clinically meaningful improvements in QoL, as demonstrated by higher FACIT-Fatigue scores over time.

There were no safety findings of concern during the Initial Evaluation Period among the 16 patients in the Safety Set. No deaths, meningococcal infections, or treatment-emergent immunogenicity were observed. The most frequent SAE was abdominal pain (2 patients). The weight-based dose regimen of ravulizumab appeared to be well-tolerated in pediatric patients with aHUS who were naïve to complement inhibitor treatment.

This analysis of data from the Initial Evaluation Period for the first 16 patients enrolled demonstrates that ravulizumab provided immediate, complete and sustained inhibition of terminal complement in this pediatric aHUS population. Complete TMA Response was achieved by Week 26 in 71.4% of patients, with consistent results observed for response components, as well as other secondary efficacy endpoints. Decreased disease burden was also evident in improved QOL scores and reduced need for dialysis and improved QOL scores. Ravulizumab was generally well tolerated in these complement inhibitor treatment naïve patients. In sum, this interim analysis shows that in children treated for aHUS, weight based ravulizumab administered every 4 to 8 weeks resulted in improved haematological and renal endpoints with no unexpected safety concerns. The favorable benefit/risk profile of ravulizumab 5 in this study supports its use for the treatment pediatric patient with aHUS.

SEQUENCE SUMMARY

```
                                        SEQ ID NO: 1
GYIFSNYWIQ

SEQ ID NO: 2
EILPGSGSTEYTENFKD

SEQ ID NO: 3
YFFGSSPNWYFDV

SEQ ID NO: 4
GASENIYGALN

SEQ ID NO: 5
GATNLAD

SEQ ID NO: 6
QNVLNTPLT

SEQ ID NO: 7
QVQLVQSGAE VKKPGASVKV SCKASGYIFS NYWIQWVRQA

PGQGLEWMGE ILPGSGSTEY TENFKDRVTM TRDTSTSTVY

MELSSLRSED TAVYYCARYF FGSSPNWYFD VWGQGTLVTV SS

SEQ ID NO: 8
DIQMTQSPSS LSASVGDRVT ITCGASENIY GALNWYQQKP

GKAPKLLIYG ATNLADGVPS RFSGSGSGTD FTLTISSLQP

EDFATYYCQN VLNTPLTFGQ GTKVEIK

SEQ ID NO: 9
ASTKGPSVFP LAPCSRSTSE STAALGCLVK DYFPEPVTVS

WNSGALTSGV HTFPAVLQSS GLYSLSSVVT VPSSNFGTQT

YTCNVDHKPS NTKVDKTVER KCCVECPPCP APPVAGPSVF

LFPPKPKDTL MISRTPEVTC VVVDVSQEDP EVQFNWYVDG

VEVHNAKTKP REEQFNSTYR VVSVLTVLHQ DWLNGKEYKC

KVSNKGLPSS IEKTISKAKG QPREPQVYTL PPSQEEMTKN

QVSLTCLVKG FYPSDIAVEW ESNGQPENNY KTTPPVLDSD

GSFFLYSRLT VDKSRWQEGN VFSCSVMHEA LHNHYTQKSL

SLSLGK

SEQ ID NO: 10
QVQLVQSGAE VKKPGASVKV SCKASGYIFS NYWIQWVRQA

PGQGLEWMGE ILPGSGSTEY TENFKDRVTM TRDTSTSTVY

MELSSLRSED TAVYYCARYF FGSSPNWYFD VWGQGTLVTV

SSASTKGPSV FPLAPCSRST SESTAALGCL VKDYFPEPVT

VSWNSGALTS GVHTFPAVLQ SSGLYSLSSV VTVPSSNFGT

QTYTCNVDHK PSNTKVDKTV ERKCCVECPP CPAPPVAGPS

VFLFPPKPKD TLMISRTPEV TCVVVDVSQE DPEVQFNWYV

DGVEVHNAKT KPREEQFNST YRVVSVLTVL HQDWLNGKEY

KCKVSNKGLP SSIEKTISKA KGQPREPQVY TLPPSQEEMT

NQVSLTCLVK GFYPSDIAVE WESNGQPENN YKTTPPVLDS

DGSFFLYSRL TVDKSRWQEG NVFSCSVMHE ALHNHYTQKS

LSLSLGK

SEQ ID NO: 11
DIQMTQSPSS LSASVGDRVT ITCGASENIY GALNWYQQKP

GKAPKLLIYG ATNLADGVPS RFSGSGSGTD FTLTISSLQP

EDFATYYCQN VLNTPLTFGQ GTKVEIKRTV AAPSVFIFPP

SDEQLKSGTA SVVCLLNNFY PREAKVQWKV DNALQSGNSQ

ESVTEQDSKD STYSLSSTLT LSKADYEKHK VYACEVTHQG

LSSPVTKSFN RGEC

SEQ ID NO: 12
QVQLVQSGAE VKKPGASVKV SCKASGHIFS NYWIQWVRQA

PGQGLEWMGE ILPGSGHTEY TENFKDRVTM TRDTSTSTVY

MELSSLRSED TAVYYCARYF FGSSPNWYFD VWGQGTLVTV

SS
```

SEQ ID NO: 13
ASTKGPSVFP LAPCSRSTSE STAALGCLVK DYFPEPVTVS
WNSGALTSGV HTFPAVLQSS GLYSLSSVVT VPSSNFGTQT
YTCNVDHKPS NTKVDKTVER KCCVECPPCP APPVAGPSVF
LFPPKPKDTL MISRTPEVTC VVVDVSQEDP EVQFNWYVDG
VEVHNAKTKP REEQFNSTYR VVSVLTVLHQ DWLNGKEYKC
KVSNKGLPSS IEKTISKAKG QPREPQVYTL PPSQEEMTKN
QVSLTCLVKG FYPSDIAVEW ESNGQPENNY KTTPPVLDSD
GSFFLYSRLT VDKSRWQEGN VFSCSVLHEA LHSHYTQKSL
SLSLGK

SEQ ID NO: 14
QVQLVQSGAE VKKPGASVKV SCKASGHIFS NYWIQWVRQA
PGQGLEWMGE ILPGSGHTEY TENFKDRVTM TRDTSTSTVY
MELSSLRSED TAVYYCARYF FGSSPNWYFD VWGQGTLVTV
SSASTKGPSV FPLAPCSRST SESTAALGCL VKDYFPEPVT
VSWNSGALTS GVHTFPAVLQ SSGLYSLSSV VTVPSSNFGT
QTYTCNVDHK PSNTKVDKTV ERKCCVECPP CPAPPVAGPS
VFLFPPKPKD TLMISRTPEV TCVVVDVSQE DPEVQFNWYV
DGVEVHNAKT KPREEQFNST YRVVSVLTVL HQDWLNGKEY
KCKVSNKGLP SSIEKTISKA KGQPREPQVY TLPPSQEEMT
KNQVSLTCLV KGFYPSDIAV EWESNGQPEN NYKTTPPVLD
SDGSFFLYSR LTVDKSRWQE GNVFSCSVLH EALHSHYTQK
SLSLSLGK

SEQ ID NO: 15
ASTKGPSVFP LAPCSRSTSE STAALGCLVK DYFPEPVTVS
WNSGALTSGV HTFPAVLQSS GLYSLSSVVT VTSSNFGTQT
YTCNVDHKPS NTKVDKTVER KCCVECPPCP APPVAGPSVF
LFPPKPKDTL YITREPEVTC VVVDVSHEDP EVQFNWYVDG
MEVHNAKTKP REEQFNSTFR VVSVLTVVHQ DWLNGKEYKC
KVSNKGLPAP IEKTISKTKG QPREPQVYTL PPSREEMTKN
QVSLTCLVKG FYPSDIAVEW ESNGQPENNY KTTPPMLDSD
GSFFLYSKLT VDKSRWQQGN VFSCSVMHEA LHNHYTQKSL
SLSPGK

SEQ ID NO: 16
QVQLVQSGAE VKKPGASVKV SCKASGYIFS NYWIQWVRQA
PGQGLEWMGE ILPGSGSTEY TENFKDRVTM TRDTSTSTVY
MELSSLRSED TAVYYCARYF FGSSPNWYFD VWGQGTLVTV
SSASTKGPSV FPLAPCSRST SESTAALGCL VKDYFPEPVT
VSWNSGALTS GVHTFPAVLQ SSGLYSLSSV VTVTSSNFGT
QTYTCNVDHK PSNTKVDKTV ERKCCVECPP CPAPPVAGPS
VFLFPPKPKD TLYITREPEV TCVVVDVSHE DPEVQFNWYV
DGMEVHNAKT KPREEQFNST FRVVSVLTVV HQDWLNGKEY
KCKVSNKGLP APIEKTISKT KGQPREPQVY TLPPSREEMT
KNQVSLTCLV KGFYPSDIAV EWESNGQPEN NYKTTPPMLD
SDGSFFLYSK LTVDKSRWQQ GNVFSCSVMH EALHNHYTQK
SLSLSPGK

SEQ ID NO: 17
GASENIYHALN

SEQ ID NO: 18
EILPGSGHTEYTENFKD

SEQ ID NO: 19
GHIFSNYWIQ

SEQ ID NO: 20
QVQLVQSGAE VKKPGASVKV SCKASGHIFS NYWIQWVRQA
PGQGLEWMGE ILPGSGHTEY TENFKDRVTM TRDTSTSTVY
MELSSLRSED TAVYYCARYF FGSSPNWYFD VWGQGTLVTV
SSASTKGPSV FPLAPCSRST SESTAALGCL VKDYFPEPVT
VSWNSGALTS GVHTFPAVLQ SSGLYSLSSV VTVPSSNFGT
QTYTCNVDHK PSNTKVDKTV ERKCCVECPP CPAPPVAGPS
VFLFPPKPKD TLMISRTPEV TCVVVDVSQE DPEVQFNWYV
DGVEVHNAKT KPREEQFNST YRVVSVLTVL HQDWLNGKEY
KCKVSNKGLP SSIEKTISKA KGQPREPQVY TLPPSQEEMT
KNQVSLTCLV KGFYPSDIAV EWESNGQPEN NYKTTPPVLD
SDGSFFLYSR LTVDKSRWQE GNVFSCSVMH EALHNHYTQK
SLSLSLGK

SEQ ID NO: 21
SYAIS

SEQ ID NO: 22
GIGPFFGTANYAQKFQG

SEQ ID NO: 23
DTPYFDY

SEQ ID NO: 24
SGDSIPNYYVY

SEQ ID NO: 25
DDSNRPS

SEQ ID NO: 26
QSFDSSLNAEV

SEQ ID NO: 27
QVQLVQSGAE VKKPGSSVKV SCKASGGTFS SYAISVWRQA
PGQGLEWMGG IGPFFGTANY AQKFQGRVTI TADESTSTAY
MELSSLRSED TAVYYCARDT PYFDYWGQGT LVTVSS

SEQ ID NO: 28
DIELTQPPSV SVAPGQTARI SCSGDSIPNY YVYWYQQKPG
QAPVLVIYDD SNRPSGIPER FSGSNSGNTA TLTISGTQAE
DEADYYCQSF DSSLNAEVFG GGTKLTVL

SEQ ID NO: 29
NYIS

SEQ ID NO: 30
IIDPDDSYTEYSPSFQG

-continued

SEQ ID NO: 31
YEYGGFDI

SEQ ID NO: 32
SGDNIGNSYVH

SEQ ID NO: 33
KDNDRPS

SEQ ID NO: 34
GTYDIESYV

SEQ ID NO: 35
EVQLVQSGAE VKKPGESLKI SCKGSGYSFT NYISWVRQMP
GKGLEWMGII DPDDSYTEYS PSFQGQVTIS ADKSISTAYL
QWSSLKASDT AMYYCARYEY GGFDIWGQGT LVTVSS

SEQ ID NO: 36
SYELTQPPSV SVAPGQTARI SCSGDNIGNS YVHWYQQKPG
QAPVLVIYKD NDRPSGIPER FSGSNSGNTA TLTISGTQAE
DEADYYCGTY DIESYVFGGG TKLTVL

SEQ ID NO: 37
SSYYVA

SEQ ID NO: 38
AIYTGSGATYKASWAKG

SEQ ID NO: 39
DGGYDYPTHAMHY

SEQ ID NO: 40
QASQNIGSSLA

SEQ ID NO: 41
GASKTHS

SEQ ID NO: 42
QSTKVGSSYGNH

SEQ ID NO: 43
QVQLVESGGG LVQPGGSLRL SCAASGFTSH SSYYVAWVRQ
APGKGLEWVG AIYTGSGATY KASWAKGRFT ISKDTSKNQV
VLTMTNMDPV DTATYYCASD GGYDYPTHAM HYWGQGTLVT VSS

SEQ ID NO: 44
DVVMTQSPSS LSASVGDRVT ITCQASQNIG SSLAWYQQKP
GQAPRLLIYG ASKTHSGVPS RFSGSGSGTD FTLTISSLQP
EDVATYYCQS TKVGSSYGNH FGGGTKVEIK

SEQ ID NO: 45
QVQLVESGGG LVQPGRSLRL SCAASGFTVH SSYYMAWVRQ
APGKGLEWVG AIFTGSGAEY KAEWAKGRVT ISKDTSKNQV
VLTMTNMDPV DTATYYCASD AGYDYPTHAM HYWGQGTLVT
VSSASTKGPS VFPLAPSSKS TSGGTAALGC LVKDYFPEPV
TVSWNSGALT SGVHTFPAVL QSSGLYSLSS VVTVPSSSLG
TQTYICNVNH KPSNTKVDKK VEPKSCDKTH TCPPCPAPEL
RRGPKVFLFP PKPKDTLMIS RTPEVTCVVV DVSHEDPEVK
FNWYVDGVEV HNAKTKPREE QYNSTYRVVS VLTVLHQDWL
NGKEYKCKVS NKGLPSSIEK TISKAKGQPR EPQVYTLPPS
REEMTKNQVS LTCLVKGFYP SDIAVEWESN GQPENNYKTT
PPVLDSDGSF FLYSKLTVDK SRWQQGNVFS CSVLHEALHA
HYTRKELSLS P

SEQ ID NO: 46
DIQMTQSPSS LSASVGDRVT ITCRASQGIS SSLAWYQQKP
GKAPKLLIYG ASETESGVPS RFSGSGSGTD FTLTISSLQP
EDFATYYCQN TKVGSSYGNT FGGGTKVEIK RTVAAPSVFI
FPPSDEQLKS GTASVVCLLN NFYPREAKVQ WKVDNALQSG
NSQESVTEQD SKDSTYSLSS TLTLSKADYE KHKVYACEVT
HQGLSSPVTK SFNRGEC

---

The invention claimed is:

1. A method of treating a human pediatric patient who is less than 18 years of age and has Atypical Hemolytic Uremic Syndrome (aHUS), the method comprising administering to the patient an effective amount of an anti-C5 antibody comprising a heavy chain comprising the amino acid sequence set forth in SEQ ID NO:14 and a light chain comprising the amino acid sequence set forth in SEQ ID NO:11, wherein the anti-C5 antibody or antigen binding fragment thereof, is administered:
   (a) once on Day 1 at a loading dose of:
      i. 600 mg to a patient weighing ≥5 to <10 kg,
      ii. 600 mg to a patient weighing ≥10 to <20 kg,
      iii. 900 mg to a patient weighing ≥20 to <30 kg,
      iv. 1200 mg to a patient weighing ≥30 to <40 kg; and
   (b) on Day 15 at a maintenance dose of:
      i. 300 mg to a patient weighing ≥5 to <10 kg,
      ii. 600 mg to a patient weighing ≥10 to <20 kg,
      iii. 2100 mg to a patient weighing ≥20 to <30 kg,
      iv. 2700 mg to a patient weighing ≥30 to <40 kg,
   wherein patients weighing <20 kg receive additional maintenance doses every four weeks thereafter, and patients weighing ≥20 kg receive additional maintenance doses every eight weeks thereafter, and
   wherein the treatment maintains a serum trough concentration of the anti-C5 antibody or antigen binding fragment thereof of 100 µg/mL or greater and/or a free C5 concentration of 0.5 µg/mL or lower.

2. The method of claim 1, wherein the anti-C5 antibody binds to human C5 at pH 7.4 and 25° C. with an affinity dissociation constant ($K_D$) that is in the range 0.1 nM to 1 nM.

3. The method of claim 1, wherein the anti-C5 antibody binds to human C5 at pH 6.0 and 25° C. with a $K_D \geq 10$ nM.

4. The method of claim 1, wherein the anti-C5 antibody is administered to a patient weighing ≥5 to <10 kg:
   (a) once on Day 1 at a loading dose of 600 mg; and
   (b) once on Day 15 at a maintenance dose of 300 mg and every four weeks thereafter.

5. The method of claim 1, wherein the anti-C5 antibody is administered to a patient weighing ≥10 to <20 kg:
   (a) once on Day 1 at a loading dose of 600 mg; and
   (b) once on Day 15 at a maintenance dose of 600 mg and every four weeks thereafter.

6. The method of claim 1, wherein the anti-C5 antibody is administered to a patient weighing ≥20 to <30 kg:
   (a) once on Day 1 at a loading dose of 900 mg; and
   (b) once on Day 15 at a maintenance dose of 2100 mg and every eight weeks thereafter.

7. The method of claim 1, wherein the anti-C5 antibody is administered to a patient weighing ≥30 to <40 kg:
   (a) once on Day 1 at a loading dose of 1200 mg; and
   (b) once on Day 15 at a maintenance dose of 2700 mg and every eight weeks thereafter.

8. The method of claim 1, wherein the anti-C5 antibody is administered at a dose of:
   (a) 300 mg or 600 mg every four weeks after the treatment for up to two years; or
   (b) 2100 mg, 2700 mg, 3000 mg, 3300 mg or 3600 mg every eight weeks after the treatment for up to two years.

9. The method of claim 1, wherein the anti-C5 antibody is formulated for intravenous administration.

10. The method of claim 1, wherein the treatment is an administration cycle comprising a total of 26 weeks of treatment.

11. The method of claim 1, further comprising determining that the treatment:
   (a) results in terminal complement inhibition;
   (b) results in a complete thrombotic microangiopathy (TMA) response;
   (c) results in a ≥25% reduction in serum creatinine levels compared to baseline;
   (d) results in an increase in platelet count compared to baseline;
   (e) results in a reduction of hemolysis compared to baseline as assessed by lactate dehydrogenase (LDH) levels;
   (f) produces a reduction or cessation of at least one therapeutic marker selected from the group consisting of: severe hypertension, proteinuria, uremia, lethargy, fatigue, irritability, thrombocytopenia, microangiopathic hemolytic anemia and renal function impairment, compared to baseline;

(g) produces a shift toward normal levels of a marker selected from the group consisting of: Factor Ba, soluble tumor necrosis factor receptor 1 (sTNFR1), soluble vascular adhesion molecule 1 (sVCAM1), thrombomodulin, D dimer and cystatin C, compared to baseline;

(h) produces a reduction in the need for blood transfusions compared to baseline;

(i) produces a reduction in major adverse vascular events (MAVEs) compared to baseline; and/or (j) produces a change from baseline in quality of life, assessed via the Functional Assessment of Chronic Illness Therapy (FACIT) Fatigue Scale, version 4 or the European Organisation for Research and Treatment of Cancer, Quality of Life Questionnaire Core 30 Scale compared to baseline.

12. A kit for treating Atypical Hemolytic Uremic Syndrome (aHUS) in a human pediatric patient, the kit comprising:

(a) a dose of an anti-C5 antibody or antigen binding fragment thereof, comprising CDR1, CDR2 and CDR3 domains of the heavy chain variable region having the sequence set forth in SEQ ID NO:12, and CDR1, CDR2 and CDR3 domains of the light chain variable region having the sequence set forth in SEQ ID NO:8; and (b) instructions for using the anti-C5 antibody or antigen binding fragment thereof in the method of claim 1.

13. An anti-C5 antibody comprising a heavy chain comprising the amino acid sequence set forth in SEQ ID NO:14 and a light chain comprising the amino acid sequence set forth in SEQ ID NO:11, wherein the anti-C5 antibody or antigen binding fragment thereof is administered:

(a) once on Day 1 at a loading dose of:
  i. 600 mg to a patient weighing ≥5 to <10 kg,
  ii. 600 mg to a patient weighing ≥10 to <20 kg,
  iii. 900 mg to a patient weighing ≥20 to <30 kg,
  iv. 1200 mg to a patient weighing ≥30 to <40 kg,
  v. 2400 mg to a patient weighing ≥40 to <60 kg,
  vi. 2700 mg to a patient weighing ≥60 to <100 kg, or
  vii. 3000 mg to a patient weighing ≥100 kg; and (b) on Day 15 at a maintenance dose of:
  i. 300 mg to a patient weighing ≥5 to <10 kg,
  ii. 600 mg to a patient weighing ≥10 to <20 kg,
  iii. 2100 mg to a patient weighing ≥20 to <30 kg,
  iv. 2700 mg to a patient weighing ≥30 to <40 kg,
  v. 3000 mg to a patient weighing ≥40 to <60 kg,
  vi. 3300 mg to a patient weighing ≥60 to <100 kg, or
  vii. 3600 mg to a patient weighing ≥100 kg;

wherein patients weighing <20 kg receive additional maintenance doses every four weeks thereafter, and patients weighing ≥20 kg receive additional maintenance doses every eight weeks thereafter.

14. The method of claim 1, wherein the treatment maintains a free C5 concentration of 0.309 to 0.5 µg/mL.

15. The method of claim 1, wherein the anti-C5 antibody is ravulizumab.

* * * * *